US012719605B2

(12) United States Patent
Lin et al.

(10) Patent No.: US 12,719,605 B2
(45) Date of Patent: Aug. 25, 2026

(54) MAPPING SCHEMES FOR PARITY CODES WITH SHAPING

(71) Applicant: QUALCOMM Incorporated, San Diego, CA (US)

(72) Inventors: Ming Ta Lin, San Jose, CA (US); Alessandro Risso, San Diego, CA (US); Li Zhang, San Diego, CA (US); Wei Yang, San Diego, CA (US); Jing Jiang, San Diego, CA (US); Hari Sankar, San Diego, CA (US); Harsha Acharya, Santa Clara, CA (US); Hobin Kim, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 255 days.

(21) Appl. No.: 18/740,265

(22) Filed: Jun. 11, 2024

(65) Prior Publication Data

US 2025/0379678 A1 Dec. 11, 2025

(51) Int. Cl.
*H04L 1/00* (2006.01)

(52) U.S. Cl.
CPC .......... *H04L 1/0011* (2013.01); *H04L 1/0061* (2013.01); *H04L 1/0071* (2013.01)

(58) Field of Classification Search
None
See application file for complete search history.

(56) References Cited

U.S. PATENT DOCUMENTS

2020/0177307 A1* 6/2020 Pan ........................ H04L 1/0045
2021/0091886 A1* 3/2021 Yoffe ...................... H04L 27/04
2021/0243058 A1* 8/2021 Doan ..................... H04L 1/0042
2023/0135383 A1* 5/2023 Yang ..................... H04L 1/0046
370/335
2023/0318901 A1 10/2023 Tao
2024/0007226 A1 1/2024 Wu et al.
2025/0337513 A1* 10/2025 Pan ..................... H04J 14/0208

FOREIGN PATENT DOCUMENTS

WO WO-2021158518 A1 8/2021

OTHER PUBLICATIONS

International Search Report and Written Opinion—PCT/US2025/029410—ISA/EPO—Sep. 19, 2025.

* cited by examiner

*Primary Examiner* — The Hy Nguyen
(74) *Attorney, Agent, or Firm* — Holland & Hart LLP

(57) ABSTRACT

Some examples of the techniques described herein may provide schemes to organize shaped payload bits, non-shaped payload bits, and parity bits to allow an increased quantity of bits to be shaped for enhanced performance. Interleaving may be utilized in some aspects to enhance robustness to burst errors. For instance, interleaving schemes for enhancing bit orderings and interleaving are provided. In some approaches, permutation and row-column interleaving may be performed with a quantity of rows. Some approaches may utilize circular rotation and row-column interleaving with a quantity of rows. In some examples, permutation with alphabet-based row-column interleaving with fixed rows may be performed. Some aspects may include permutation and row-column interleaving with a quantity of rows when punctured columns are shaped. In some approaches for modulation mapping, each set of bits may be mapped to a quadrature amplitude modulation (QAM) symbol.

20 Claims, 24 Drawing Sheets

100
110
115
125
105
120
RIC 175
CU 160
DU 165
SMO 180
RU 170
140
104
155
160
162
165
168
170
Processing System 112
Processing System 106
130
135
150

Generate payload bits and parity bits, where the parity bits are based on the payload bits, and where the payload bits include shaped payload bits and non-shaped payload bits

2105

Map each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices

2110

Map each respective bit of the parity bits to a respective bit index of a second subset of indices of the set of multiple indices, where the second subset of indices includes, based on the quantity information, at least one of: the first portion of one or more indices or the second portion of one or more indices

2115

Map each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol

2120

Output the modulation symbol including interleaved bits, where the interleaved bits include at least one shaped payload bit of the shaped payload bits, at least one non-shaped payload bit of the non-shaped payload bits, and at least one parity bit of the parity bits

2125

2100

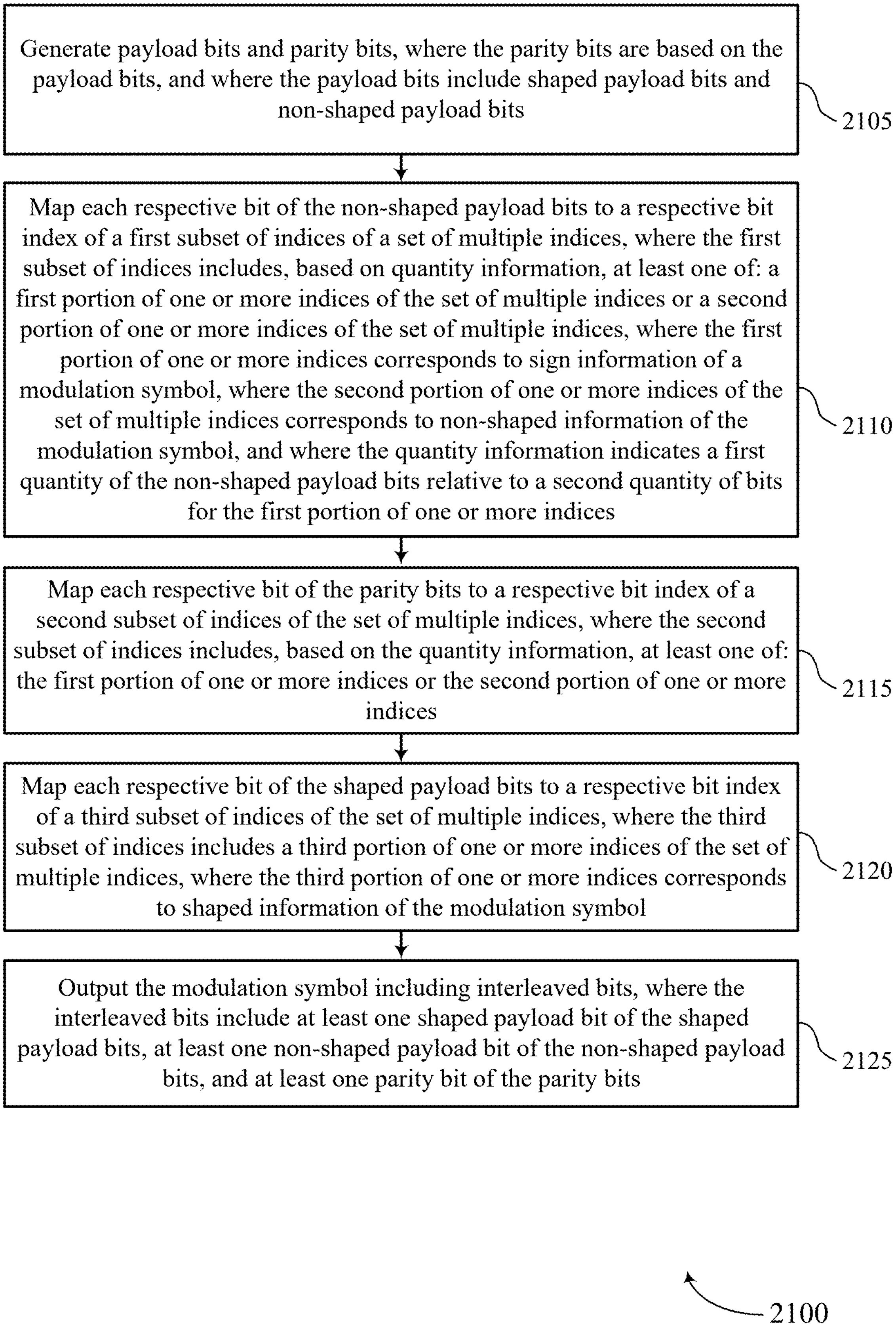

FIG. 21

Generate payload bits and parity bits, where the parity bits are based on the payload bits, and where the payload bits include shaped payload bits and non-shaped payload bits

2205

Map each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices

2210

Map each respective bit of the parity bits to a respective bit index of a second subset of indices of the set of multiple indices, where the second subset of indices includes, based on the quantity information, at least one of: the first portion of one or more indices or the second portion of one or more indices

2215

Map each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol

2220

Interleave one or more first bits of the non-shaped payload bits based on first bit location information, where the first bit location information includes at least one of: the first portion of the one or more indices of the set of multiple indices or the second portion of the one or more indices of the set of multiple indices

2225

Interleave one or more second bits of the parity bits based on second bit location information, where the second bit location information includes at least one of: the first portion of the one or more indices of the set of multiple indices or the second portion of the one or more indices of the set of multiple indices

2230

Interleave one or more third bits of the shaped payload bits based on third bit location information, where the third bit location information includes the third portion of the one or more indices of the set of multiple indices, and where the interleaved bits include the one or more first bits, the one or more second bits, and the one or more third bits

2235

Output the modulation symbol including interleaved bits, where the interleaved bits include at least one shaped payload bit of the shaped payload bits, at least one non-shaped payload bit of the non-shaped payload bits, and at least one parity bit of the parity bits

2240

2200

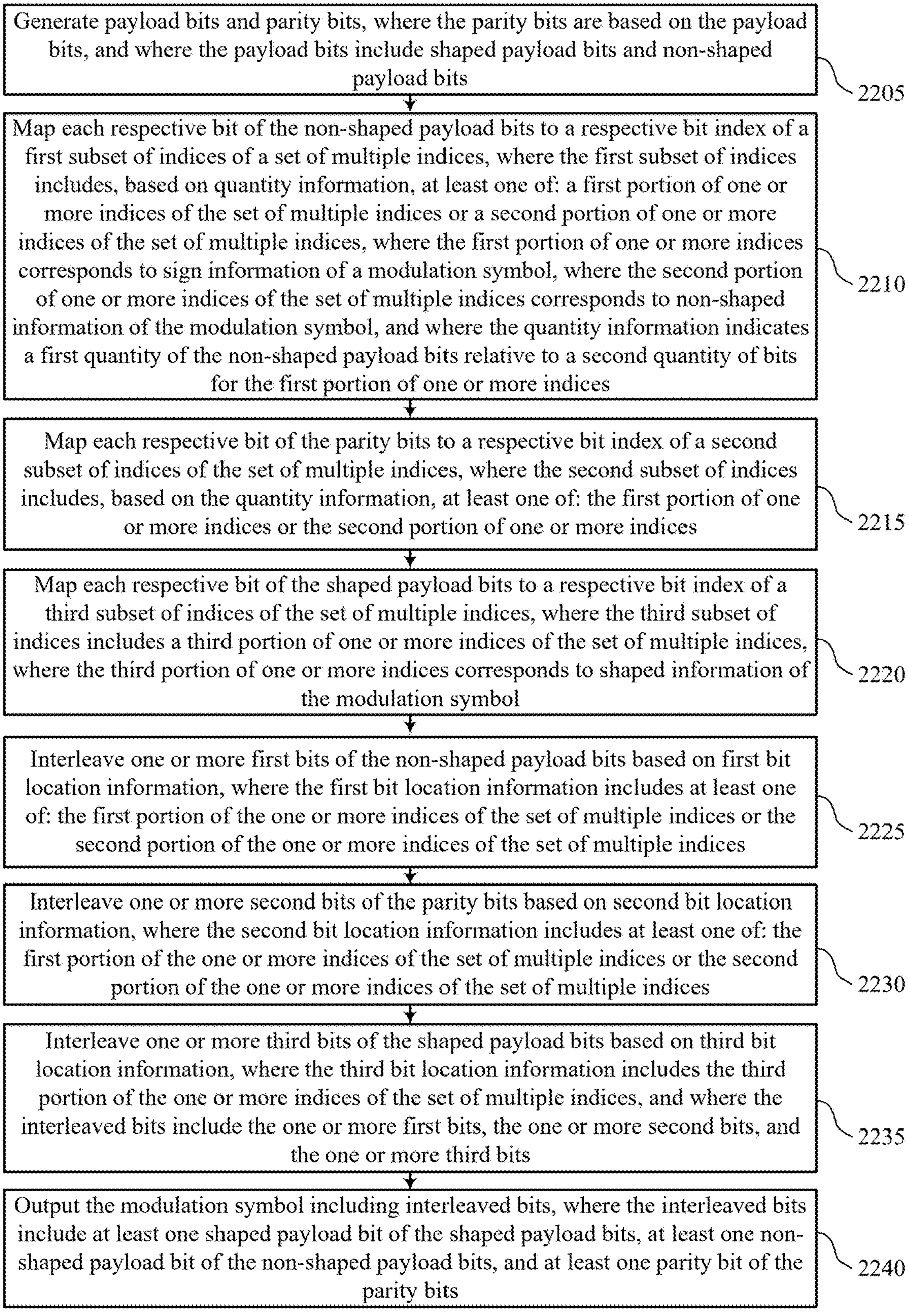

FIG. 22

Obtain a modulation symbol that indicates non-shaped payload bits, shaped payload bits, and parity bits

2305

De-map each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices

2310

De-map each respective bit of the parity bits to a respective bit index of a second subset of indices of the set of multiple indices, where the second subset of indices includes, based on the quantity information, at least one of: the first portion of one or more indices or the second portion of one or more indices

2315

De-map each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol

2320

2300

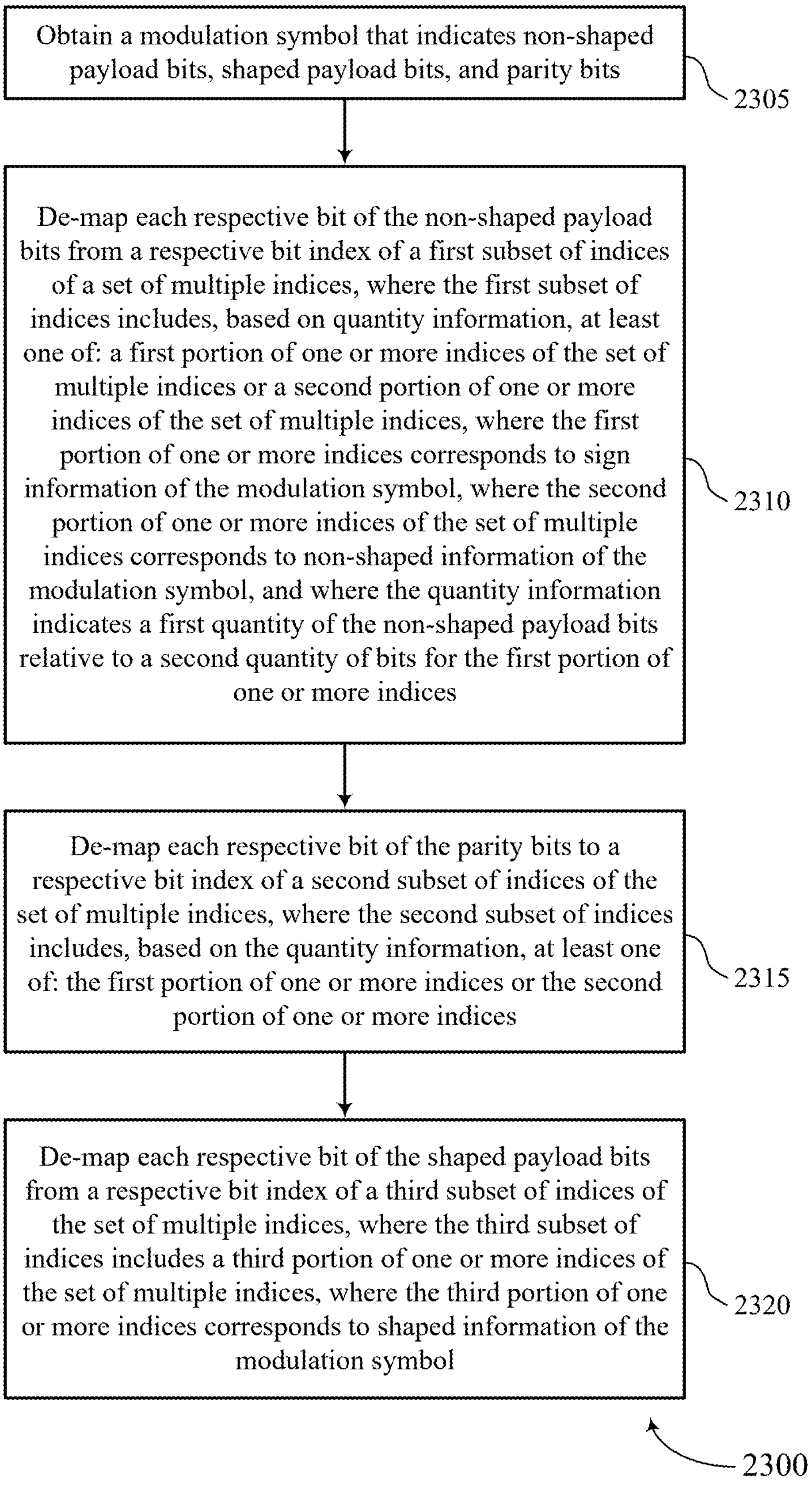

FIG. 23

Figure 24:
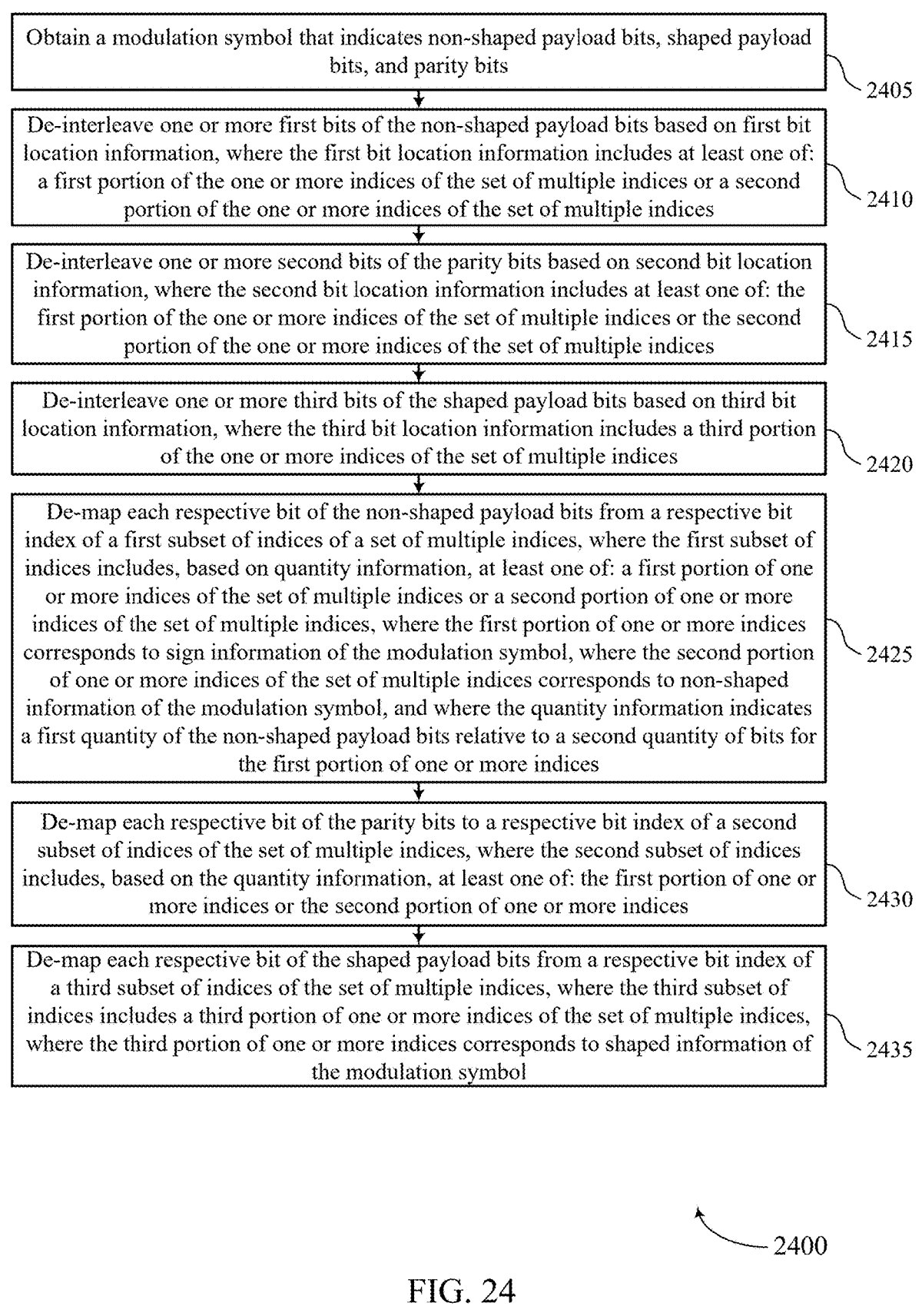

Obtain a modulation symbol that indicates non-shaped payload bits, shaped payload bits, and parity bits — 2405

De-interleave one or more first bits of the non-shaped payload bits based on first bit location information, where the first bit location information includes at least one of: a first portion of the one or more indices of the set of multiple indices or a second portion of the one or more indices of the set of multiple indices — 2410

De-interleave one or more second bits of the parity bits based on second bit location information, where the second bit location information includes at least one of: the first portion of the one or more indices of the set of multiple indices or the second portion of the one or more indices of the set of multiple indices — 2415

De-interleave one or more third bits of the shaped payload bits based on third bit location information, where the third bit location information includes a third portion of the one or more indices of the set of multiple indices — 2420

De-map each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices — 2425

De-map each respective bit of the parity bits to a respective bit index of a second subset of indices of the set of multiple indices, where the second subset of indices includes, based on the quantity information, at least one of: the first portion of one or more indices or the second portion of one or more indices — 2430

De-map each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol — 2435

MAPPING SCHEMES FOR PARITY CODES WITH SHAPING

INTRODUCTION

The following relates to wireless communication, including mapping schemes for parity codes with shaping. Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method of wireless communication performed by a first network entity is described. The method may include generating payload bits and parity bits, where the parity bits are based on the payload bits, and where the payload bits include shaped payload bits and non-shaped payload bits, mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, mapping each respective bit of the parity bits to a respective bit index of a second subset of indices of the set of multiple indices, where the second subset of indices includes, based on the quantity information, at least one of: the first portion of one or more indices or the second portion of one or more indices, mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol, and outputting the modulation symbol including interleaved bits, where the interleaved bits include at least one shaped payload bit of the shaped payload bits, at least one non-shaped payload bit of the non-shaped payload bits, and at least one parity bit of the parity bits.

A first network entity for wireless communication is described. The first network entity may include a processing system configured to generate payload bits and parity bits, where the parity bits are based on the payload bits, and where the payload bits include shaped payload bits and non-shaped payload bits, map each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, map each respective bit of the parity bits to a respective bit index of a second subset of indices of the set of multiple indices, where the second subset of indices includes, based on the quantity information, at least one of: the first portion of one or more indices or the second portion of one or more indices, map each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol, and output the modulation symbol including interleaved bits, where the interleaved bits include at least one shaped payload bit of the shaped payload bits, at least one non-shaped payload bit of the non-shaped payload bits, and at least one parity bit of the parity bits.

Another first network entity for wireless communication is described. The first network entity may include means for generating payload bits and parity bits, where the parity bits are based on the payload bits, and where the payload bits include shaped payload bits and non-shaped payload bits, means for mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, means for mapping each respective bit of the parity bits to a respective bit index of a second subset of indices of the set of multiple indices, where the second subset of indices includes, based on the quantity information, at least one of: the first portion of one or more indices or the second portion of one or more indices, means for mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol, and means for outputting the modulation symbol including interleaved bits, where the interleaved bits include at least one shaped payload bit of the shaped payload bits, at least one non-shaped payload bit of the non-shaped payload bits, and at least one parity bit of the parity bits.

A non-transitory computer-readable medium having code for wireless communication stored thereon is described. The code, when executed by a first network entity, may cause the first network entity to generate payload bits and parity bits, where the parity bits are based on the payload bits, and where the payload bits include shaped payload bits and non-shaped payload bits, map each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, map each respective bit of the parity bits to a respective bit index of a second subset of indices of the set of multiple indices, where the second subset of indices includes, based on the quantity information, at least one of: the first portion of one or more indices or the second portion of one or more indices, map each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol, and output the modulation symbol including interleaved bits, where the interleaved bits include at least one shaped payload bit of the shaped payload bits, at least one non-shaped payload bit of the non-shaped payload bits, and at least one parity bit of the parity bits.

In some examples of the method, first network entities, and non-transitory computer-readable medium described herein, the quantity information indicates the first quantity relative to the second quantity by indicating the first quantity may be less than the second quantity, the first subset of indices includes only the first portion of the one or more indices, and the second subset of indices includes the first portion of the one or more indices and the second portion of the one or more indices.

In some examples of the method, first network entities, and non-transitory computer-readable medium described herein, the quantity information indicates the first quantity relative to the second quantity by indicating the first quantity may be equal to the second quantity, the first subset of indices includes only the first portion of one or more indices, and the second subset of indices includes only the second portion of one or more indices.

In some examples of the method, first network entities, and non-transitory computer-readable medium described herein, the quantity information indicates the first quantity relative to the second quantity by indicating the first quantity may be greater than the second quantity, the first subset of indices includes the first portion of one or more indices and the second portion of one or more indices, and the second subset of indices includes only the second portion of one or more indices.

In some examples of the method, first network entities, and non-transitory computer-readable medium described herein, a processing system may be configured to determine the quantity information.

Some examples of the method, first network entities, and non-transitory computer-readable medium described herein may further include operations, features, means, or code for determining the quantity information includes comparing the first quantity and the second quantity.

In some examples of the method, first network entities, and non-transitory computer-readable medium described herein, operations, features, means, or code for mapping each respective bit of the non-shaped payload bits, mapping each respective bit of the parity bits, or mapping each respective bit of the shaped payload bits may include operations, features, means, or code for puncturing one or more bits of the non-shaped payload bits, concatenating the shaped payload bits to the non-shaped payload bits, concatenating the parity bits to the shaped payload bits, and inserting one or more bits of the parity bits to one or more respective indices between the non-shaped payload bits and the shaped payload bits.

In some examples of the method, first network entities, and non-transitory computer-readable medium described herein, one or more first bits of the parity bits mapped to the first portion of one or more indices may be associated with a higher degree in a parity encoding scheme than one or more second bits of the parity bits mapped to the second portion of one or more indices.

In some examples of the method, first network entities, and non-transitory computer-readable medium described herein, operations, features, means, or code for mapping each respective bit of the parity bits may include operations, features, means, or code for rotating one or more first bits of the parity bits from the second portion of one or more indices to the first portion of one or more indices.

In some examples of the method, first network entities, and non-transitory computer-readable medium described herein, one or more first bits of the parity bits mapped to the first portion of one or more indices may be associated with a lower degree in a parity encoding scheme than one or more second bits of the parity bits mapped to the second portion of one or more indices.

Some examples of the method, first network entities, and non-transitory computer-readable medium described herein may further include operations, features, means, or code for interleaving one or more first bits of the non-shaped payload bits based on first bit location information, where the first bit location information includes at least one of: the first portion of the one or more indices of the set of multiple indices or the second portion of the one or more indices of the set of multiple indices, interleaving one or more second bits of the parity bits based on second bit location information, where the second bit location information includes at least one of: the first portion of the one or more indices of the set of multiple indices or the second portion of the one or more indices of the set of multiple indices, and interleaving one or more third bits of the shaped payload bits based on third bit location information, where the third bit location information includes the third portion of the one or more indices of the set of multiple indices, and where the interleaved bits include the one or more first bits, the one or more second bits, and the one or more third bits.

In some examples of the method, first network entities, and non-transitory computer-readable medium described herein, the first bit location information corresponds to one or more first rows or one or more second rows of a structure of rows and columns, the second bit location information corresponds to the one or more first rows or the one or more second rows of the structure, and the third bit location information corresponds to one or more third rows of the structure and a quantity of the rows corresponds to a modulation order and each of the columns may be associated with a respective modulation symbol of a set of multiple modulation symbols.

Some examples of the method, first network entities, and non-transitory computer-readable medium described herein may further include operations, features, means, or code for permuting the non-shaped payload bits, the shaped payload bits, and the parity bits before the one or more first bits, the one or more second bits, or the one or more third bits may be interleaved.

In some examples of the method, first network entities, and non-transitory computer-readable medium described herein, a quantity of bits allocated for the non-shaped information of the modulation symbol may be based on a quantity of bits allocated for the shaped information of the modulation symbol and a bit allocated for the sign information of the modulation symbol.

In some examples of the method, first network entities, and non-transitory computer-readable medium described herein, operations, features, means, or code for mapping each respective bit of the non-shaped payload bits, mapping each respective bit of the parity bits, or mapping each respective bit of the shaped payload bits may include operations, features, means, or code for puncturing one or more bits of the shaped payload bits, concatenating the non-shaped payload bits to the shaped payload bits, concatenating the parity bits to the non-shaped payload bits, and exchanging each respective bit of the shaped payload bits with respective bits of the non-shaped payload bits to map the shaped payload bits to the third subset of indices and to map the non-shaped payload bits to the first subset of indices.

A method of wireless communication performed by a second network entity is described. The method may include obtaining a modulation symbol that indicates non-shaped payload bits, shaped payload bits, and parity bits, de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, de-mapping each respective bit of the parity bits to a respective bit index of a second subset of indices of the set of multiple indices, where the second subset of indices includes, based on the quantity information, at least one of: the first portion of one or more indices or the second portion of one or more indices, and de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

A second network entity for wireless communication is described. The second network entity may include a processing system configured to obtain a modulation symbol that indicates non-shaped payload bits, shaped payload bits, and parity bits, de-map each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, de-map each respective bit of the parity bits to a respective bit index of a second subset of indices of the set of multiple indices, where the second subset of indices includes, based on the quantity information, at least one of: the first portion of one or more indices or the second portion of one or more indices, and de-map each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

Another second network entity for wireless communication is described. The second network entity may include means for obtaining a modulation symbol that indicates non-shaped payload bits, shaped payload bits, and parity bits, means for de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, means for de-mapping each respective bit of the parity bits to a respective bit index of a second subset of indices of the set of multiple indices, where the second subset of indices includes, based on the quantity information, at least one of: the first portion of one or more indices or the second portion of one or more indices, and means for de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

A non-transitory computer-readable medium having code for wireless communication is described. The code, when executed by a second network entity, may cause the second network entity to obtain a modulation symbol that indicates non-shaped payload bits, shaped payload bits, and parity bits, de-map each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices, de-map each respective bit of the parity bits to a respective bit index of a second subset of indices of the set of multiple indices, where the second subset of indices includes, based on the quantity information, at least one of: the first portion of one or more indices or the second portion of one or more indices, and de-map each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

In some examples of the method, second network entities, and non-transitory computer-readable medium described herein, the quantity information indicates the first quantity relative to the second quantity by indicating the first quantity may be less than the second quantity, the first subset of indices includes only the first portion of the one or more indices, and the second subset of indices includes the first portion of the one or more indices and the second portion of the one or more indices.

Some examples of the method, second network entities, and non-transitory computer-readable medium described herein may further include operations, features, means, or instructions for de-interleaving one or more first bits of the non-shaped payload bits based on first bit location information, where the first bit location information includes at least one of: the first portion of the one or more indices of the set of multiple indices or the second portion of the one or more indices of the set of multiple indices, de-interleaving one or more second bits of the parity bits based on second bit location information, where the second bit location information includes at least one of: the first portion of the one or more indices of the set of multiple indices or the second portion of the one or more indices of the set of multiple indices, and de-interleaving one or more third bits of the shaped payload bits based on third bit location information, where the third bit location information includes the third portion of the one or more indices of the set of multiple indices.

In some examples of the method, second network entities, and non-transitory computer-readable medium described herein, the first bit location information corresponds to one or more first rows or one or more second rows of a structure of rows and columns, the second bit location information corresponds to the one or more first rows or the one or more second rows of the structure, and the third bit location information corresponds to one or more third rows of the structure and a quantity of the rows corresponds to a modulation order and each of the columns may be associated with a respective modulation symbol of a set of multiple modulation symbols.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 21 through 24 show flowcharts illustrating methods that support mapping schemes for parity codes with shaping in accordance with one or more aspects of the present disclosure.

DETAILED DESCRIPTION

Figure 1:
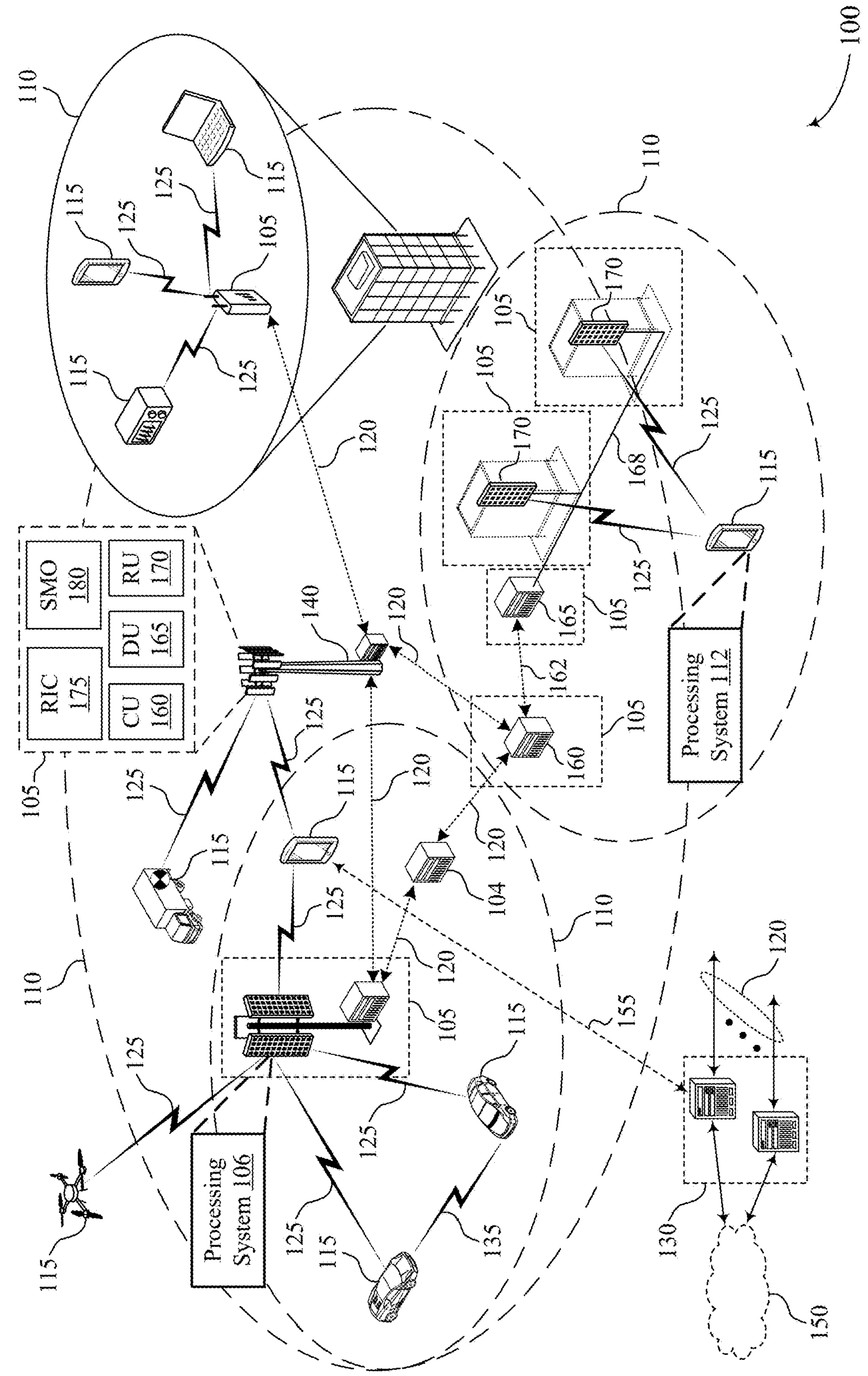
FIG. 1 shows an example of a wireless communication system that supports mapping schemes for parity codes with shaping in accordance with one or more aspects of the present disclosure.

In some wireless communication systems, error detection or correction codes may be utilized to detect or correct errors in communicated information. For example, a low-density parity check (LDPC) code may be utilized to produce parity bits, which may be utilized to detect or correct errors in corresponding payload bits. Interleaving may be utilized to enhance the performance of error detection or correction codes for burst errors or channel fading. In some approaches, the information may be modulated for communication. For instance, quadrature amplitude modulation (QAM) may be utilized, where different sets of bits may be indicated by different symbols or points in a modulation constellation.

Probabilistic amplitude shaping (PAS) is a technique to provide performance gain, which may be applied when channel coding with amplitude modulation is utilized. In PAS, bits or symbols (e.g., points in a modulation constellation) may be assigned differing probabilities for communication. For instance, information may be mapped more frequently to modulation constellation points with lower energy (e.g., points that are closer to the origin in in-phase (I) and quadrature (Q) dimensions), which may enhance spectral efficiency or performance gain. In some approaches, shaping may be applied to one or more of the most significant (e.g., 1, 2, another quantity, or all) of the amplitude bits. In some aspects, shaping may not be applied to sign bits to preserve symmetricity. For multi-bit shaping, each shaped output may be defined based on an n-bit alphabet, where an n-bit alphabet may be defined as a signal with $2^n$ levels.

In some examples of shared channels (SCHs), systematic bit priority mapping (SBPM) may be utilized to place LDPC bits in one or more most significant bit positions of modulated symbols to increase protection. In some approaches to SBPM, row and column (row-column) interleaving may be utilized, where a quantity of rows may correspond to a modulation order (Qm), and a quantity of columns may correspond to a quantity of modulated symbols (Nsym).

Some issues arise when utilizing a combination of error detection or correction coding with interleaving (e.g., SBPM), modulation, or PAS. Some issues to address may include how to divide payload (e.g., systematic) bits to shaped and non-shaped bits and how to determine which payload bits are shaped or not shaped. Another challenge may include how to calculate bit indices or locations at an encoder input (e.g., LDPC encoder input) that maps shaped payload bits to the shaped amplitude bits of modulated symbols (e.g., bit indices for modulation or demodulation). Approaches may be lacking for calculating bit indices or locations at an encoder input (e.g., LDPC encoder input) that maps non-shaped payload bits to sign or non-shaped amplitude bits of modulated symbols (e.g., bit indices for modulation or demodulation) or for calculating bit indices or locations at an encoder output (e.g., LDPC encoder output) that maps parity bits to the sign bits or the non-shaped amplitude bits of modulated symbols to increase a quantity of shaped amplitude bits (e.g., bit indices for modulation or demodulation). Other issues relate to performing interleaving. For instance, approaches may be lacking regarding how bit indices for both payload and parity bit ordering may be used for de-interleaving and demodulation, or for determining whether SBPM interleaving may be applicable once parity bits are mapped to sign bits of modulated symbols.

In addition to the foregoing issues, applying PAS to LDPC coding with QAM may include shaping part of the input payload (e.g., systematic) bits and mapping shaped bits to locations corresponding to the most significant amplitude bits. LDPC parity bits that are not shaped may pose a limitation of a quantity of bits that can be shaped.

Some examples of the techniques described herein may provide schemes to organize shaped payload bits, non-shaped payload bits, and parity bits to allow an increased quantity of bits to be shaped for enhanced performance. Interleaving may be utilized in some aspects to enhance robustness to burst errors. For instance, interleaving schemes for enhancing bit orderings and interleaving are provided. In some approaches, permutation and row-column interleaving may be performed with a quantity of rows (e.g., Qm rows). Some approaches may utilize circular rotation and row-column interleaving with a quantity of rows (e.g., Qm rows). In some examples, permutation with alphabet row-column interleaving with fixed rows may be performed. Some aspects may include permutation and row-column interleaving with a quantity of rows (e.g., Qm rows) when punctured (e.g., LDPC punctured) columns are shaped.

Aspects of the disclosure are initially described in the context of wireless communication systems. Aspects of the disclosure are also described in the context of a block diagram. Aspects of the disclosure are further described in the context of diagrams of bit mappings. Aspects of the disclosure are additionally described in the context of a process flow. Aspects of the disclosure are further illustrated by and described with reference to apparatus diagrams, system diagrams, and flowcharts that relate to mapping schemes for parity codes with shaping.

FIG. 1 shows an example of a wireless communication system 100 that supports mapping schemes for parity codes with shaping in accordance with one or more aspects of the present disclosure. The wireless communication system 100 may include one or more devices, such as one or more network devices (e.g., network entities 105), one or more UEs 115, and a core network 130. In some examples, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communication system 100 (e.g., other wireless communication devices, including UEs 115 or network entities 105), as shown in FIG. 1.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (cRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, “network entity” may refer to an entity that is configured to operate in a network, such as the network entity 105. For example, a “network entity” is not limited to an entity that is currently located in and/or currently operating in the network. Rather, a network entity may be any entity that is capable of communicating and/or operating in the network.

The adjectives “first,” “second,” “third,” and so on are used for contextual distinction between two or more of the modified noun in connection with a discussion and are not meant to be absolute modifiers that apply only to a certain respective entity throughout the entire document. For example, a network entity may be referred to as a “first network entity” in connection with one discussion and may be referred to as a “second network entity” in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity (e.g., network entity 105) may include a processing system 106. Similarly, the network entity (e.g., UE 115) may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an "input" and "input information" may be used interchangeably. Similarly, as described herein, an "output" and "output information" may be used interchangeably. Any information generated by any component may be provided to one or more other systems or components of, for example, a network entity described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communication systems (e.g., the wireless communication system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communication system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communication system 100. For example, the carrier bandwidth may be one of a set of bandwidths for carriers of a particular RAT (e.g., 1.4, 3, 5, 10, 15, 20, 40, or 80 megahertz (MHZ)). Devices of the wireless communication system 100 (e.g., the network entities 105, the UEs 115, or both) may have hardware configurations that support communications using a particular carrier bandwidth or may be configurable to support communications using one of a set of carrier bandwidths. In some examples, the wireless communication system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communication systems, such as the wireless communication system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., a quantity of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term “cell” may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communication system 100 may include, for example, a heterogeneous network in which different types of the network entities 105 support communications for coverage areas 110 (e.g., different coverage areas) using the same or different RATs.

The wireless communication system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communication system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed RF spectrum bands. For example, the wireless communication system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communication systems, error detection or correction codes may be utilized to detect or correct errors in communicated information. For example, a LDPC code may be utilized to produce parity bits, which may be utilized to detect or correct errors in corresponding payload bits. Interleaving may be utilized to enhance the performance of error detection or correction codes for burst errors or channel fading.

In some approaches, the information may be modulated for communication. For instance, QAM may be utilized, where different sets of bits may be indicated by different symbols or points in a modulation constellation.

In some examples of SCHs, SBPM may be utilized to place LDPC bits in one or more most significant bit positions of modulated symbols to increase protection. In an example of a SCH coding scheme, payload bits may be provided to an LDPC encoder, which may add parity bits to the payload bits. An SBPM interleaver may interleave the parity bits and the payload bits. Modulation mapping may be performed on the interleaved bits to produce modulated symbols for transmission. In this example, the bits are ordered from most significant to least significant, where the bits are ordered with payload bits first and parity bits last. With SBPM at QAM 256, a portion of the payload bits may be punctured, and in descending order from most significant to least significant, payload bits may correspond to in-phase sign (e.g., "Is") and quadrature sign (e.g., "Qs") portions of the modulation symbol, followed by one or more in-phase amplitude and quadrature amplitude portions (e.g., I1, Q1, I2, Q2, where "I1" denotes a first in-phase amplitude portion, "Q1" denotes a first quadrature amplitude portion, and so on). The parity bits may correspond to remaining portions of the modulation symbol (e.g., Q2, I3, Q3).

In some approaches to SBPM, row-column interleaving may be utilized, where a quantity of rows may correspond to a modulation order (Qm), and a quantity of columns may correspond to a quantity of modulated symbols (Nsym). For instance, Nsym=E/Qm, where E is a quantity of bits to be interleaved. An example of row-column interleaving with six modulated symbols at QAM 256 is provided in Table (1).

TABLE 1

| bit index | symbol 0 | symbol 1 | symbol 2 | symbol 3 | symbol 4 | symbol 5 |
|---|---|---|---|---|---|---|
| Is | 0 | 1 | 2 | 3 | 4 | 5 |
| Qs | 6 | 7 | 8 | 9 | 10 | 11 |
| I1 | 12 | 13 | 14 | 15 | 16 | 17 |
| Q1 | 18 | 19 | 20 | 21 | 22 | 23 |
| I2 | 24 | 25 | 26 | 27 | 28 | 29 |
| Q2 | 30 | 31 | 32 | 33 | 34 | 35 |
| I3 | 36 | 37 | 38 | 39 | 40 | 41 |
| Q3 | 42 | 43 | 44 | 45 | 46 | 47 |

As illustrated in Table (1), bits with bit indices 0-47 are interleaved for mapping to bit indices corresponding to in-phase (I) and quadrature (Q) sign and amplitude ("amp") portions of the modulation symbols.

PAS is a technique to provide performance gain, which may be applied when channel coding with amplitude modulation is utilized. In PAS, bits or symbols (e.g., points in a modulation constellation) may be assigned differing probabilities for communication. For instance, information may be mapped more frequently to modulation constellation points with lower energy (e.g., points that are closer to the origin in in-phase (I) and quadrature (Q) dimensions), which may enhance spectral efficiency or performance gain. In some approaches, shaping may be applied to one or more of the most significant (e.g., 1, 2, another quantity, or all) of the amplitude bits. In some aspects, shaping may not be applied to sign bits to preserve symmetricity. For multi-bit shaping, each shaped output may be defined based on an n-bit alphabet, where an n-bit alphabet may be defined as a signal with $2^n$ levels.

In some approaches for modulation mapping, each set of Qm bits may be mapped to a QAM symbol. For Ns bit PAS, for example, each QAM symbol may include, represent, or indicate 2 sign bits (where 2 corresponds to I and Q dimensions), 2*Ns shaped amplitude bits, and remaining non-shaped amplitude bits. Table (2) illustrates an example of 2-bit PAS at QAM 256, where shaped amplitude bits are interlaced with sign and non-shaped amplitude bits.

a portion of) payload bits. The payload bits may be ordered, followed by LDPC encoding to produce parity bits. The parity bits may be ordered. The resulting payload and parity bits may be mapped to the shaped amplitude bits of modulated symbols. The payload bits that are mapped to sign bits of modulated symbols may not be shaped. The payload bits that are mapped to the most significant bits (e.g., 1, 2, or all) of the amplitude bits of modulated symbols may be shaped. The remaining payload bits (if any) and parity bits that are mapped to least significant amplitude bits of modulated symbols may not be shaped. To increase the quantity of shaped amplitude bits for better performance, parity bits (e.g., LDPC parity bits) may be mapped to the sign bits of modulated symbols.

TABLE 2

| Bit Index | 0 | 1 | 2 | 3 | 4 | 5 | 6 | 7 | 8 | 9 | 10 | 11 | 12 | 13 | 14 | 15 | 16 | . . . |
|---|---|---|---|---|---|---|---|---|---|---|---|---|---|---|---|---|---|---|
| Sym Index | | | | | 0 | | | | | | | 1 | | | | | 2 | . . . |
| Mod Map | Is | Qs | I1 | Q1 | I2 | Q2 | I3 | Q3 | Is | Qs | I1 | Q1 | I2 | Q2 | I3 | Q3 | Is | . . . |

Table (2) indicates a bit index corresponding to a symbol index ("Sym Index") and a modulation mapping ("Mod Map"). In Table (2), I1, Q1, I2, and Q2 correspond to shaped amplitude bits for the symbols, and Is, Qs, I3, and Q3 correspond to non-shaped amplitude bits for the symbols.

Some issues arise when utilizing a combination of error detection or correction coding with interleaving (e.g., SBPM), modulation, or PAS. Some issues to address may include how to divide payload (e.g., systematic) bits to shaped and non-shaped bits and how to determine which payload bits are shaped or not shaped. Another challenge may include how to calculate bit indices or locations at an encoder input (e.g., LDPC encoder input) that maps shaped payload bits to the shaped amplitude bits of modulated symbols (e.g., bit indices for modulation or demodulation). Approaches may be lacking for calculating bit indices or locations at an encoder input (e.g., LDPC encoder input) that maps non-shaped payload bits to sign or non-shaped amplitude bits of modulated symbols (e.g., bit indices for modulation or demodulation) or for calculating bit indices or locations at an encoder output (e.g., LDPC encoder output) that maps parity bits to the sign bits or the non-shaped amplitude bits of modulated symbols to increase a quantity of shaped amplitude bits (e.g., bit indices for modulation or demodulation). Other issues relate to performing interleaving. For instance, approaches may be lacking regarding how bit indices for both payload and parity bit ordering may be used for de-interleaving and demodulation, or for determining whether SBPM interleaving may be applicable once parity bits are mapped to sign bits of modulated symbols.

In addition to the foregoing issues, applying PAS to LDPC coding with QAM may include shaping part of the input payload (e.g., systematic) bits and mapping shaped bits to locations corresponding to the most significant amplitude bits. LDPC parity bits that are not shaped may pose a limitation of a quantity of bits that can be shaped.

An approach to an LDPC encoding scheme with PAS is described as follows. PAS may be applied by performing shaping before adding parity bits (e.g., before an LDPC encoder). For instance, operations may be performed in the following order: shaping, LDPC encoding, interleaving, and modulation mapping. Shaping may be applied to some (e.g., Some examples of the techniques described herein may provide schemes to organize shaped payload bits, non-shaped payload bits, and parity bits to allow an increased quantity of bits to be shaped for enhanced performance. Interleaving may be utilized in some aspects to enhance robustness to burst errors. For instance, interleaving schemes for enhancing bit orderings and interleaving are provided. In some approaches, permutation and row-column interleaving may be performed with a quantity of rows (e.g., Qm rows). Some approaches may utilize circular rotation and row-column interleaving with a quantity of rows (e.g., Qm rows). In some examples, permutation with alphabet row-column interleaving with fixed rows may be performed. Some aspects may include permutation and row-column interleaving with a quantity of rows (e.g., Qm rows) when punctured (e.g., LDPC punctured) columns are shaped.

One or more of the techniques described herein may be implemented in the wireless communication system 100. In some examples, a UE 115 (e.g., processing system 112), a network entity 105 (e.g., processing system 106) may perform one or more of the techniques described herein for PAS, bit mapping, bit ordering, interleaving, modulation mapping, parity bit generation, encoding, or one or more other operations.

Figure 2:
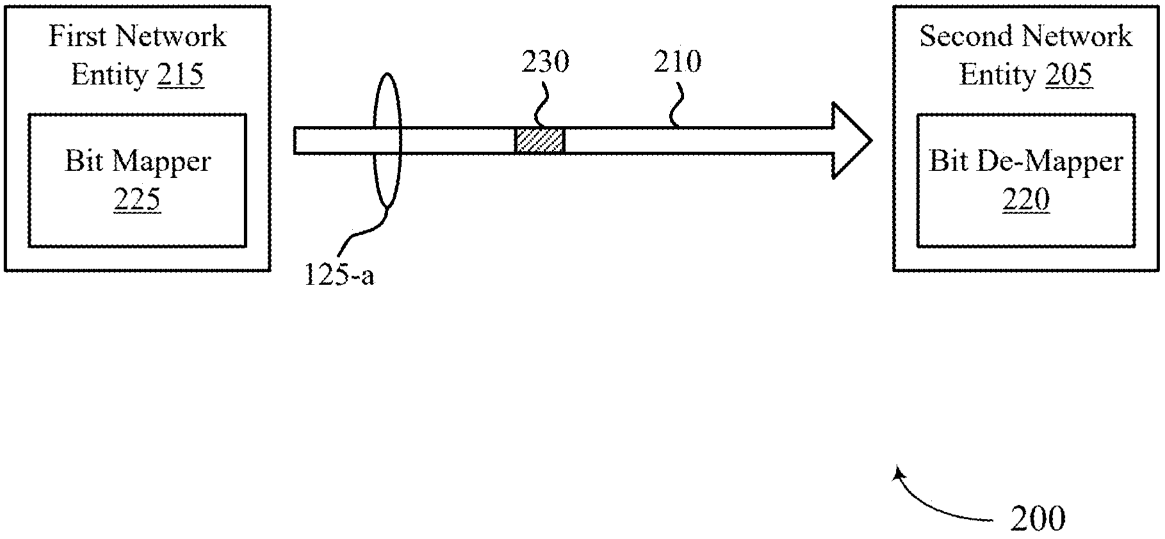
FIG. 2 shows an example of a wireless communication system that supports mapping schemes for parity codes with shaping in accordance with one or more aspects of the present disclosure.

FIG. 2 shows an example of a wireless communication system 200 that supports mapping schemes for parity codes with shaping in accordance with one or more aspects of the present disclosure. The wireless communication system 200 may implement aspects of or may be implemented by aspects of the wireless communication system 100. For example, the wireless communication system 200 includes a first network entity 215, which may be an example of a UE 115 or a network entity 105 described with respect to FIG. 1. The wireless communication system 200 also includes a second network entity 205, which may be an example of a network entity 105 or a UE 115 as described with respect to FIG. 1.

The first network entity 215 may communicate with the second network entity 205 using a link 125-*a*, which may be an example of a communication link 125 described with respect to FIG. 1. The link 125-*a* may include a unidirectional or bidirectional link that enables uplink or downlink communications. For example, the first network entity 215 may transmit or receive one or more communications 210, such as uplink control signals or uplink data signals, to the second network entity 205 using the link 125-*a*, or the second network entity 205 may transmit or receive one or more communications 210, such as downlink control signals or downlink data signals, to the first network entity 215 using the link 125-*a*. As used herein, the term "communicate," and variations thereof, may mean to output, to transmit, to obtain, to receive, or a combination thereof.

The first network entity 215 may include a processing system (e.g., the processing system 106 or the processing system 112 described with reference to FIG. 1) to perform one or more operations. For instance, the first network entity 215 may include one or more components implemented in hardware (e.g., circuitry), or a combination of hardware and instructions (e.g., one or more processors with instructions).

The first network entity 215 may generate payload bits and parity bits. For instance, the payload bits may represent data (e.g., digitized audio, video, text, numeric information, a combination thereof, or other information) for communication to the second network entity 205. The first network entity 215 may generate the parity bits based on the payload bits. For instance, the parity bits may be utilized as an error check for the corresponding payload bits. In some examples, the first network entity 215 may generate the parity bits using forward error correction (FEC) encoding, LDPC encoding, or checksums to sets of the payload bits.

The payload bits may include shaped payload bits or non-shaped payload bits. For instance, the payload bits may include zero, one, or more shaped payload bits. Additionally, or alternatively, the payload bits may include zero, one or more non-shaped payload bits. In some cases, the payload bits may include (e.g., may only include) shaped payload bits and may include zero non-shaped payload bits (e.g., may exclude non-shaped payload bits). Shaped payload bits may be bits to be mapped to one or more probabilistically shaped portions of a modulation symbol 230. For instance, some bit combinations may be generated to occur more frequently than other bit combinations for non-uniform constellation points of a shaped modulation constellation. Non-shaped payload bits may be bits (e.g., bit combinations) generated to occur with uniform probability or to be mapped to one or more non-shaped portions of a modulation symbol 230.

The first network entity 215 may perform bit mapping to map one or more non-shaped payload bits, shaped payload bits, or parity bits to bit indices corresponding to one or more modulation symbols (e.g., to the modulation symbol 230). For example, the first network entity 215 may include a bit mapper 225 implemented in hardware (e.g., circuitry) or a combination of hardware and instructions (e.g., one or more processors, a processor system, among other examples). The bit mapper 225 may perform one or more bit mapping operations. For instance, the bit mapper 225 may associate bits with bit indices, may perform bit ordering, puncturing, concatenation, permutation, or another operation(s) to arrange bits.

In some approaches, the first network entity 215 (e.g., the processing system or the bit mapper 225) may map each respective bit of the non-shaped payload bits to a respective bit index of a first subset of indices of a plurality of indices. For example, in cases where the payload bits include one or more non-shaped payload bits, each of the one or more non-shaped payload bits may be mapped to a respective bit index of the first subset of indices of the plurality of indices. In cases where the payload bits do not include non-shaped payload bit(s) (e.g., where the payload bits include zero non-shaped payload bits), the first network entity 215 may skip mapping for non-shaped payload bits, may not map any non-shaped payload bits to any bit index, or the first subset may be empty, unused, or non-existent. The plurality of indices may be an ordered arrangement of values in a range (e.g., indices 0-23, 0-47, 0-95, or another range of indices). In some examples, the plurality of indices may correspond to a data structure (e.g., an array, a vector, a table, a list, a linked list, among other examples) in memory or storage (e.g., a buffer or memory of the first network entity 215).

In some examples, portions of the plurality of indices may correspond to information (e.g., portions of information) of a modulation symbol 230. For instance, a first portion of one or more indices of the plurality of indices may correspond to sign information of the modulation symbol 230. The sign information of the modulation symbol 230 may be information representing a positive or negative sign for one or more dimensions of a modulation constellation (e.g., Is or Qs). The sign information may be non-shaped (e.g., may have a uniform probability of occurring).

A second portion of one or more indices of the plurality of indices may correspond to non-shaped information of the modulation symbol 230. The non-shaped information of the modulation symbol 230 may be information representing one or more amplitudes of a modulation constellation, where the amplitudes are non-shaped (e.g., have a uniform probability of occurring).

A third portion of one or more indices of the plurality of indices may correspond to shaped information of the modulation symbol 230. The shaped information of the modulation symbol 230 may be information representing one or more amplitudes of a modulation constellation, where the amplitudes are shaped (e.g., have a non-uniform probability of occurring). For instance, shaped amplitudes that are nearer to the origin in the modulation constellation may have a greater probability of occurring than shaped amplitudes that are farther from the origin.

The first subset of indices may include one or more indices in the plurality of indices. The first subset of indices may be continuous or non-continuous within the plurality of indices, or may include one or more ranges within the plurality of indices. In some approaches, the first subset of indices may include at least one of the first portion of one or more indices of the plurality of indices or the second portion of one or more indices of the plurality of indices. For instance, the non-shaped payload bits may be mapped to one or more indices corresponding to the sign information of the modulation symbol 230, to one or more indices corresponding to the non-shaped information of the modulation symbol 230, or to a combination thereof.

In some approaches, the first subset may include the first portion (e.g., some or all of the first portion), the second portion (e.g., some or all of the second portion), or a combination thereof, based on quantity information. The quantity information may be information indicating a first quantity of the non-shaped payload bits relative to a second quantity of bits for the first portion of one or more indices. For instance, the quantity information may indicate whether the first quantity of non-shaped payload bits is greater than, is less than, or is equal to, the second quantity of bits for the first portion of the one or more indices. In some aspects, the non-shaped payload bits may be mapped differently based on whether the first quantity of non-shaped payload bits is greater than the second quantity of bits for the first portion of one or more indices corresponding to the sign information of the modulation symbol 230.

In some examples, the first network entity 215 (e.g., a processing system of the first network entity 215 or the bit mapper 225) may determine the quantity information. For instance, to determine the quantity information, the first network entity 215 (e.g., processing system or bit mapper 225) may compare the first quantity and the second quantity.

The first network entity 215 (e.g., the processing system or the bit mapper 225) may map each respective bit of the parity bits to a respective bit index of a second subset of indices of the plurality of indices. The second subset of indices may include one or more indices in the plurality of indices. The second subset of indices may be continuous or non-continuous within the plurality of indices, or may include one or more ranges within the plurality of indices. In some approaches, the second subset of indices may include at least one of the first portion of one or more indices of the plurality of indices or the second portion of one or more indices of the plurality of indices. For instance, the parity bits may be mapped to one or more indices corresponding to the sign information of the modulation symbol 230, to one or more indices corresponding to the non-shaped information of the modulation symbol 230, or to a combination thereof.

In some approaches, the second subset may include the first portion (e.g., some or all of the first portion), the second portion (e.g., some or all of the second portion), or a combination thereof, based on the quantity information. In some aspects, the parity bits may be mapped differently based on whether the first quantity of non-shaped payload bits is greater than the second quantity of bits for the first portion of one or more indices corresponding to the sign information of the modulation symbol 230.

In some examples, the quantity information may indicate the first quantity relative to the second quantity by indicating that the first quantity is less than the second quantity. In some of these examples, the first subset of indices may include only the first portion of the one or more indices, and the second subset of indices may include the first portion of the one or more indices and the second portion of the one or more indices. For instance, the non-shaped payload bits may be mapped to one or more of the bit indices corresponding to the sign information of the modulation symbol 230. The parity bits may be mapped to one or more of the bit indices corresponding to the sign information of the modulation symbol 230 and to one or more of the bit indices corresponding to the non-shaped information of the modulation symbol 230. Examples of mappings where the first subset includes only the first portion (e.g., where the non-shaped bits are mapped only to one or more bit indices corresponding to the sign information of the modulation symbol 230) and where the second subset includes the first portion and the second portion (e.g., where the parity bits are mapped to one or more bit indices corresponding to the sign information of the modulation symbol 230 and to one or more bit indices corresponding to the non-shaped information of the modulation symbol 230) are provided with reference to FIG. 5 and FIG. 6.

In some cases, the first quantity may be less than the second quantity or may be zero (e.g., without any non-shaped payload bit). In some approaches, the first subset of indices may not include the first portion of the one or more indices, and the second subset of indices may include the first portion of the one or more indices and the second portion of the one or more indices. For instance, the non-shaped payload bits may not be mapped any of the one or more of the bit indices corresponding to the sign information of the modulation symbol 230. The parity bits may be mapped to one or more of the bit indices corresponding to the sign information of the modulation symbol 230 and to one or more of the bit indices corresponding to the non-shaped information of the modulation symbol 230.

In some examples, the quantity information may indicate the first quantity relative to the second quantity by indicating that the first quantity is equal to the second quantity. In these examples, the first subset of indices may include only the first portion of the one or more indices, and the second subset of indices may include only the second portion of the one or more indices. For instance, the non-shaped payload bits may be mapped to one or more of the bit indices corresponding to the sign information of the modulation symbol 230. The parity bits may be mapped to one or more of the bit indices corresponding to the non-shaped information of the modulation symbol 230. Accordingly, the first subset may include only the first portion (e.g., the non-shaped bits may be mapped only to one or more bit indices corresponding to the sign information of the modulation symbol 230) and the second subset may include only the second portion (e.g., the parity bits may be mapped to one or more bit indices corresponding to the non-shaped information of the modulation symbol 230).

In some examples, the quantity information may indicate the first quantity relative to the second quantity by indicating that the first quantity is greater than the second quantity. In these examples, the first subset of indices may include the first portion of the one or more indices and the second portion of the one or more indices, and the second subset of indices may include only the second portion of the one or more indices. For instance, the non-shaped payload bits may be mapped to one or more of the bit indices corresponding to the sign information of the modulation symbol 230 and to one or more of the bit indices corresponding to the non-shaped information of the modulation symbol 230. The parity bits may be mapped to one or more of the bit indices corresponding to the non-shaped information of the modulation symbol 230. An example of a mapping where the first subset includes the first portion and the second portion (e.g., where the non-shaped bits are mapped to one or more bit indices corresponding to the sign information of the modulation symbol 230 and to one or more bit indices corresponding to the non-shaped information of the modulation symbol 230) and where the second subset includes only the second portion (e.g., where the parity bits are mapped to one or more bit indices corresponding to the non-shaped information of the modulation symbol 230) is provided with reference to FIG. 4.

The first network entity 215 (e.g., the processing system or the bit mapper 225) may map each respective bit of the shaped payload bits to a respective bit index of a third subset of indices of the plurality of indices. The third subset of indices may include one or more indices in the plurality of indices. The third subset of indices may be continuous or non-continuous within the plurality of indices, or may include one or more ranges within the plurality of indices. In some approaches, the third subset of indices may include the third portion of one or more indices of the plurality of indices. For instance, the shaped payload bits may be mapped to one or more indices corresponding to the shaped information of the modulation symbol 230. In some cases, the payload bits may include shaped payload bits (e.g., only shaped payload bits) without one or more non-shaped payload bits. For instance, the one or more indices may not include a second portion, or may include the third portion (e.g., a third portion without the second portion).

In some examples, to map each respective bit of the non-shaped payload bits, to map each respective bit of the parity bits, and to map each respective bit of the shaped payload bits, the first network entity 215 (e.g., the processing system or the bit mapper 225) may perform one or more of the following operations. The first network entity 215 may puncture one or more bits of the non-shaped payload bits. For instance, puncturing one or more bits of the non-shaped payload bits may include discarding one or more bits of the non-shaped payload bits in a condition that a quantity of the non-shaped payload bits, the parity bits, and the shaped payload bits exceeds the plurality of bit indices. The first network entity 215 may concatenate the shaped payload bits to the non-shaped payload bits. For instance, the shaped payload bits may be arranged (e.g., stored or indexed) next to non-shaped payload bits. The first network entity 215 may concatenate the parity bits to the shaped payload bits. For instance, the parity bits may be arranged (e.g., stored or indexed) next to shaped payload bits. The first network entity 215 may insert one or more bits of the parity bits to one or more respective indices between the non-shaped payload bits and the shaped payload bits. For instance, permutation may be performed, where one or more of the parity bits may be inserted to one or more indices between the non-shaped payload bits and the shaped payload bits by shifting the shaped payload bits. Examples of inserting the parity bits between the non-shaped payload bits and the shaped payload bits are given with reference to FIG. 5 and FIG. 6.

In some examples, one or more first bits of the parity bits mapped to the first portion of one or more indices are associated with a higher degree in a parity encoding scheme (e.g., LDPC) than one or more second bits of the parity bits mapped to the second portion of one or more indices. For instance, the permutation or insertion of one or more parity bits between the non-shaped payload bits and the shaped payload bits may prioritize parity bits to sign bits of modulated symbols, which may provide a performance gain.

In some examples, to map each respective bit of the parity bits, the first network entity 215 (e.g., the processing system or bit mapper 225) may rotate one or more first bits of the parity bits from the second portion of one or more indices to the first portion of one or more indices. For instance, rotation may be performed, where one or more first bits of the parity bits may be rotated from the end of the second portion to the beginning of the first portion. The one or more first bits of the parity bits mapped to the first portion of one or more indices may be associated with a lower degree in a parity encoding scheme than one or more second bits of the parity bits mapped to the second portion of one or more indices. An example of bit rotation is provided with reference to FIG. 7.

In some examples, to map each respective bit of the non-shaped payload bits, to map each respective bit of the parity bits, and to map each respective bit of the shaped payload bits, the first network entity 215 (e.g., the processing system or the bit mapper 225) may perform one or more of the following operations. The first network entity 215 may puncture one or more bits of the shaped payload bits. For instance, puncturing one or more bits of the shaped payload bits may include discarding one or more bits of the shaped payload bits in a condition that a quantity of the non-shaped payload bits, the parity bits, and the shaped payload bits exceeds the plurality of bit indices. The first network entity 215 may concatenate the non-shaped payload bits to the shaped payload bits. For instance, the non-shaped payload bits may be arranged (e.g., stored or indexed) next to shaped payload bits. The first network entity 215 may concatenate the parity bits to the non-shaped payload bits. For instance, the parity bits may be arranged (e.g., stored or indexed) next to non-shaped payload bits. The first network entity 215 may exchange each respective bit of the shaped payload bits with respective bits of the non-shaped payload bits to map the shaped payload bits to the third subset of indices and to map the non-shaped payload bits to the first subset of indices. For instance, permutation may be performed, where one or more of the non-shaped bits (or parity bits) may be swapped with one or more shaped payload bits by shifting the shaped payload bits. Examples of exchanging the non-shaped payload bits with shaped payload bits are given with reference to FIG. 10 and FIG. 11.

The first network entity 215 (e.g., the processing system) may generate one or more modulation symbols (e.g., the modulation symbol 230) based on the mapped non-shaped payload bits, the parity bits, or the shaped payload bits. For instance, the first network entity 215 may include a modulation mapper (not shown in FIG. 2), where the modulation mapper may generate one or more modulation symbols (e.g., constellation point(s)) representing the mapped non-shaped payload bits, the mapped parity bits, or the mapped shaped payload bits. In some approaches, the modulation may be performed in accordance with a QAM scheme or amplitude phase shift keying (APSK) scheme.

The first network entity 215 may output (e.g., transmit) the modulation symbol 230. For instance, the first network entity 215 may wirelessly transmit (e.g., radiate) the modulation symbol via one or more antennas. In some examples, the modulation symbol 230 (e.g., interleaved bits) may include zero, one, or more shaped payload bits. Additionally or alternatively, the modulation symbol 230 (e.g., interleaved bits) may include zero, one, or more non-shaped payload bits. Additionally or alternatively, the modulation symbol 230 (e.g., interleaved bits) may include zero, one, or more parity bits.

In some examples, the first network entity 215 (e.g., the processing system) may interleave the non-shaped payload bits, the parity bits, or the shaped payload bits. For instance, the first network entity 215 may include an interleaver (not shown in FIG. 2), where the interleaver may interleave the non-shaped payload bits, the parity bits, or the shaped payload bits before modulation mapping or outputting the modulation symbol 230. The modulation symbol 230 may include interleaved bits. For instance, the interleaved bits may include at least one shaped payload bit of the shaped payload bits, at least one non-shaped payload bit of the non-shaped payload bits, and at least one parity bit of the parity bits.

In some approaches, wherein the first network entity 215 (e.g., the processing system or interleaver) may interleave one or more first bits of the non-shaped payload bits, one or more second bits of the parity bits, or one or more third bits of the shaped payload bits. The one or more first bits, one or more second bits, or one or more third bits may be interleaved based on bit location information. Bit location information may be information that arranges a data structure of bits or groups of bits relative to each other for interleaving. Examples of bit location information may include rows and columns of a table or block, indices of a multi-dimensional array, or bit address information, among other examples. Bit location information may include (e.g., correspond to) the first portion of the one or more indices of the plurality of indices, the second portion of the one or more indices of the plurality of indices, or the third portion of the one or more indices of the plurality of indices.

In some examples, the first network entity 215 (e.g., the processing system or interleaver) may interleave one or more first bits of the non-shaped payload bits based on first bit location information. The first bit location information may include the first portion of the one or more indices of the plurality of indices or the second portion of the one or more indices of the plurality of indices, or a combination thereof. For instance, the one or more first bits of the non-shaped payload bits may be interleaved to correspond to the sign information of the modulation symbol 230, to the non-shaped information of the modulation symbol 230, or to a combination thereof. In some examples, non-shaped payload bits may be excluded, or there may be zero non-shaped payload bits. Accordingly, non-shaped payload bits may not be interleaved or zero non-shaped payload bits may be interleaved.

The first network entity 215 (e.g., the processing system or interleaver) may interleave one or more second bits of the parity bits based on second bit location information. The second bit location information may include the first portion of the one or more indices of the plurality of indices, the second portion of the one or more indices of the plurality of indices, or a combination thereof. For instance, the one or more second bits of the parity bits may be interleaved to correspond to the sign information of the modulation symbol 230, to the non-shaped information of the modulation symbol 230, or to a combination thereof.

The first network entity 215 (e.g., the processing system or interleaver) may interleave one or more third bits of the shaped payload bits based on third bit location information. The third bit location information may include the third portion of the one or more indices of the plurality of indices. For instance, the one or more third bits of the shaped payload bits may be interleaved to correspond to the shaped information of the modulation symbol 230. The interleaved bits of the modulation symbol 230 may include the one or more first bits, the one or more second bits, and the one or more third bits.

In some examples, the first bit location information may correspond to one or more first rows or one or more second rows of a structure of rows and columns (e.g., a table, block, or two-dimensional array, among other examples). For instance, the first bit location information may correspond to one or more sign rows (e.g., an Is row or a Qs row, such as the Is row or the Qs row in Table (1)) or one or more non-shaped amplitude rows (such as an I3 row or a Q3 row in Table (1)). The second bit location information may correspond to the one or more first rows or the one or more second rows of the structure. For instance, the second bit location information may correspond to one or more sign rows (e.g., an Is row or a Qs row, such as the Is row or the Qs row in Table (1)) or one or more non-shaped amplitude rows (such as an I3 row or a Q3 row in Table (1)). The third bit location information may correspond to one or more third rows of the structure. For instance, the third bit location information may correspond to one or more shaped amplitude rows (such as an I1 row, a Q1 row, an I2 row, or a Q2 row in Table (1)). A quantity of the rows may correspond to a modulation order (e.g., Qm). Each of the columns may be associated with a respective modulation symbol of a plurality of modulation symbols.

In some approaches, the first network entity 215 (e.g., the processing system) may permute the non-shaped payload bits, the shaped payload bits, or the parity bits before the one or more first bits, the one or more second bits, or the one or more third bits are interleaved. For instance, permutation may be performed before interleaving.

In some examples, a quantity of bits allocated for the non-shaped information of the modulation symbol 230 may be based on a quantity of bits allocated for the shaped information of the modulation symbol 230 and a bit allocated for the sign information of the modulation symbol 230. For instance, bits may be allocated in accordance with one or more alphabets. An alphabet may be one or more bits for representing a signal (e.g., a portion of the modulation symbol 230). Examples of alphabets are provided with reference to one or more of Table (3), FIG. 8, or FIG. 9.

The second network entity 205 may include a processing system (e.g., the processing system 106 or the processing system 112 described with reference to FIG. 1) to perform one or more operations. For instance, the second network entity 205 may include one or more components implemented in hardware (e.g., circuitry), or a combination of hardware and instructions (e.g., one or more processors with instructions). The modulation symbol 230 may be communicated (e.g., output, transmitted, obtained, or received) from the first network entity 215 to the second network entity 205. The second network entity obtain (e.g., receive) the modulation symbol 230 that indicates non-shaped payload bits, shaped payload bits, or parity bits. The second network entity 205 may demodulate the modulation symbol 230. For instance, the second network entity 205 may determine a set of bits based on the modulation symbol 230 (e.g., may de-map a non-shaped bit(s), a parity bit(s), or a shaped bit(s) from a constellation point indicated by the modulation symbol 230).

The second network entity 205 may perform bit de-mapping to de-map one or more non-shaped payload bits, shaped payload bits, or parity bits from bit indices corresponding to one or more modulation symbols (e.g., to the modulation symbol 230). For example, the second network entity 205 may include a bit de-mapper 220 implemented in hardware (e.g., circuitry) or a combination of hardware and instructions (e.g., one or more processors, a processor system, among other examples). The bit de-mapper 220 may perform one or more bit de-mapping operations. For instance, the bit de-mapper 220 may perform one or more operations to reverse one or more of the operations performed by the first network entity 215 (e.g., may reverse the bit ordering, concatenation, permutation, or other operation (s) performed by the first network entity 215) or as described with reference to one or more of FIGS. 2-11.

The second network entity 205 (e.g., the processing system or the bit de-mapper 220) may de-map each respective bit of the non-shaped payload bits from a respective bit index of the first subset of indices of the plurality of indices. The first subset of indices may include, based on quantity information, a first portion of one or more indices of the plurality of indices or a second portion of one or more indices of the plurality of indices. The first portion of one or more indices may correspond to sign information of the modulation symbol 230, the second portion of one or more indices of the plurality of indices may correspond to non-shaped information of the modulation symbol 230, and the quantity information indicates a first quantity of the non-shaped payload bits relative to a second quantity of bits for the first portion of one or more indices. For instance, the non-shaped payload bits may be de-mapped from the first subset of indices (e.g., from the first portion, from the second portion, or from a combination thereof) to reverse the mapping based on the quantity information as described herein.

In some examples, the first network entity 215 may output (e.g., transmit), or the second network entity 205 may obtain (e.g., receive) an indication of the quantity information. For instance, the first network entity 215 may signal the indication of the quantity information to the second network entity 205. In some approaches, the second network entity 205 may determine the quantity information. For instance, the quantity information may be determined based on the first quantity of the non-shaped payload bits relative to the second quantity of bits for the first portion of one or more indices. The first quantity of the non-shaped payload bits or the second quantity of bits for the first portion of one or more indices may be indicated (via signaling from the first network entity 215, for instance), configured (e.g., signaled from the second network entity 205 to the first network entity 215), or specified.

The second network entity 205 (e.g., the processing system or the bit de-mapper) may de-map each respective bit of the parity bits to a respective bit index of a second subset of indices of the plurality of indices. The second subset of indices may include, based on the quantity information, the first portion of one or more indices or the second portion of one or more indices. For instance, the parity bits may be de-mapped from the second subset of indices (e.g., from the first portion, from the second portion, or from a combination thereof) to reverse the mapping based on the quantity information as described herein. For instance, the quantity information may indicate the first quantity relative to the second quantity by indicating that the first quantity is less than the second quantity. The first subset of indices may include only the first portion of the one or more indices, and the second subset of indices may include the first portion of the one or more indices and the second portion of the one or more indices. In this example, the second network entity 205 may de-map the non-shaped bit(s) from the first portion of the one or more indices, and may de-map the parity bit(s) from the first portion of the one or more indices and from the second portion of the one or more indices.

The second network entity 205 (e.g., the processing system or the bit de-mapper 220) may de-map each respective bit of the shaped payload bits from a respective bit index of a third subset of indices of the plurality of indices. The third subset of indices may include a third portion of one or more indices of the plurality of indices. The third portion of one or more indices may correspond to shaped information of the modulation symbol 230. For instance, the shaped payload bits may be de-mapped from the third subset of indices (e.g., from the third portion to reverse the mapping as described herein.

In some approaches, the second network entity 205 (e.g., the processing system) may de-interleave the non-shaped payload bits, the parity bits, or the shaped payload bits. For instance, the second network entity 205 may include a de-interleaver (not shown in FIG. 2), where the de-interleaver may de-interleave the non-shaped payload bits, the parity bits, or the shaped payload bits from the interleaved bits indicated by the modulation symbol 230. The de-interleaving may reverse one or more of the interleaving operations performed by the first network entity 215 or as described with reference to one or more of FIGS. 2-11.

In some examples, the second network entity 205 (e.g., processing system or de-interleaver) may de-interleave one or more first bits of the non-shaped payload bits based on first bit location information. The first bit location information may include the first portion of the one or more indices of the plurality of indices or the second portion of the one or more indices of the plurality of indices. The second network entity 205 may de-interleave one or more second bits of the parity bits based on second bit location information. The second bit location information may include the first portion of the one or more indices of the plurality of indices or the second portion of the one or more indices of the plurality of indices. The second network entity 205 may de-interleave one or more third bits of the shaped payload bits based on third bit location information. The third bit location information may include the third portion of the one or more indices of the plurality of indices.

In some aspects, the first bit location information may corresponds to one or more first rows or one or more second rows of the structure of rows and columns, the second bit location information may correspond to the one or more first rows or the one or more second rows of the structure, and the third bit location information may correspond to one or more third rows of the structure. The second network entity 205 may perform de-interleaving based on the structure to reverse the interleaving (if any) performed by the first network entity 215.

Figure 3:
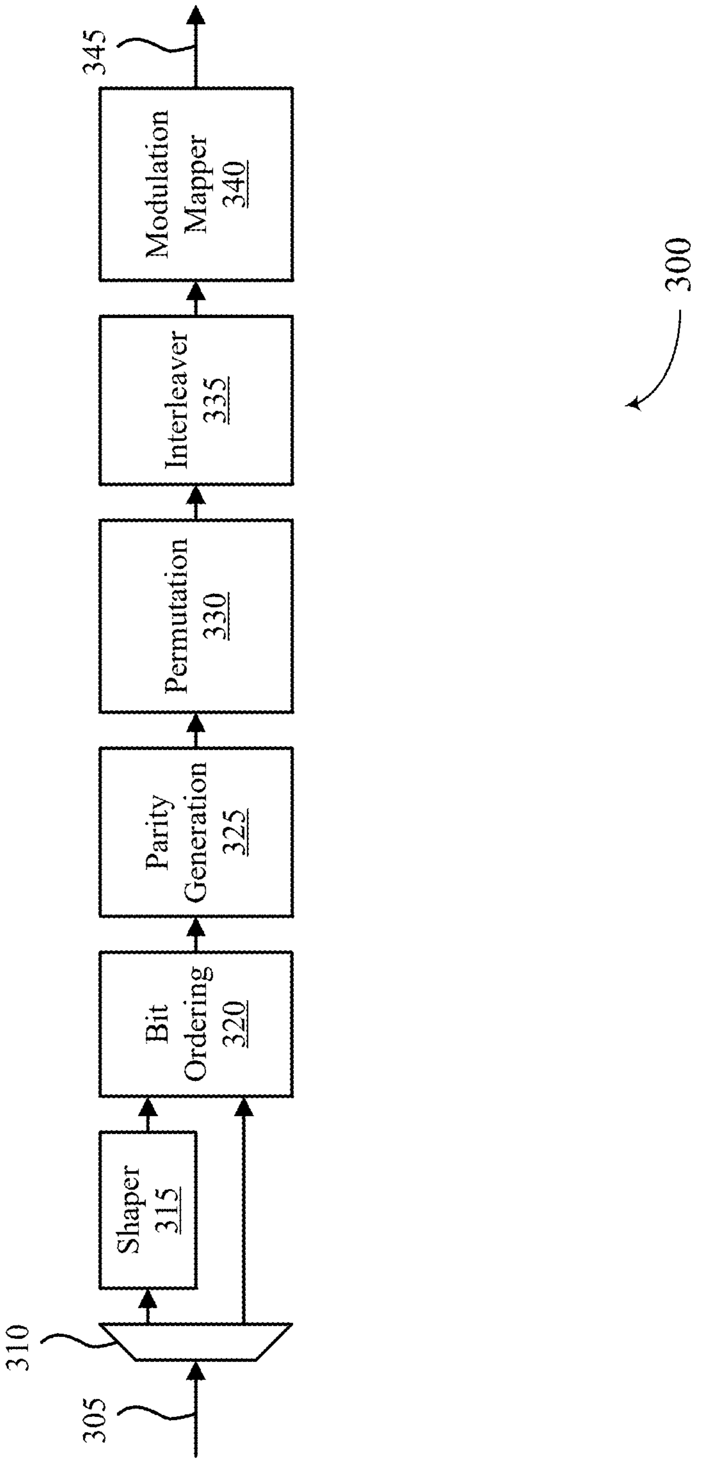
FIG. 3 shows an example of a block diagram that supports mapping schemes for parity codes with shaping in accordance with one or more aspects of the present disclosure.

FIG. 3 shows an example of a block diagram 300 that supports mapping schemes for parity codes with shaping in accordance with one or more aspects of the present disclosure. In some examples, one or more of the elements, structures, or operations described with reference to FIG. 3 may be performed by a first network entity (e.g., the first network entity 215, a UE 115, or a network entity 105) or another device that may be utilized in accordance with one or more of the techniques described herein. One or more of the elements described with reference to FIG. 3 may be implemented in hardware or a combination of hardware and instructions or code (e.g., one or more processors with instructions). For example, a demultiplexer 310, a shaper 315, a bit ordering component 320, a parity generation component 325, a permutation component 330, an interleaver 335, or a modulation mapper 340 may be implemented in hardware or a combination of hardware and instructions. In some examples, the first network entity 215 described with reference to FIG. 2 may include the demultiplexer 310, shaper 315, bit ordering component 320, parity generation component 325, permutation component 330, interleaver 335, or modulation mapper 340.

Payload bits 305 may be provided to the demultiplexer 310. The demultiplexer 310 may split the payload bits into payload bits for shaping and non-payload bits. The payload bits for shaping may be provided to the shaper 315, and the non-shaped payload bits may be provided to the bit ordering component 320. The shaper 315 may perform shaping on some of the payload bits to produce shaped payload bits, which may be provided to the bit ordering component 320.

The bit ordering component 320 may perform one or more mapping operations to produce ordered bits. For instance, the bit ordering component 320 may perform one or more of the puncturing operations, concatenating operations, indexing operations (e.g., mapping or associating one or more shaped payload bits or one or more non-shaped payload bits to one or more bit indices), or other arranging operations described with reference to FIG. 2. The ordered bits may be provided to the parity generation component 325.

The parity generation component 325 may generate one or more parity bits based on the shaped payload bits or the non-shaped payload bits as described with reference to FIG. 2. For instance, the parity generation component 325 may perform LDPC encoding or another parity generation operation. The parity bit(s) may be added to (e.g., concatenated with) the shaped payload bits or the non-shaped payload bits. The shaped payload bits, the non-shaped payload bits, or the parity bits may be provided to the permutation component 330.

The permutation component 330 may permute the non-shaped payload bits, the parity bits, or the shaped payload bits as described with reference to FIG. 2. For instance, the permutation component 330 may perform one or more of the mapping (e.g., insertion, shifting, rotation, or exchanging) operations based on the quantity information as described with reference to FIG. 2. After permutation, the non-shaped payload bits, the parity bits, or the shaped payload bits may be provided to the interleaver 335.

The interleaver 335 may perform interleaving on the non-shaped payload bits, the parity bits, or the shaped payload bits as described with reference to FIG. 2 to produce interleaved bits. For instance, the interleaver 335 may perform interleaving based on bit location information, based on a structure of rows and columns (e.g., row-column interleaving), alphabet-based interleaving, or other interleaving. The interleaved bits may be provided to the modulation mapper 340.

The modulation mapper 340 may map the interleaved bits to one or more symbols (e.g., constellation points) as described with reference to FIG. 2 to produce one or more modulation symbols 345. For instance, the modulation mapper 340 may perform QAM or APSK modulation. In some examples, the modulation symbol(s) 345 may be provided to one or more additional components (e.g., a transmitter(s), a power amplifier(s), an antenna(s)) for transmission.

One or more of the components described with reference to FIG. 3 may be utilized to perform one or more of the shaping, mapping, encoding, generating, interleaving, or other operations described with reference to FIG. 2. For instance, components described with reference to FIG. 3 may perform bit ordering and permutation of non-shaped payload bits, shaped payload bits, and parity bits before interleaving (e.g., row-column interleaving where a quantity of rows is the modulation order or alphabet-based interleaving).

Figure 4:
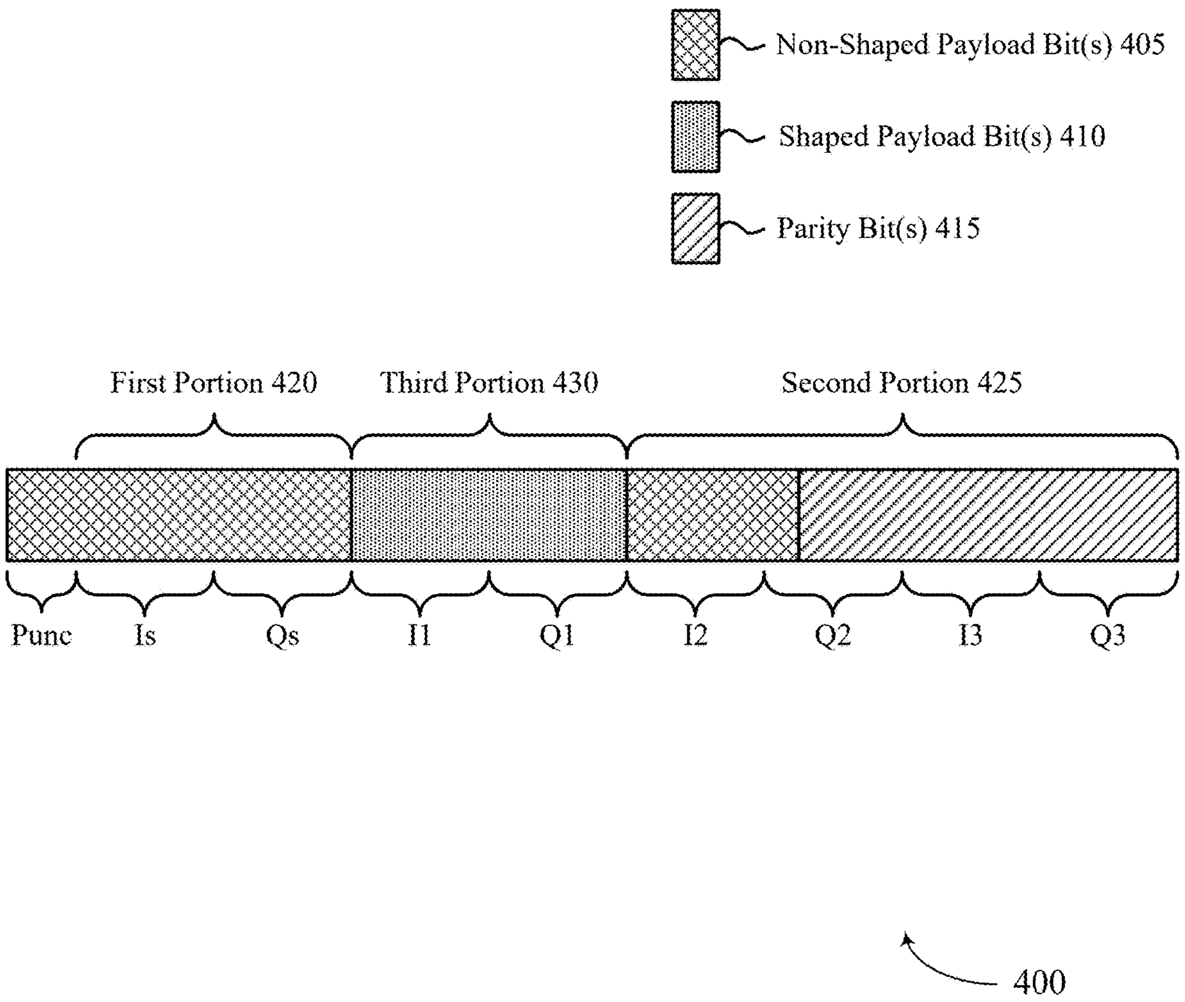
FIG. 4 shows an example of a diagram of a bit mapping that supports mapping schemes for parity codes with shaping in accordance with one or more aspects of the present disclosure.

FIG. 4 shows an example of a diagram 400 of a bit mapping that supports mapping schemes for parity codes with shaping in accordance with one or more aspects of the present disclosure. In particular, FIG. 4 illustrates examples of non-shaped payload bit(s) 405, shaped payload bit(s) 410, and parity bit(s) 415 mapped to a first portion 420, a second portion 425, or a third portion 430 of indices. The first portion 420 may be an example of the first portion of one or more indices of the plurality of indices described with reference to FIG. 2. The second portion 425 may be an example of the second portion of one or more indices of the plurality of indices described with reference to FIG. 2. The third portion 430 may be an example of the third portion of one or more indices of the plurality of indices described with reference to FIG. 2.

The first portion 420 corresponds to sign information (e.g., Is and Qs) of a modulation symbol. The second portion 425 corresponds to non-shaped information of the modulation symbol (e.g., indices corresponding to non-shaped amplitudes I2, Q2, I3, and Q3). The third portion 430 corresponds to shaped information of the modulation symbol (e.g., indices corresponding to shaped amplitudes I1 and Q1).

FIG. 4 illustrates an example of 1-bit shaping at QAM 256 with interleaving (e.g., row-column interleaving) and no permutation (e.g., where none of the parity bit(s) 515 are mapped to the sign information of the modulation symbol). In the example of FIG. 4, quantity information may indicate that a first quantity of the non-shaped payload bit(s) 405 is greater than a second quantity of bits for the first portion 420. In accordance with some of the techniques described herein, a portion of the non-shaped payload bit(s) 405 is punctured ("Punc" in FIG. 4), and the remaining non-shaped payload bit(s) 405 are mapped to first portion 420 and to part of the second portion 425 (e.g., a first subset may include the first portion 420 and the second portion 425). The parity bit(s) 415 are mapped to the second portion 425 (e.g., a second subset may include only the second portion 425). The shaped payload bit(s) 410 are mapped to the third portion 430.

Figure 5:
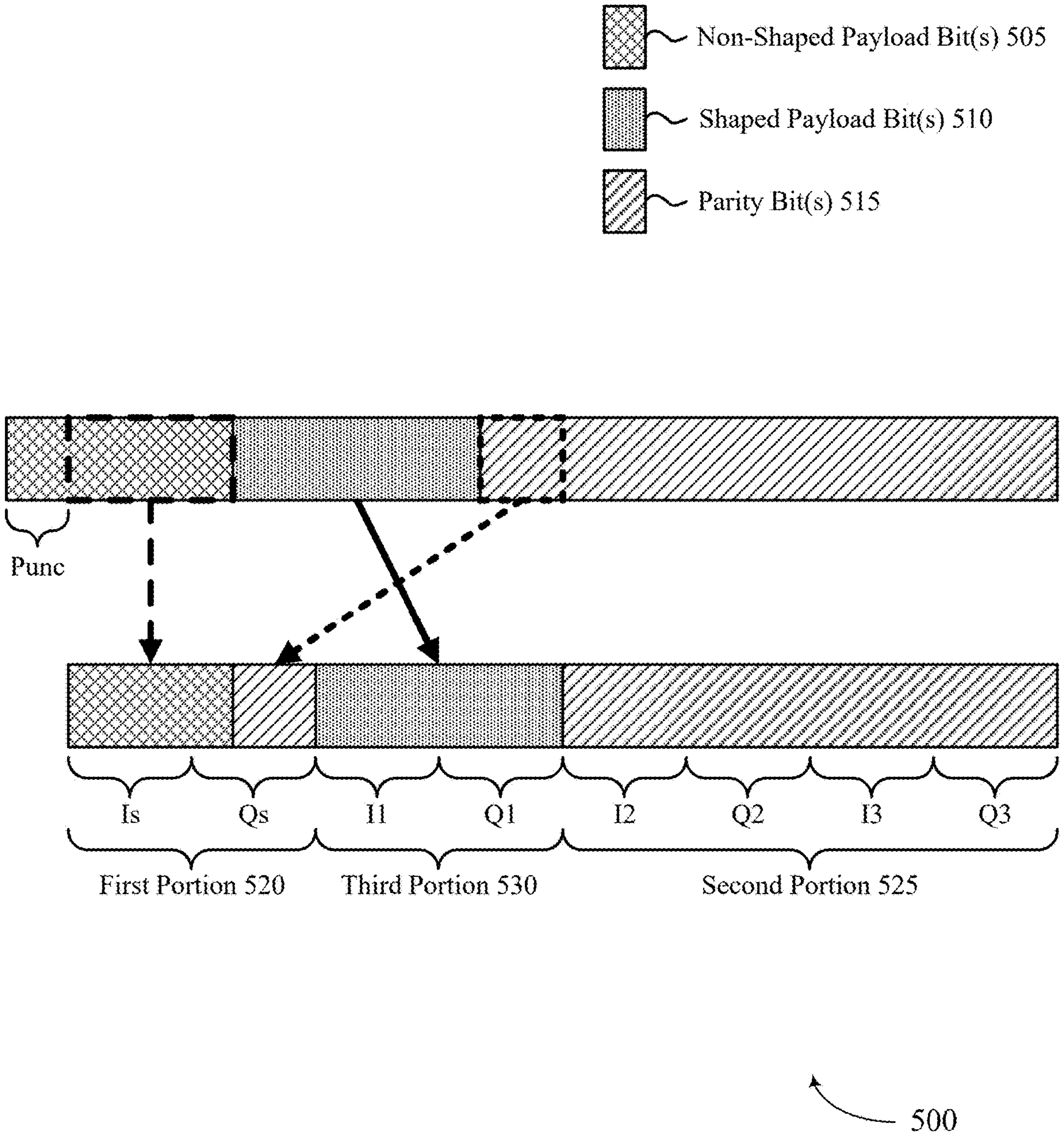
FIG. 5 shows an example of a diagram of a bit mapping that supports mapping schemes for parity codes with shaping in accordance with one or more aspects of the present disclosure.

FIG. 5 shows an example of a diagram 500 of a bit mapping that supports mapping schemes for parity codes with shaping in accordance with one or more aspects of the present disclosure. In particular, FIG. 5 illustrates examples of non-shaped payload bit(s) 505, shaped payload bit(s) 510, and parity bit(s) 515 mapped to a first portion 520, a second portion 525, or a third portion 530 of indices. The first portion 520 may be an example of the first portion of one or more indices of the plurality of indices described with reference to FIG. 2. The second portion 525 may be an example of the second portion of one or more indices of the plurality of indices described with reference to FIG. 2. The third portion 530 may be an example of the third portion of one or more indices of the plurality of indices described with reference to FIG. 2.

The first portion 520 corresponds to sign information (e.g., Is and Qs) of a modulation symbol. The second portion 525 corresponds to non-shaped information of the modulation symbol (e.g., indices corresponding to non-shaped amplitudes I2, Q2, I3, and Q3). The third portion 530 corresponds to shaped information of the modulation symbol (e.g., indices corresponding to shaped amplitudes I1 and Q1).

FIG. 5 illustrates an example of 1-bit shaping at QAM 256 with interleaving (e.g., row-column interleaving) and permutation (e.g., where some of the parity bit(s) 515 are mapped to the sign information of the modulation symbol). In the example of FIG. 5, quantity information may indicate that a first quantity of the non-shaped payload bit(s) 505 (after puncturing, for instance) is less than a second quantity of bits for the first portion 520. In accordance with some of the techniques described herein, a portion of the non-shaped payload bit(s) 505 is punctured ("Punc" in FIG. 5), and the remaining non-shaped payload bit(s) 505 are mapped to first portion 520 (e.g., a first subset may only include the first portion 520). Some of the parity bit(s) 515 are mapped to the first portion 520, and some of the parity bit(s) 515 are mapped to the second portion 525 (e.g., a second subset may include the first portion 520 and the second portion 525). The shaped payload bit(s) 510 are mapped to the third portion 530.

Figure 6:
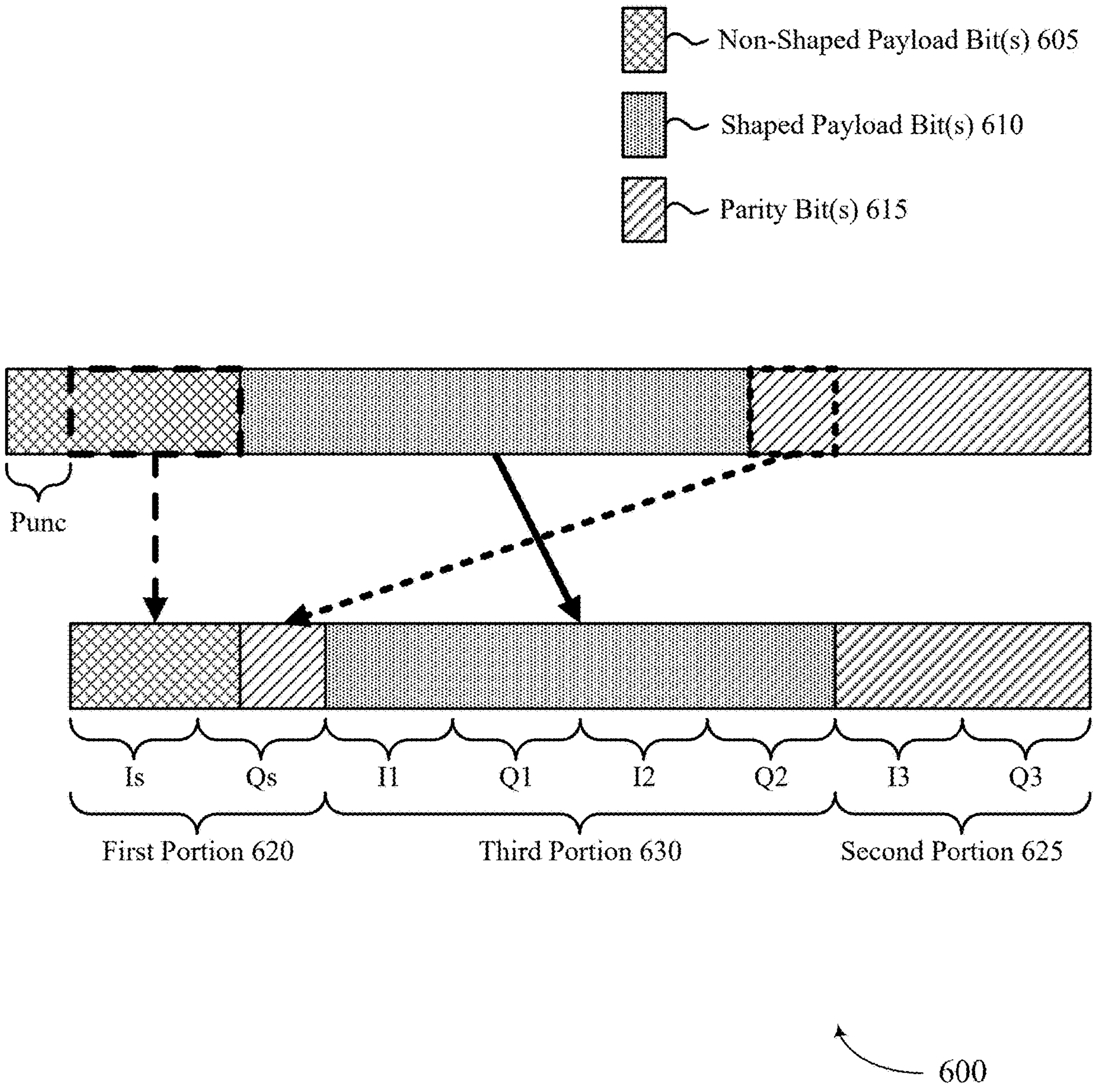
FIG. 6 shows an example of a diagram of a bit mapping that supports mapping schemes for parity codes with shaping in accordance with one or more aspects of the present disclosure.

FIG. 6 shows an example of a diagram 600 of a bit mapping that supports mapping schemes for parity codes with shaping in accordance with one or more aspects of the present disclosure. In particular, FIG. 6 illustrates examples of non-shaped payload bit(s) 605, shaped payload bit(s) 610, and parity bit(s) 615 mapped to a first portion 620, a second portion 625, or a third portion 630 of indices. The first portion 620 may be an example of the first portion of one or more indices of the plurality of indices described with reference to FIG. 2. The second portion 625 may be an example of the second portion of one or more indices of the plurality of indices described with reference to FIG. 2. The third portion 630 may be an example of the third portion of one or more indices of the plurality of indices described with reference to FIG. 2.

The first portion 620 corresponds to sign information (e.g., Is and Qs) of a modulation symbol. The second portion 625 corresponds to non-shaped information of the modulation symbol (e.g., indices corresponding to non-shaped amplitudes I3 and Q3). The third portion 630 corresponds to shaped information of the modulation symbol (e.g., indices corresponding to shaped amplitudes I1, Q1, I2, and Q2).

FIG. 6 illustrates an example of 2-bit shaping at QAM 256 with interleaving (e.g., row-column interleaving) and permutation (e.g., where some of the parity bit(s) 615 are mapped to the sign information of the modulation symbol). In the example of FIG. 6, quantity information may indicate that a first quantity of the non-shaped payload bit(s) 605 (after puncturing, for instance) is less than a second quantity of bits for the first portion 620. In accordance with some of the techniques described herein, a portion of the non-shaped payload bit(s) 605 is punctured ("Punc" in FIG. 6), and the remaining non-shaped payload bit(s) 605 are mapped to first portion 620 (e.g., a first subset may only include the first portion 620). Some of the parity bit(s) 615 are mapped to the first portion 620, and some of the parity bit(s) 615 are mapped to the second portion 625 (e.g., a second subset may include the first portion 620 and the second portion 625). The shaped payload bit(s) 610 are mapped to the third portion 630.

In some approaches, one or more of the mappings of FIG. 4, FIG. 5, or FIG. 6 may be performed in accordance with the following operations. A quantity of non-shaped payload bit(s) 605, shaped payload bit(s) 610, and parity bit(s) 615 may be calculated based on a code rate (e.g., LDPC code rate), shaping code rate, shaping bit levels, or modulation order, among other examples. To perform bit ordering, a network entity (e.g., network entity 215) may divide payload bits into two non-shaped regions or groups (e.g., a first non-shaped region and a second non-shaped region) and one shaped region or group. The first non-shaped payload region (which may be later mapped to sign information of the modulation symbol) may have a length up to the quantity of sign bits of the modulated symbols (in addition to LPDC puncture columns, for instance).

The network entity may concatenate the shaped region or group of shaped payload bit(s) 610 (which may be mapped to the shaped amplitude information of the modulation symbol) with the first non-shaped payload region. For multi-bit shaping, an alphabet-to-bit mapping may be utilized for a bit shaper that outputs shaped bits in accordance with an alphabet.

The network entity may concatenate the second non-shaped region or group of non-shaped payload bits with the remaining non-shaped payload bit(s) 605, if any (which may be later mapped to non-shaped amplitude information of the modulation symbol). The network entity may concatenate the parity bit(s) 615 to the shaped payload bit(s) 610.

The network entity may determine whether to perform permutation (e.g., whether to map the parity bit(s) 615 to the sign information of the modulation symbol). For instance, the network entity may enable permutation if a quantity of the first non-shaped region or group of non-shaped payload bit(s) 605 is less than a quantity of the sign bits (e.g., bit indices corresponding to Is and Qs) of the modulated symbol(s). Enabling permutation may also indicate or imply that the length of the second non-shaped region or group of non-shaped payload bit(s) 605 is 0. If permutation is enabled, the network entity may split the parity bit(s) 615 into two regions (e.g., a first region or group of parity bit(s) 615 and a second region or group of parity bit(s) 615). The network entity may swap the first region or group of parity bit(s) 615 with the shaped payload bit(s) 610. For instance, the first network entity may shift the shaped payload bit(s) 610 to insert the first region or group of parity bit(s) 615 between the first region or group of non-shaped payload bit(s) 605 and the shaped payload bit(s) 610.

In some examples, the network entity may perform interleaving. For instance, the network entity may perform row-column interleaving, where a quantity of rows is the modulation order.

One or more of the approaches described with reference to one or more of FIGS. 2-6 may simplify bit ordering, as the row-column interleaving may compensate for the interlaced bit indexes due to modulation mapping. Accordingly, shaped payload bits may be mapped in a single portion, and non-shaped payload bits may be mapped in up to two portions (e.g., for one or more modulation orders or all modulation orders).

Some examples of the permutation described with reference to one or more of FIGS. 2-6 may prioritize mapping parity bits with higher degree columns (e.g., the first four parity columns) to sign bits of modulated symbols. Mapping higher degree parity columns to sign bits of modulated symbols may provide a performance gain.

Some examples of the permutation described with reference to one or more of FIGS. 2-6 may preserve an SBPM property when parity bits are mapped (e.g., only mapped) to non-shaped amplitude bits. Additionally, or alternatively, the SBPM property may be preserved in scenarios when PAS is not utilized (e.g., for retransmission or a relatively low code rate, among other examples).

Some examples of the permutation described with reference to one or more of FIGS. 2-6 may provide compatibility with some other approaches because SBPM may be the same as row-column interleaving with Qm rows. Permutation may be specified in other orders for other examples. For instance, parity bits may be mapped to sign bits based on (e.g., in accordance with) the location(s) of LDPC parity columns (e.g., high-degree LDPC parity columns) in LDPC code base graphs for increased performance. In another example, a quantity of shaped bits may be balanced between I and Q of the modulation symbols to increase (e.g., maximize) multi-bit shaping by variable shaping bits (e.g., a combination of n-bit and n+1 bit shaping). Some architectures may be modified to accommodate the bit ordering and permutation described herein. In some examples, data path sharing may be enabled between difference bit ordering or permutation schemes.

Figure 7:
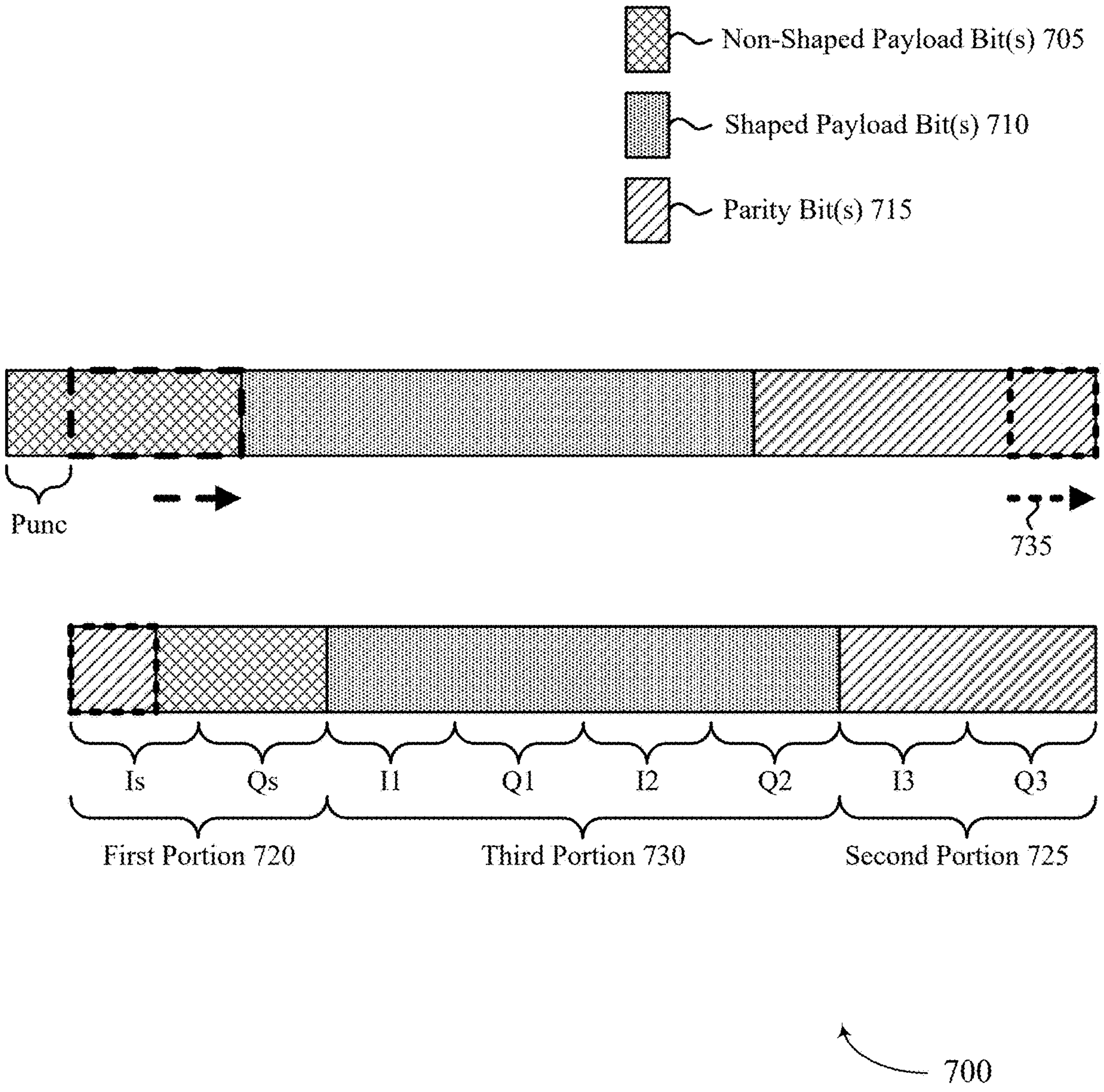
FIG. 7 shows an example of a diagram of a bit mapping that supports mapping schemes for parity codes with shaping in accordance with one or more aspects of the present disclosure.

FIG. 7 shows an example of a diagram 700 of a bit mapping that supports mapping schemes for parity codes with shaping in accordance with one or more aspects of the present disclosure. In particular, FIG. 7 illustrates examples of non-shaped payload bit(s) 705, shaped payload bit(s) 710, and parity bit(s) 715 mapped to a first portion 720, a second portion 725, or a third portion 730 of indices. The first portion 720 may be an example of the first portion of one or more indices of the plurality of indices described with reference to FIG. 2. The second portion 725 may be an example of the second portion of one or more indices of the plurality of indices described with reference to FIG. 2. The third portion 730 may be an example of the third portion of one or more indices of the plurality of indices described with reference to FIG. 2.

The first portion 720 corresponds to sign information (e.g., Is and Qs) of a modulation symbol. The second portion 725 corresponds to non-shaped information of the modulation symbol (e.g., indices corresponding to non-shaped amplitudes I3 and Q3). The third portion 730 corresponds to shaped information of the modulation symbol (e.g., indices corresponding to shaped amplitudes I1, Q1, I2, and Q2).

FIG. 7 illustrates an example of 2-bit shaping at QAM 256 with interleaving (e.g., row-column interleaving) and circular rotation (e.g., permutation or where some of the parity bit(s) 715 are mapped to the sign information of the modulation symbol). In the example of FIG. 7, quantity information may indicate that a first quantity of the non-shaped payload bit(s) 705 (after puncturing, for instance) is less than a second quantity of bits for the first portion 720. In accordance with some of the techniques described herein, a portion of the non-shaped payload bit(s) 705 is punctured ("Punc" in FIG. 7), and the remaining non-shaped payload bit(s) 705 are mapped to first portion 720 (e.g., a first subset may only include the first portion 720). Some of the parity bit(s) 715 are mapped to the first portion 720, and some of the parity bit(s) 715 are mapped to the second portion 725 (e.g., a second subset may include the first portion 720 and the second portion 725). The shaped payload bit(s) 710 are mapped to the third portion 730.

In some approaches, the mapping of FIG. 7 may be performed in accordance with the following operations. The approach of FIG. 7 may be similar to (or offer some similar characteristic as) the approach of FIG. 6, wherein the permutation is performed with a circular rotation 735. By circular rotation towards the end of the parity bit(s) 715 (e.g., to the right in FIG. 7), one or more of the parity bit(s) 715 at the end is rotated to the beginning of the non-shaped payload bit(s) 705 to map some of the parity bit(s) 715 to the sign information of the modulated symbol(s). Circular rotation may be simpler than some kinds of permutation in terms of specification or implementation. In some examples, the end (e.g., tail) of the parity bit(s) 715 may be degree-1 parity. Mapping degree-1 parity bits to the sign information of modulated symbol(s) (e.g., with an increased protection), may provide less performance gain than the approach described with reference to FIG. 6.

Figure 8:
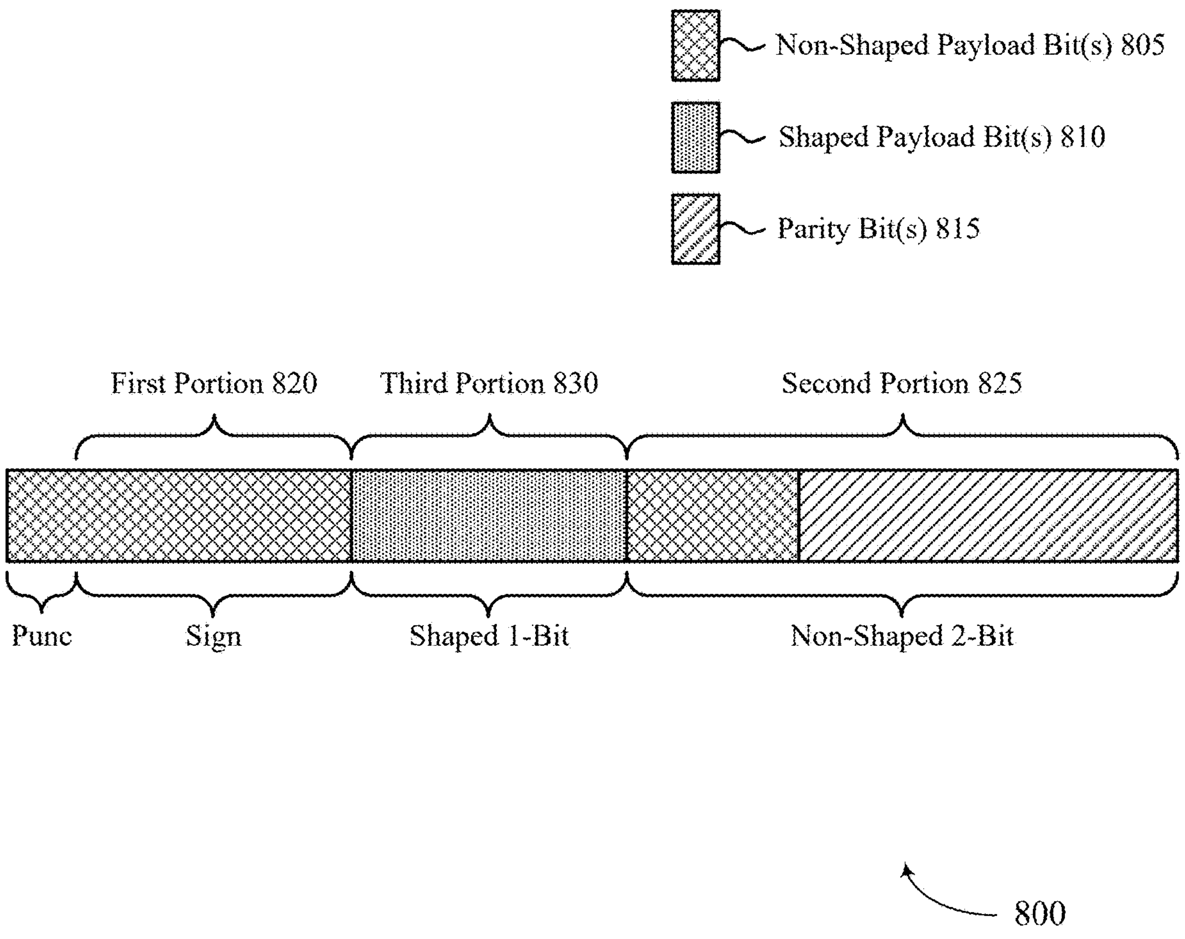
FIG. 8 shows an example of a diagram of a bit mapping that supports mapping schemes for parity codes with shaping in accordance with one or more aspects of the present disclosure.

FIG. 8 shows an example of a diagram 800 of a bit mapping that supports mapping schemes for parity codes with shaping in accordance with one or more aspects of the present disclosure. In particular, FIG. 8 illustrates examples of non-shaped payload bit(s) 805, shaped payload bit(s) 810, and parity bit(s) 815 mapped to a first portion 820, a second portion 825, or a third portion 830 of indices. The first portion 820 may be an example of the first portion of one or more indices of the plurality of indices described with reference to FIG. 2. The second portion 825 may be an example of the second portion of one or more indices of the plurality of indices described with reference to FIG. 2. The third portion 830 may be an example of the third portion of one or more indices of the plurality of indices described with reference to FIG. 2.

The first portion 820 corresponds to sign information (e.g., a 1-bit alphabet) of a modulation symbol. The second portion 825 corresponds to non-shaped information (e.g., a non-shaped 2-bit alphabet) of the modulation symbol. The third portion 830 corresponds to shaped information (e.g., a shaped 1-bit alphabet) of the modulation symbol.

FIG. 8 illustrates an example of 1-bit shaping at QAM 256 with interleaving (e.g., alphabet-based row-column interleaving) and no permutation (e.g., where none of the parity bit(s) 515 are mapped to the sign information of the modulation symbol). Additional detail regarding the alphabets is given with reference to FIG. 9. In the example of FIG. 8, quantity information may indicate that a first quantity of the non-shaped payload bit(s) 805 is greater than a second quantity of bits for the first portion 820. In accordance with some of the techniques described herein, a portion of the non-shaped payload bit(s) 805 is punctured ("Punc" in FIG. 8), and the remaining non-shaped payload bit(s) 805 are mapped to first portion 820 and to part of the second portion 825 (e.g., a first subset may include the first portion 820 and the second portion 825). The parity bit(s) 815 are mapped to the second portion 825 (e.g., a second subset may include only the second portion 825). The shaped payload bit(s) 810 are mapped to the third portion 830.

Figure 9:
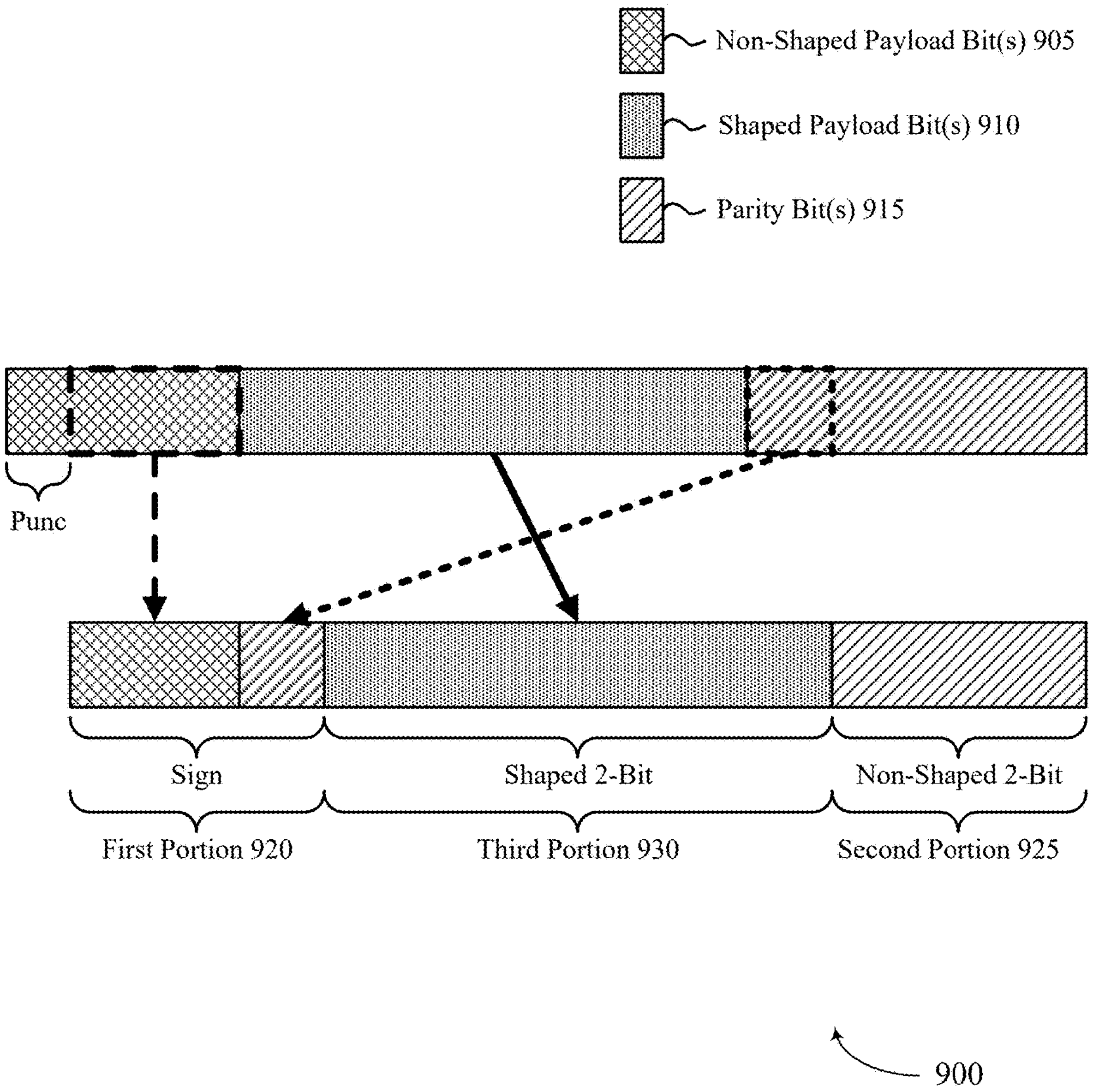
FIG. 9 shows an example of a diagram of a bit mapping that supports mapping schemes for parity codes with shaping in accordance with one or more aspects of the present disclosure.

FIG. 9 shows an example of a diagram 900 of a bit mapping that supports mapping schemes for parity codes with shaping in accordance with one or more aspects of the present disclosure. In particular, FIG. 9 illustrates examples of non-shaped payload bit(s) 905, shaped payload bit(s) 910, and parity bit(s) 915 mapped to a first portion 920, a second portion 925, or a third portion 930 of indices. The first portion 920 may be an example of the first portion of one or more indices of the plurality of indices described with reference to FIG. 2. The second portion 925 may be an example of the second portion of one or more indices of the plurality of indices described with reference to FIG. 2. The third portion 930 may be an example of the third portion of one or more indices of the plurality of indices described with reference to FIG. 2. The first portion 920 corresponds to sign information (e.g., a 1-bit alphabet) of a modulation symbol. The second portion 925 corresponds to non-shaped information (e.g., a non-shaped 2-bit alphabet) of the modulation symbol. The third portion 930 corresponds to shaped information (e.g., a shaped 2-bit alphabet) of the modulation symbol.

FIG. 9 illustrates an example of 2-bit shaping at QAM 256 with interleaving (e.g., alphabet-based row-column interleaving) and permutation (e.g., where some of the parity bit(s) 915 are mapped to the sign information of the modulation symbol). In the example of FIG. 9, quantity information may indicate that a first quantity of the non-shaped payload bit(s) 905 (after puncturing, for instance) is less than a second quantity of bits for the first portion 920. In accordance with some of the techniques described herein, a portion of the non-shaped payload bit(s) 905 is punctured ("Punc" in FIG. 9), and the remaining non-shaped payload bit(s) 905 are mapped to first portion 920 (e.g., a first subset may only include the first portion 920). Some of the parity bit(s) 915 are mapped to the first portion 920, and some of the parity bit(s) 915 are mapped to the second portion 925 (e.g., a second subset may include the first portion 920 and the second portion 925). The shaped payload bit(s) 910 are mapped to the third portion 930.

In some approaches, one or more of the mappings of FIG. 8 or FIG. 9 may be performed in accordance with the following operations. An n-bit alphabet may be defined as a signal with $2^n$ levels. Each QAM modulated symbol may include 2 sign alphabets, 2 shaped amplitude alphabets, or 2 non-shaped amplitude alphabets. The quantity 2 may correspond to I and Q dimensions of the modulation constellation. In some approaches, an alphabet for the sign information may be a 1-bit alphabet. A quantity of bits for the shaped amplitude alphabet may be a quantity of shaping bits (Ns). A quantity of bits for the non-shaped amplitude alphabet may be the remaining bits (e.g., Qm/2−Ns−1). In some approaches, the first network device may perform bit ordering and permutation for non-shaped payload bits, shaped payload bits, and parity bits before performing alphabet-based row-column interleaving.

In some examples, a quantity of rows for row-column interleaving may be 6. Bit ordering and permutation may be performed as similarly described with reference to FIG. 2. The 6 rows may be mapped based on a sign value of I and Q dimensions, a shaped amplitude alphabet of I and Q dimensions, and a non-shaped amplitude alphabet of I and Q dimensions. After interleaving, each column may correspond to one modulated symbol. When the quantity of bits per alphabet types is different, the quantity of bits in each column may differ.

An example of alphabet-based row-column interleaving with six modulated symbols at QAM 256 is provided in Table (3). The term "symbol" is abbreviated as "sym," and the term "amplitude" is abbreviated as "Amp" in Table (3) for convenience.

TABLE 3

| bit index | | sym 0 | sym 1 | sym 2 | sym 3 | sym 4 | sym 5 |
|---|---|---|---|---|---|---|---|
| Sign | I | 0 | 1 | 2 | 3 | 4 | 5 |
| | Q | 6 | 7 | 8 | 9 | 10 | 11 |
| Shaped | I | 12, 13 | 14, 15 | 16, 17 | 18, 19 | 20, 21 | 22, 23 |
| Amp Alphabet | Q | 24, 25 | 26, 27 | 28, 29 | 30, 31 | 32, 33 | 34, 35 |
| Non- | I | 36 | 37 | 38 | 39 | 40 | 41 |
| Shaped Amp Alphabet | Q | 42 | 43 | 44 | 45 | 46 | 47 |

As illustrated in Table (3), bits with bit indices 0-47 are interleaved for mapping to bit indices corresponding to in-phase (I) and quadrature (Q) sign and amplitude ("amp") portions of the modulation symbols.

One or more of the approaches described with reference to one or more of FIG. 2, FIG. 8, or FIG. 9 may simplify bit ordering, as the row-column interleaving may compensate for the interlaced bit indexes due to modulation mapping. Accordingly, shaped payload bits may be mapped in a single portion, and non-shaped payload bits may be mapped in up to two portions (e.g., for one or more modulation orders or all modulation orders).

Some examples of the permutation described with reference to one or more of FIG. 2, FIG. 8, or FIG. 9 may prioritize mapping parity bits with higher degree columns (e.g., the first four parity columns) to sign bits of modulated symbols. Mapping higher degree parity columns to sign bits of modulated symbols may provide a performance gain.

Some examples of the permutation described with reference to one or more of FIG. 2, FIG. 8, or FIG. 9 may provide mapping a multi-bit shaped amplitude alphabet in interleaving, which may simplify shaping (because an alphabet-to-bit mapping may not be utilized).

Some examples of the permutation described with reference to one or more of FIG. 2, FIG. 8, or FIG. 9 may allow for permutation to be performed in other orders for other examples. For instance, parity bits may be mapped to sign bits based on (e.g., in accordance with) the location(s) of LDPC parity columns (e.g., high-degree LDPC parity columns) in LDPC code base graphs for increased performance. In another example, a quantity of shaped bits may be balanced between I and Q of the modulation symbols to increase (e.g., maximize) multi-bit shaping by variable shaping bits (e.g., a combination of n-bit and n+1 bit shaping). An alphabet-based row-column interleaver in a receiver may be implemented in hardware with a relatively small circuitry area. In some examples, a quantity of rows for row-column interleaving may be reduced to three for approaches where I and Q are not interleaved, which may provide further area reduction.

Figure 10:
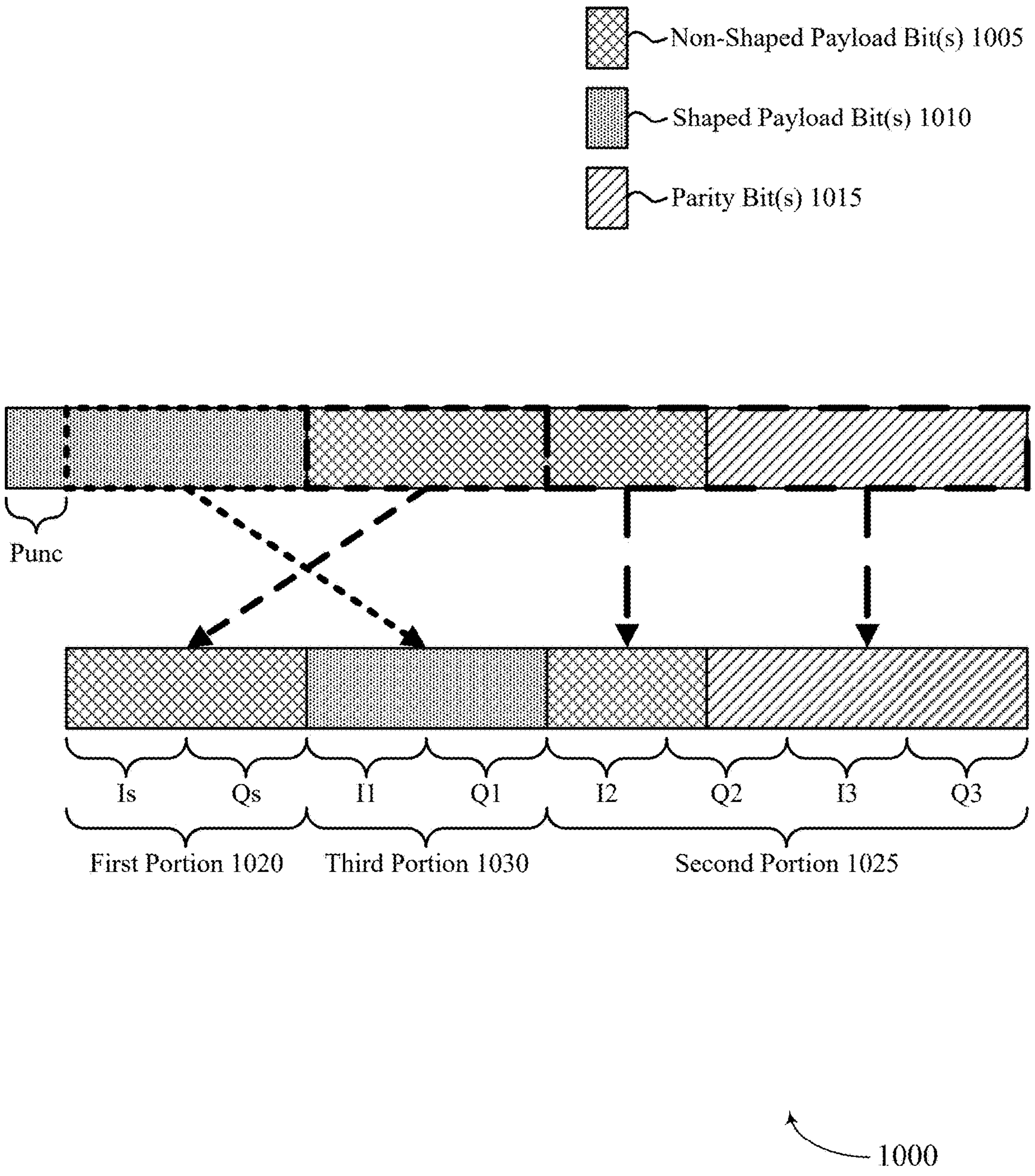
FIG. 10 shows an example of a diagram of a bit mapping that supports mapping schemes for parity codes with shaping in accordance with one or more aspects of the present disclosure.

FIG. 10 shows an example of a diagram 1000 of a bit mapping that supports mapping schemes for parity codes with shaping in accordance with one or more aspects of the present disclosure. In particular, FIG. 10 illustrates examples of non-shaped payload bit(s) 1005, shaped payload bit(s) 1010, and parity bit(s) 1015 mapped to a first portion 1020, a second portion 1025, or a third portion 1030 of indices. The first portion 1020 may be an example of the first portion of one or more indices of the plurality of indices described with reference to FIG. 2. The second portion 1025 may be an example of the second portion of one or more indices of the plurality of indices described with reference to FIG. 2. The third portion 1030 may be an example of the third portion of one or more indices of the plurality of indices described with reference to FIG. 2.

The first portion 1020 corresponds to sign information (e.g., Is and Qs) of a modulation symbol. The second portion 1025 corresponds to non-shaped information of the modulation symbol (e.g., indices corresponding to non-shaped amplitudes I2, Q2, I3, and Q3). The third portion 1030 corresponds to shaped information of the modulation symbol (e.g., indices corresponding to shaped amplitudes I1 and Q1).

FIG. 10 illustrates an example where some shaped payload bit(s) 1010 are punctured. The example also illustrates 1-bit shaping at QAM 256 with interleaving (e.g., row-column interleaving) and permutation. In the example of FIG. 10, quantity information may indicate that a first quantity of the non-shaped payload bit(s) 1005 is less than a second quantity of bits for the first portion 1020. In accordance with some of the techniques described herein, a portion of the shaped payload bit(s) 1010 is punctured ("Punc" in FIG. 10), and the remaining shaped payload bit(s) 1010 are mapped to the third portion 1030. Some of the non-shaped payload bit(s) 1005 are mapped to the first portion 1020, and some of the non-shaped payload bit(s) 1005 are mapped to the second portion 1025 (e.g., a first subset may include the first portion 1020 and the second portion 1025). The parity bit(s) 1015 are mapped to the second portion 1025 (e.g., a second subset may only include the second portion 1025).

Figure 11:
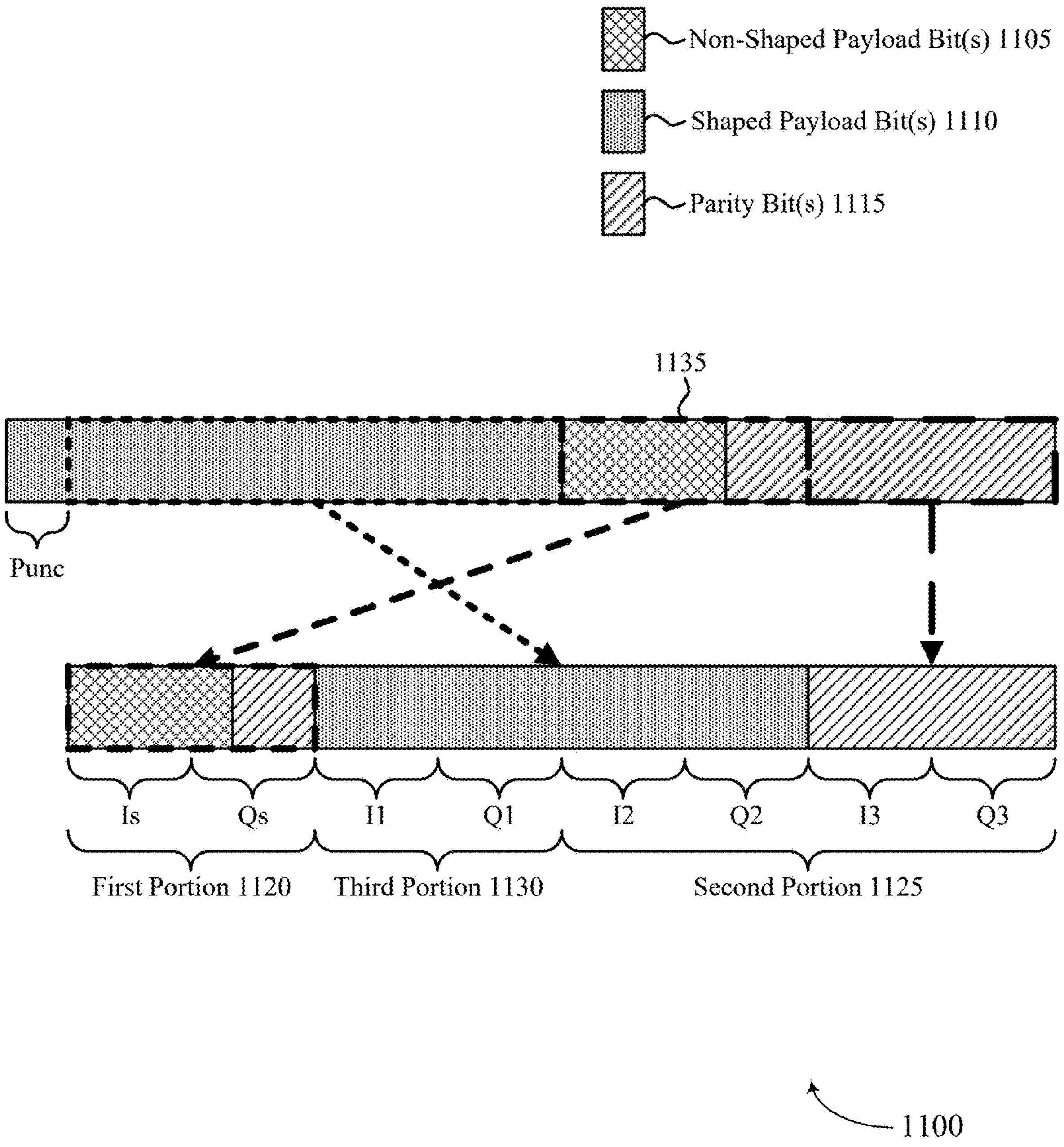
FIG. 11 shows an example of a diagram of a bit mapping that supports mapping schemes for parity codes with shaping in accordance with one or more aspects of the present disclosure.

FIG. 11 shows an example of a diagram 1100 of a bit mapping that supports mapping schemes for parity codes with shaping in accordance with one or more aspects of the present disclosure. In particular, FIG. 11 illustrates examples of non-shaped payload bit(s) 1105, shaped payload bit(s) 1110, and parity bit(s) 1115 mapped to a first portion 1120, a second portion 1125, or a third portion 1130 of indices. The first portion 1120 may be an example of the first portion of one or more indices of the plurality of indices described with reference to FIG. 2. The second portion 1125 may be an example of the second portion of one or more indices of the plurality of indices described with reference to FIG. 2. The third portion 1130 may be an example of the third portion of one or more indices of the plurality of indices described with reference to FIG. 2.

The first portion 1120 corresponds to sign information (e.g., Is and Qs) of a modulation symbol. The second portion 1125 corresponds to non-shaped information of the modulation symbol (e.g., indices corresponding to non-shaped amplitudes I3 and Q3). The third portion 1130 corresponds to shaped information of the modulation symbol (e.g., indices corresponding to shaped amplitudes I1, Q1, I2, and Q2).

FIG. 11 illustrates an example where some shaped payload bit(s) 1110 are punctured. The example also illustrates 2-bit shaping at QAM 256 with interleaving (e.g., row-column interleaving) and permutation. In the example of FIG. 11, quantity information may indicate that a first quantity of the non-shaped payload bit(s) 1105 is less than a second quantity of bits for the first portion 1120. In accordance with some of the techniques described herein, a portion of the shaped payload bit(s) 1110 is punctured ("Punc" in FIG. 11), and the remaining shaped payload bit(s) 1110 are mapped to the third portion 1130. The non-shaped payload bit(s) 1105 are mapped to the first portion 1120 (e.g., a first subset may only include the first portion 1120. Some of the parity bit(s) 1115 are mapped to the first portion 1120, and some of the parity bit(s) 1115 are mapped to the second portion 1125 (e.g., a second subset may include the first portion 1120 and the second portion 1125).

In some approaches, one or more of the mappings of FIG. 10 or FIG. 11 may be performed in accordance with the following operations. Bit ordering or permutation may be utilized for other mappings where the punctured payload column is shaped (instead of non-shaped). To perform bit ordering, a network entity (e.g., network entity 215) may divide payload bits into one shaped region or group (e.g., a first non-shaped region) and one non-shaped region or group. The first non-shaped payload region (which may be later mapped to sign information of the modulation symbol) may have a length up to the quantity of sign bits of the modulated symbols (in addition to LPDC puncture columns, for instance).

The network entity may concatenate the shaped region or group of shaped payload bit(s) 1110 (which may be mapped to the shaped amplitude information of the modulation symbol) with the first non-shaped payload region. The network entity may concatenate the parity bit(s) 1115 to the shaped payload bit(s) 1110.

The network entity may perform permutation (e.g., may map the one or more of the non-shaped payload bit(s) or one or more of the parity bit(s) 1115 to the sign information of the modulation symbol). For instance, the network entity may form a region 1135 with a length of the bits corresponding to the sign information (e.g., Is and Qs, or the first portion 1120) from a beginning of the non-shaped payload bit(s) 1105. The region 1135 may include one or more of the parity bit(s) 1115 when a quantity of the non-shaped payload bit(s) 1105 is less than a quantity of the bits corresponding to the sign information of the modulated symbol(s). The network entity may swap the region 1135 with the shaped payload bit(s) 1110 (excluding LDPC puncture columns, for example). For instance, the first network entity may shift the shaped payload bit(s) 1110 to map the region 1135 to the first portion 1120.

In some examples, the network entity may perform interleaving. For instance, the network entity may perform row-column interleaving, where a quantity of rows is the modulation order or alphabet-based interleaving.

One or more of the approaches described with reference to one or more of FIG. 2, FIG. 10, or FIG. 11 may simplify bit ordering, as the row-column interleaving may compensate for the interlaced bit indexes due to modulation mapping.

Accordingly, shaped payload bits may be mapped in a single portion, and non-shaped payload bits may be mapped in up to two portions (e.g., for one or more modulation orders or all modulation orders).

Some examples of the permutation described with reference to one or more of FIG. 2, FIG. 10, or FIG. 11 may prioritize mapping parity bits with higher degree columns (e.g., the first four parity columns) to sign bits of modulated symbols. Mapping higher degree parity columns to sign bits of modulated symbols may provide a performance gain.

Some examples of the permutation described with reference to one or more of FIG. 2, FIG. 10, or FIG. 11 may map the non-shaped payload bits in one portion. Some examples of the permutation described with reference to one or more of FIG. 2, FIG. 10, or FIG. 11 may not preserve an SBPM property.

Some examples of the permutation described with reference to one or more of FIG. 2, FIG. 10, or FIG. 11 may provide compatibility with some other approaches because SBPM may be the same as row-column interleaving with Qm rows.

Permutation may be specified in other orders for other examples. For instance, parity bits may be mapped to sign bits based on (e.g., in accordance with) the location(s) of LDPC parity columns (e.g., high-degree LDPC parity columns) in LDPC code base graphs for increased performance. In another example, a quantity of shaped bits may be balanced between I and Q of the modulation symbols to increase (e.g., maximize) multi-bit shaping by variable shaping bits (e.g., a combination of n-bit and n+1 bit shaping). Some architectures may be modified to accommodate the bit ordering and permutation described herein. In some examples, data path sharing may be enabled between difference bit ordering or permutation schemes. Some examples of the approaches described with reference to FIG. 10 or FIG. 11 may provide one or more similar characteristic as one or more of the approaches described with reference to FIG. 8 or FIG. 9.

Figure 12:
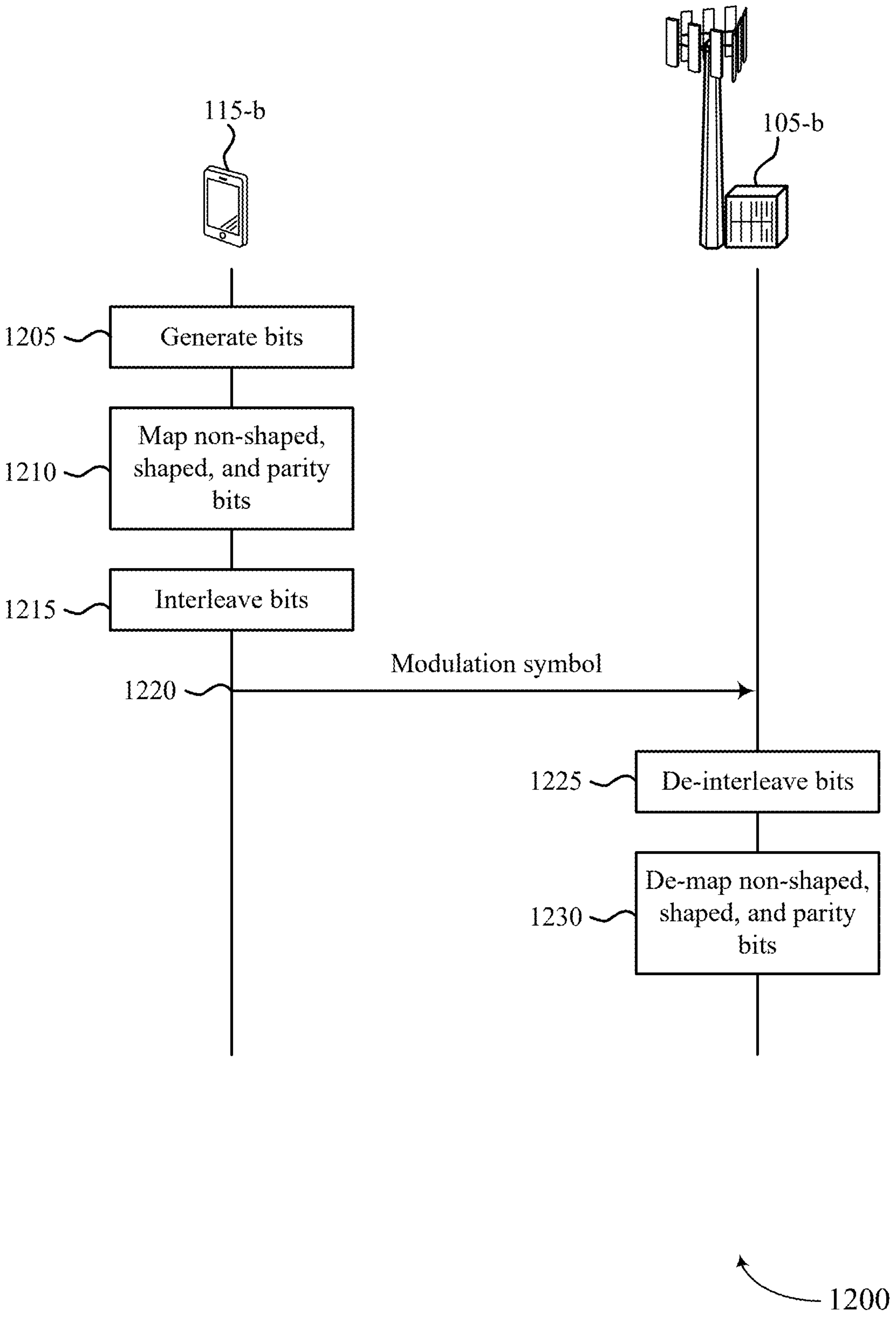
FIG. 12 shows an example of a process flow that supports mapping schemes for parity codes with shaping in accordance with one or more aspects of the present disclosure.

FIG. 12 shows an example of a process flow 1200 that supports mapping schemes for parity codes with shaping in accordance with one or more aspects of the present disclosure. A wireless communication system may include a UE 115-*b* and a network entity 105-*b*. The UE 115-*b* may be an example of the UEs 115, the first network entity 215, or the second network entity 205, or the network entity 105-*b* may be an example of the network entities 105, the second network entity 205, or the first network entity 215, as described herein.

In the following description of the process flow 1200, the communications between the network entity 105-*b* and the UE 115-*b* may be transmitted in a different order than the example order shown, or the operations performed by the network entity 105-*b* and the UE 115-*b* may be performed in different orders or at different times. One or more operations may be omitted from the process flow 1200, or one or more other operations may be added to the process flow 1200. Although some operations or signaling may be shown to occur at different times for discussion purposes, these operations may actually occur at the same time or in overlapping time periods in some examples.

At 1205, the UE 115-*b* may generate payload bits. For example, the UE 115-*b* may generate payload bits as described with reference to FIG. 2.

At 1210, the UE 115-*b* may map non-shaped payload bits, shaped payload bits, and parity bits to a plurality of indices. For example, the UE 115-*b* may map the non-shaped payload bits, shaped payload bits, and parity bits to the plurality of indices as described with reference to one or more of FIGS. 2-11.

At 1215, the UE 115-*b* may interleave bits. For example, the UE 115-*b* may interleave the non-shaped payload bits, shaped payload bits, and parity bits as described with reference to one or more of FIGS. 2-11.

At 1220, the UE 115-*b* may output (e.g., transmit), or the network entity 105-*b* may obtain (e.g., receive) a modulation symbol. The modulation symbol may include or indicate the non-shaped payload bits, shaped payload bits, and parity bits. For example, the UE 115-*b* and the network entity 105-*b* may communicate the modulation symbol as described with reference to one or more of FIG. 2 or FIG. 3.

At 1225, the network entity 105-*b* may de-interleave the non-shaped payload bits, shaped payload bits, and parity bits from a plurality of indices. For example, the network entity 105-*b* may de-interleave the non-shaped payload bits, shaped payload bits, and parity bits from the plurality of indices as described with reference to FIG. 2.

At 1230, the network entity 105-*b* may de-map non-shaped payload bits, shaped payload bits, and parity bits to a plurality of indices. For example, the network entity 105-*b* may de-map the non-shaped payload bits, shaped payload bits, and parity bits from the plurality of indices as described with reference to FIG. 2.

Figure 13:
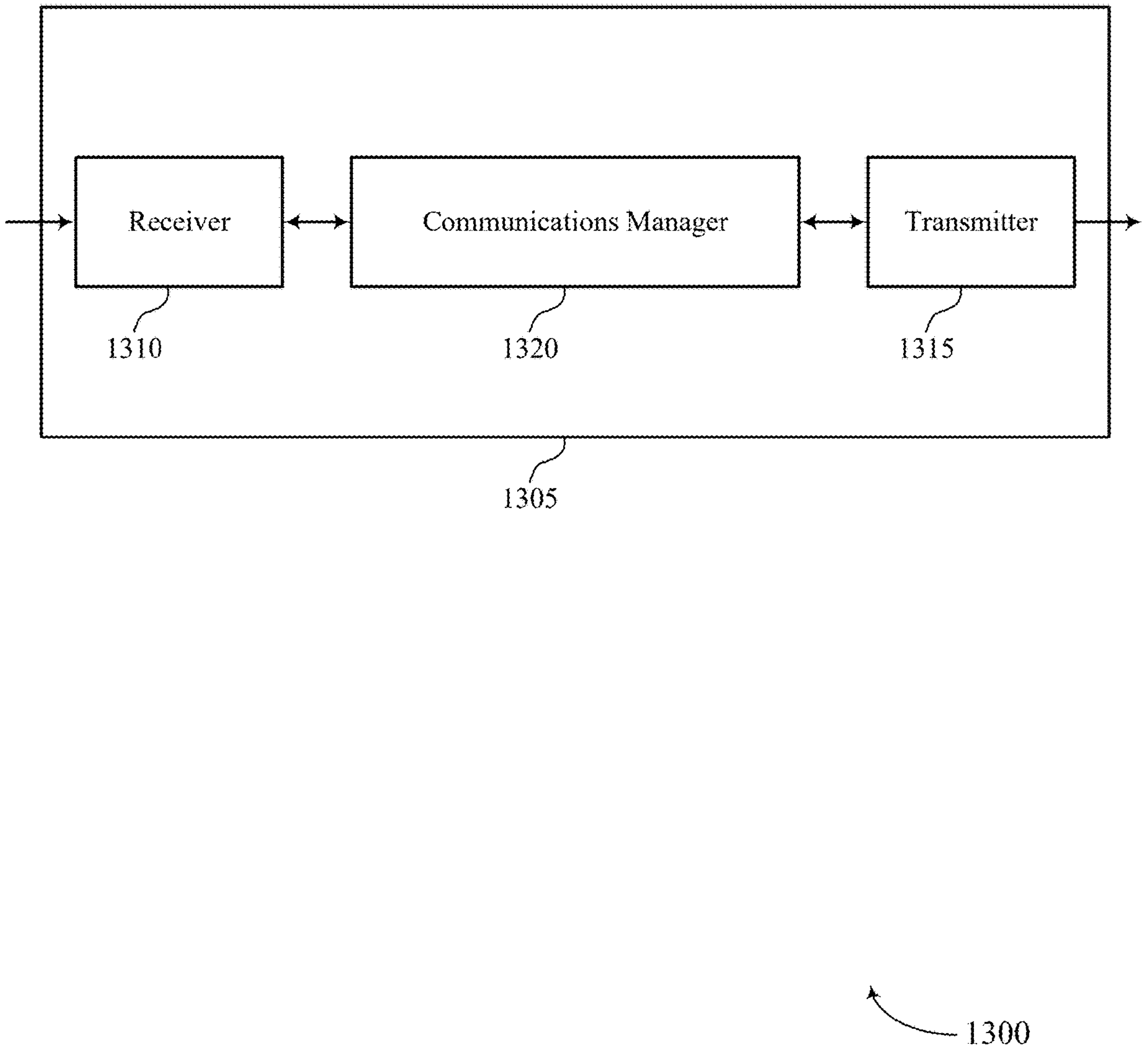
FIGS. 13 and 14 show block diagrams of devices that support mapping schemes for parity codes with shaping in accordance with one or more aspects of the present disclosure.

FIG. 13 shows a block diagram 1300 of a device 1305 that supports mapping schemes for parity codes with shaping in accordance with one or more aspects of the present disclosure. The device 1305 may be an example of aspects of a first network entity as described herein. The device 1305 may include a receiver 1310, a transmitter 1315, and a communications manager 1320. The device 1305, or one or more components of the device 1305 (e.g., the receiver 1310, the transmitter 1315, the communications manager 1320), may include at least one processor, which may be coupled with at least one memory, to, individually or collectively, support or enable the described techniques. Each of these components may be in communication with one another (e.g., via one or more buses).

The receiver 1310 may provide a means for receiving information such as packets, user data, control information, or any combination thereof associated with various information channels (e.g., control channels, data channels, information channels related to mapping schemes for parity codes with shaping). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to mapping schemes for parity codes with shaping). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations or components thereof may be examples of means for performing various aspects of mapping schemes for parity codes with shaping as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor (e.g., referred to as a processor-executable code). If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication performed in accordance with examples as disclosed herein. For example, the communications manager 1320 is capable of, configured to, or operable to support a means for generating payload bits and parity bits, where the parity bits are based on the payload bits, and where the payload bits include shaped payload bits and non-shaped payload bits. The communications manager 1320 is capable of, configured to, or operable to support a means for mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The communications manager 1320 is capable of, configured to, or operable to support a means for mapping each respective bit of the parity bits to a respective bit index of a second subset of indices of the set of multiple indices, where the second subset of indices includes, based on the quantity information, at least one of: the first portion of one or more indices or the second portion of one or more indices. The communications manager 1320 is capable of, configured to, or operable to support a means for mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol. The communications manager 1320 is capable of, configured to, or operable to support a means for outputting the modulation symbol including interleaved bits, where the interleaved bits include at least one shaped payload bit of the shaped payload bits, at least one non-shaped payload bit of the non-shaped payload bits, and at least one parity bit of the parity bits.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for reduced processing, reduced power consumption, or more efficient utilization of communication resources.

Figure 14:
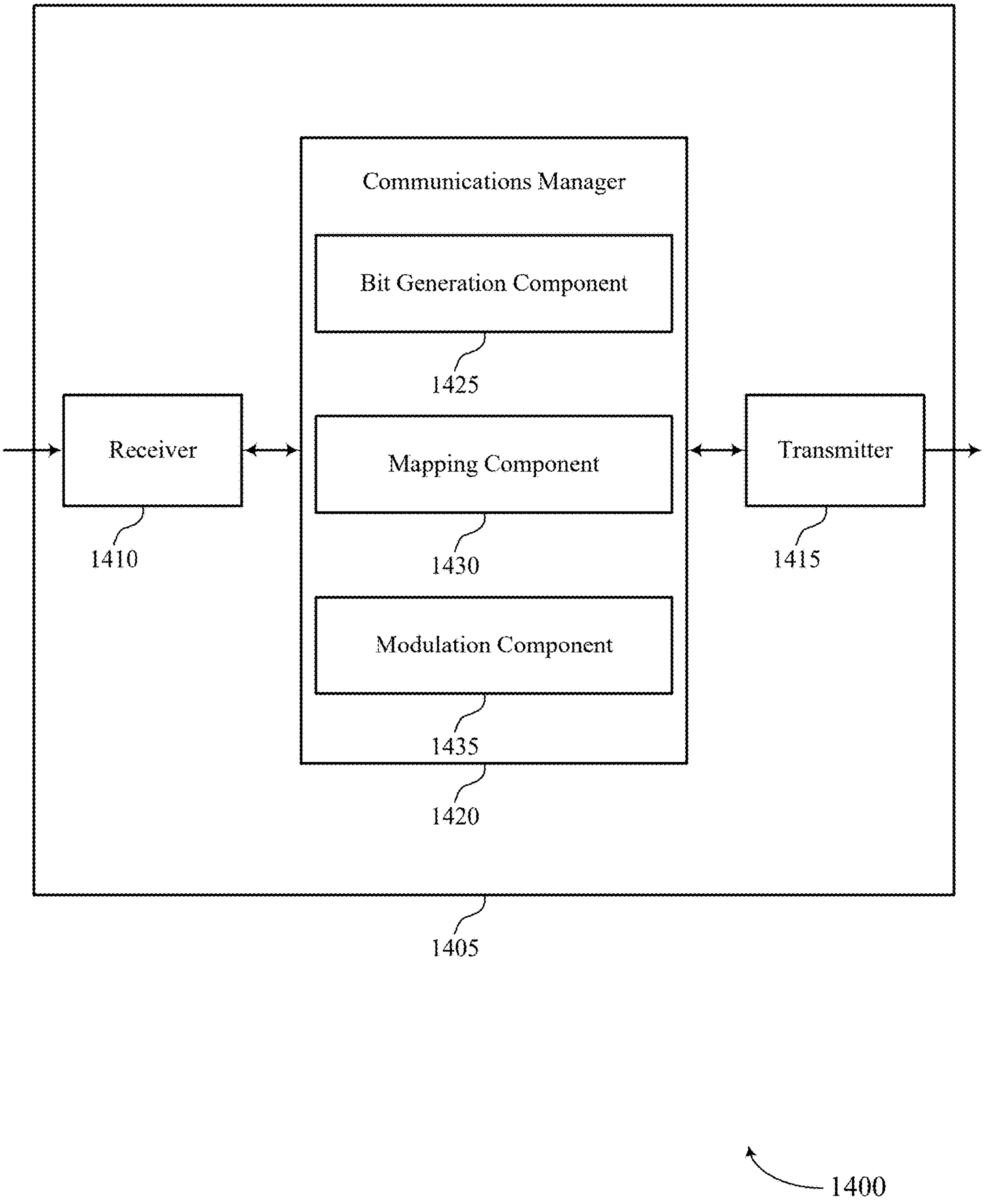

FIG. 14 shows a block diagram 1400 of a device 1405 that supports mapping schemes for parity codes with shaping in accordance with one or more aspects of the present disclosure. The device 1405 may be an example of aspects of a device 1305, a first network entity 215, a second network entity 205, a UE 115, or a network entity 105 as described herein. The device 1405 may include a receiver 1410, a transmitter 1415, and a communications manager 1420. The device 1405, or one or more components of the device 1405 (e.g., the receiver 1410, the transmitter 1415, the communications manager 1420), may include at least one processor, which may be coupled with at least one memory, to support the described techniques. Each of these components may be in communication with one another (e.g., via one or more buses).

The receiver 1410 may provide a means for receiving information such as packets, user data, control information, or any combination thereof associated with various information channels (e.g., control channels, data channels, information channels related to mapping schemes for parity codes with shaping). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to mapping schemes for parity codes with shaping). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of mapping schemes for parity codes with shaping as described herein. For example, the communications manager 1420 may include a bit generation component 1425, a mapping component 1430, a modulation component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication performed in accordance with examples as disclosed herein. The bit generation component 1425 is capable of, configured to, or operable to support a means for generating payload bits and parity bits, where the parity bits are based on the payload bits, and where the payload bits include shaped payload bits and non-shaped payload bits. The mapping component 1430 is capable of, configured to, or operable to support a means for mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The mapping component 1430 is capable of, configured to, or operable to support a means for mapping each respective bit of the parity bits to a respective bit index of a second subset of indices of the set of multiple indices, where the second subset of indices includes, based on the quantity information, at least one of: the first portion of one or more indices or the second portion of one or more indices. The mapping component 1430 is capable of, configured to, or operable to support a means for mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol. The modulation component 1435 is capable of, configured to, or operable to support a means for outputting the modulation symbol including interleaved bits, where the interleaved bits include at least one shaped payload bit of the shaped payload bits, at least one non-shaped payload bit of the non-shaped payload bits, and at least one parity bit of the parity bits.

Figure 15:
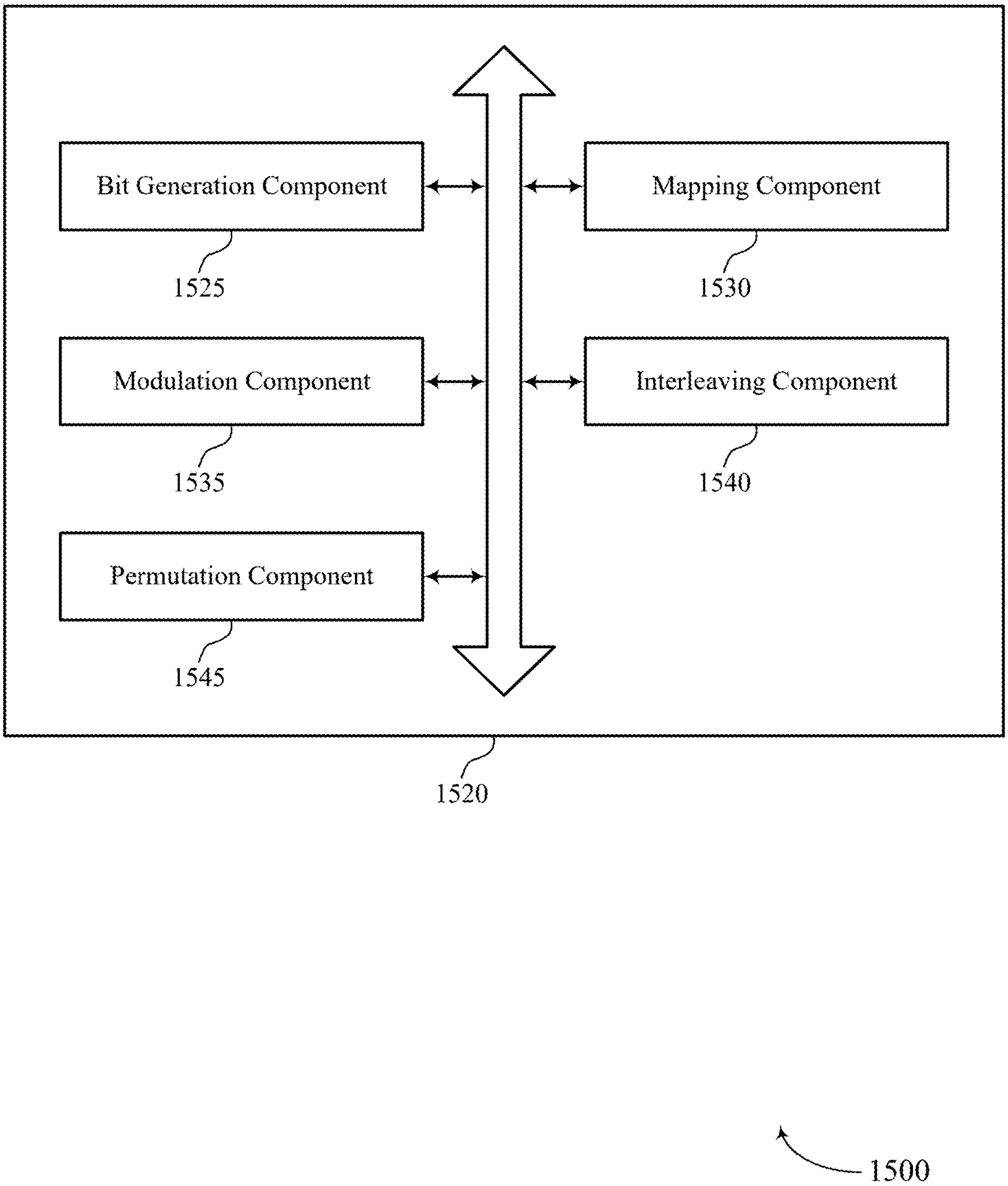
FIG. 15 shows a block diagram of a communications manager that supports mapping schemes for parity codes with shaping in accordance with one or more aspects of the present disclosure.

FIG. 15 shows a block diagram 1500 of a communications manager 1520 that supports mapping schemes for parity codes with shaping in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of mapping schemes for parity codes with shaping as described herein. For example, the communications manager 1520 may include a bit generation component 1525, a mapping component 1530, a modulation component 1535, an interleaving component 1540, a permutation component 1545, or any combination thereof. Each of these components, or components or subcomponents thereof (e.g., one or more processors, one or more memories), may communicate, directly or indirectly, with one another (e.g., via one or more buses).

The communications manager 1520 may support wireless communication performed in accordance with examples as disclosed herein. The bit generation component 1525 is capable of, configured to, or operable to support a means for generating payload bits and parity bits, where the parity bits are based on the payload bits, and where the payload bits include shaped payload bits and non-shaped payload bits. The mapping component 1530 is capable of, configured to, or operable to support a means for mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. In some examples, the mapping component 1530 is capable of, configured to, or operable to support a means for mapping each respective bit of the parity bits to a respective bit index of a second subset of indices of the set of multiple indices, where the second subset of indices includes, based on the quantity information, at least one of: the first portion of one or more indices or the second portion of one or more indices. In some examples, the mapping component 1530 is capable of, configured to, or operable to support a means for mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol. The modulation component 1535 is capable of, configured to, or operable to support a means for outputting the modulation symbol including interleaved bits, where the interleaved bits include at least one shaped payload bit of the shaped payload bits, at least one non-shaped payload bit of the non-shaped payload bits, and at least one parity bit of the parity bits.

In some examples, the quantity information indicates the first quantity relative to the second quantity by indicating the first quantity is less than the second quantity. In some examples, the first subset of indices includes only the first portion of the one or more indices. In some examples, the second subset of indices includes the first portion of the one or more indices and the second portion of the one or more indices.

In some examples, the quantity information indicates the first quantity relative to the second quantity by indicating the first quantity is equal to the second quantity. In some examples, the first subset of indices includes only the first portion of one or more indices. In some examples, the second subset of indices includes only the second portion of one or more indices.

In some examples, the quantity information indicates the first quantity relative to the second quantity by indicating the first quantity is greater than the second quantity. In some examples, the first subset of indices includes the first portion of one or more indices and the second portion of one or more indices. In some examples, the second subset of indices includes only the second portion of one or more indices.

In some examples, a processing system is configured to determine the quantity information.

In some examples, determining the quantity information includes comparing the first quantity and the second quantity.

In some examples, to support mapping each respective bit of the non-shaped payload bits, mapping each respective bit of the parity bits, or mapping each respective bit of the shaped payload bits, the mapping component 1530 is capable of, configured to, or operable to support a means for puncturing one or more bits of the non-shaped payload bits. In some examples, to support mapping each respective bit of the non-shaped payload bits, mapping each respective bit of the parity bits, or mapping each respective bit of the shaped payload bits, the mapping component 1530 is capable of, configured to, or operable to support a means for concatenating the shaped payload bits to the non-shaped payload bits. In some examples, to support mapping each respective bit of the non-shaped payload bits, mapping each respective bit of the parity bits, or mapping each respective bit of the shaped payload bits, the mapping component 1530 is capable of, configured to, or operable to support a means for concatenating the parity bits to the shaped payload bits. In some examples, to support mapping each respective bit of the non-shaped payload bits, mapping each respective bit of the parity bits, or mapping each respective bit of the shaped payload bits, the mapping component 1530 is capable of, configured to, or operable to support a means for inserting one or more bits of the parity bits to one or more respective indices between the non-shaped payload bits and the shaped payload bits.

In some examples, one or more first bits of the parity bits mapped to the first portion of one or more indices are associated with a higher degree in a parity encoding scheme than one or more second bits of the parity bits mapped to the second portion of one or more indices.

In some examples, to support mapping each respective bit of the parity bits, the mapping component 1530 is capable of, configured to, or operable to support a means for rotating one or more first bits of the parity bits from the second portion of one or more indices to the first portion of one or more indices.

In some examples, one or more first bits of the parity bits mapped to the first portion of one or more indices are associated with a lower degree in a parity encoding scheme than one or more second bits of the parity bits mapped to the second portion of one or more indices.

In some examples, the interleaving component 1540 is capable of, configured to, or operable to support a means for interleaving one or more first bits of the non-shaped payload bits based on first bit location information, where the first bit location information includes at least one of: the first portion of the one or more indices of the set of multiple indices or the second portion of the one or more indices of the set of multiple indices. In some examples, the interleaving component 1540 is capable of, configured to, or operable to support a means for interleaving one or more second bits of the parity bits based on second bit location information, where the second bit location information includes at least one of: the first portion of the one or more indices of the set of multiple indices or the second portion of the one or more indices of the set of multiple indices. In some examples, the interleaving component 1540 is capable of, configured to, or operable to support a means for interleaving one or more third bits of the shaped payload bits based on third bit location information, where the third bit location information includes the third portion of the one or more indices of the set of multiple indices, and where the interleaved bits include the one or more first bits, the one or more second bits, and the one or more third bits.

In some examples, the first bit location information corresponds to one or more first rows or one or more second rows of a structure of rows and columns, the second bit location information corresponds to the one or more first rows or the one or more second rows of the structure, and the third bit location information corresponds to one or more third rows of the structure. In some examples, a quantity of the rows corresponds to a modulation order and each of the columns is associated with a respective modulation symbol of a set of multiple modulation symbols.

In some examples, the permutation component 1545 is capable of, configured to, or operable to support a means for permuting the non-shaped payload bits, the shaped payload bits, and the parity bits before the one or more first bits, the one or more second bits, or the one or more third bits are interleaved.

In some examples, a quantity of bits allocated for the non-shaped information of the modulation symbol is based on a quantity of bits allocated for the shaped information of the modulation symbol and a bit allocated for the sign information of the modulation symbol.

In some examples, to support mapping each respective bit of the non-shaped payload bits, mapping each respective bit of the parity bits, or mapping each respective bit of the shaped payload bits, the mapping component 1530 is capable of, configured to, or operable to support a means for puncturing one or more bits of the shaped payload bits. In some examples, to support mapping each respective bit of the non-shaped payload bits, mapping each respective bit of the parity bits, or mapping each respective bit of the shaped payload bits, the mapping component 1530 is capable of, configured to, or operable to support a means for concatenating the non-shaped payload bits to the shaped payload bits. In some examples, to support mapping each respective bit of the non-shaped payload bits, mapping each respective bit of the parity bits, or mapping each respective bit of the shaped payload bits, the mapping component 1530 is capable of, configured to, or operable to support a means for concatenating the parity bits to the non-shaped payload bits. In some examples, to support mapping each respective bit of the non-shaped payload bits, mapping each respective bit of the parity bits, or mapping each respective bit of the shaped payload bits, the mapping component 1530 is capable of, configured to, or operable to support a means for exchanging each respective bit of the shaped payload bits with respective bits of the non-shaped payload bits to map the shaped payload bits to the third subset of indices and to map the non-shaped payload bits to the first subset of indices.

Figure 16:
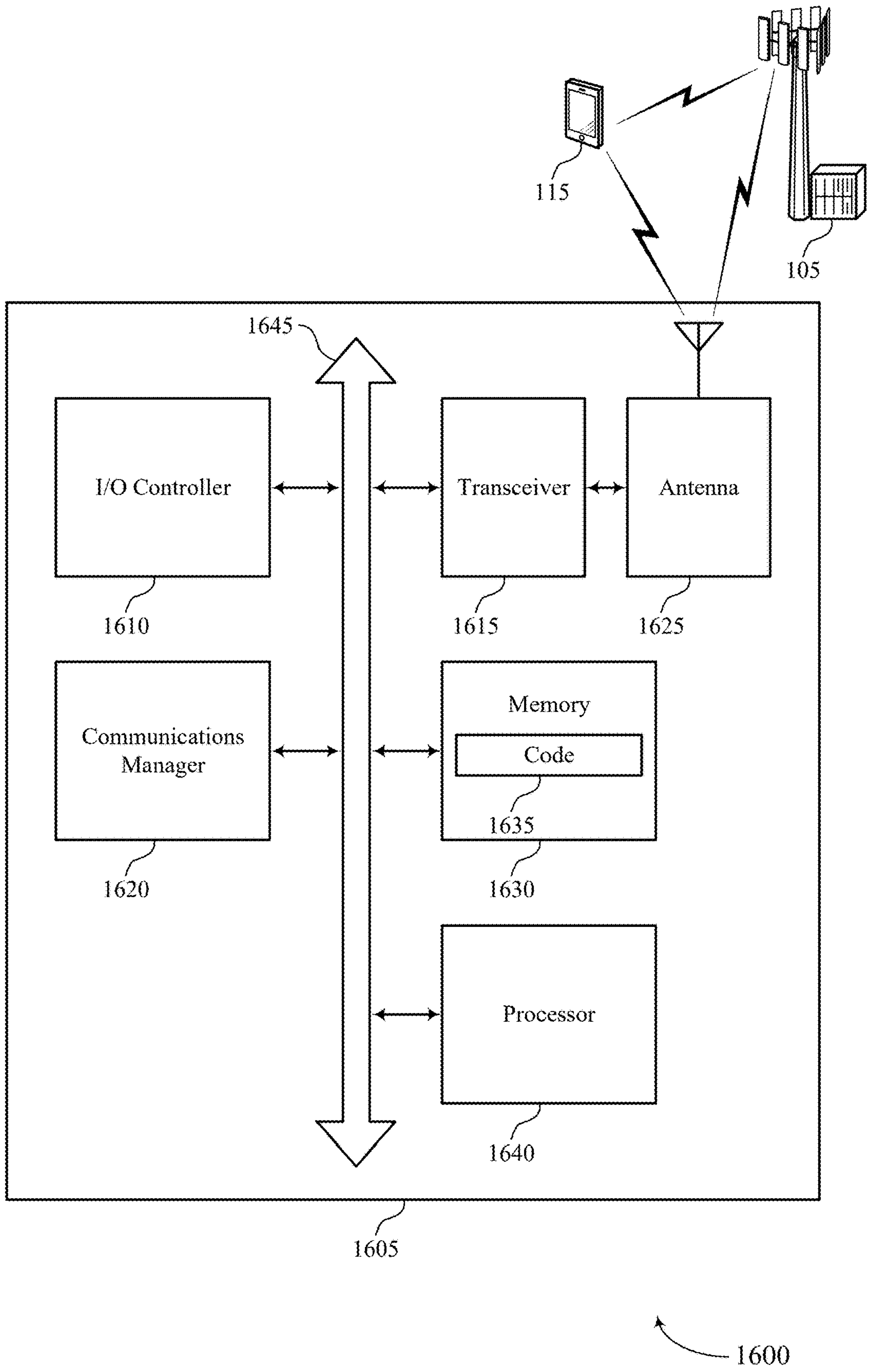
FIG. 16 shows a diagram of a system including a device that supports mapping schemes for parity codes with shaping in accordance with one or more aspects of the present disclosure.

FIG. 16 shows a diagram of a system 1600 including a device 1605 that supports mapping schemes for parity codes with shaping in accordance with one or more aspects of the present disclosure. The device 1605 may be an example of or include components of a device 1305, a device 1405, or a first network entity as described herein. The device 1605 may include components for bi-directional voice and data communications including components for transmitting and receiving communications, such as a communications manager 1620, an I/O controller, such as an I/O controller 1610, a transceiver 1615, one or more antennas 1625, at least one memory 1630, code 1635, and at least one processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally, or alternatively, the I/O controller 1610 may represent or interact with a modem, a keyboard, a mouse, a touchscreen, or a similar device. In some cases, the I/O controller 1610 may be implemented as part of one or more processors, such as the at least one processor 1640. In some cases, a user may interact with the device 1605 via the I/O controller 1610 or via hardware components controlled by the I/O controller 1610.

In some cases, the device 1605 may include a single antenna. However, in some other cases, the device 1605 may have more than one antenna, which may be capable of concurrently transmitting or receiving multiple wireless transmissions. The transceiver 1615 may communicate bi-directionally via the one or more antennas 1625 using wired or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The at least one memory 1630 may include RAM and ROM. The at least one memory 1630 may store computer-readable, computer-executable, or processor-executable code, such as the code 1635. The code 1635 may include instructions that, when executed by the at least one processor 1640, cause the device 1605 to perform various functions described herein. The code 1635 may be stored in a non-transitory computer-readable medium such as system memory or another type of memory. In some cases, the code 1635 may not be directly executable by the at least one processor 1640 but may cause a computer (e.g., when compiled and executed) to perform functions described herein. In some cases, the at least one memory 1630 may include, among other things, a BIOS which may control basic hardware or software operation such as the interaction with peripheral components or devices.

The at least one processor 1640 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1640 may be configured to operate a memory array using a memory controller. In some other cases, a memory controller may be integrated into the at least one processor 1640. The at least one processor 1640 may be configured to execute computer-readable instructions stored in a memory (e.g., the at least one memory 1630) to cause the device 1605 to perform various functions (e.g., functions or tasks supporting mapping schemes for parity codes with shaping). For example, the device 1605 or a component of the device 1605 may include at least one processor 1640 and at least one memory 1630 coupled with or to the at least one processor 1640, the at least one processor 1640 and the at least one memory 1630 configured to perform various functions described herein.

In some examples, the at least one processor 1640 may include multiple processors and the at least one memory 1630 may include multiple memories. One or more of the multiple processors may be coupled with one or more of the multiple memories, which may, individually or collectively, be configured to perform various functions described herein. In some examples, the at least one processor 1640 may be a component of a processing system, which may refer to a system (such as a series) of machines, circuitry (including, for example, one or both of processor circuitry (which may include the at least one processor 1640) and memory circuitry (which may include the at least one memory 1630)), or components, that receives or obtains inputs and processes the inputs to produce, generate, or obtain a set of outputs. The processing system may be configured to perform one or more of the functions described herein. For example, the at least one processor 1640 or a processing system including the at least one processor 1640 may be configured to, configurable to, or operable to cause the device 1605 to perform one or more of the functions described herein. Further, as described herein, being "configured to," being "configurable to," and being "operable to" may be used interchangeably and may be associated with a capability, when executing code 1635 (e.g., processor-executable code) stored in the at least one memory 1630 or otherwise, to perform one or more of the functions described herein.

The communications manager 1620 may support wireless communication performed in accordance with examples as disclosed herein. For example, the communications manager 1620 is capable of, configured to, or operable to support a means for generating payload bits and parity bits, where the parity bits are based on the payload bits, and where the payload bits include shaped payload bits and non-shaped payload bits. The communications manager 1620 is capable of, configured to, or operable to support a means for mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The communications manager 1620 is capable of, configured to, or operable to support a means for mapping each respective bit of the parity bits to a respective bit index of a second subset of indices of the set of multiple indices, where the second subset of indices includes, based on the quantity information, at least one of: the first portion of one or more indices or the second portion of one or more indices. The communications manager 1620 is capable of, configured to, or operable to support a means for mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol. The communications manager 1620 is capable of, configured to, or operable to support a means for outputting the modulation symbol including interleaved bits, where the interleaved bits include at least one shaped payload bit of the shaped payload bits, at least one non-shaped payload bit of the non-shaped payload bits, and at least one parity bit of the parity bits.

By including or configuring the communications manager 1620 in accordance with examples as described herein, the device 1605 may support techniques for improved communication reliability, reduced latency, reduced power consumption, more efficient utilization of communication resources, improved coordination between devices, longer battery life, or improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the at least one processor 1640, the at least one memory 1630, the code 1635, or any combination thereof. For example, the code 1635 may include instructions executable by the at least one processor 1640 to cause the device 1605 to perform various aspects of mapping schemes for parity codes with shaping as described herein, or the at least one processor 1640 and the at least one memory 1630 may be otherwise configured to, individually or collectively, perform or support such operations.

Figure 17:
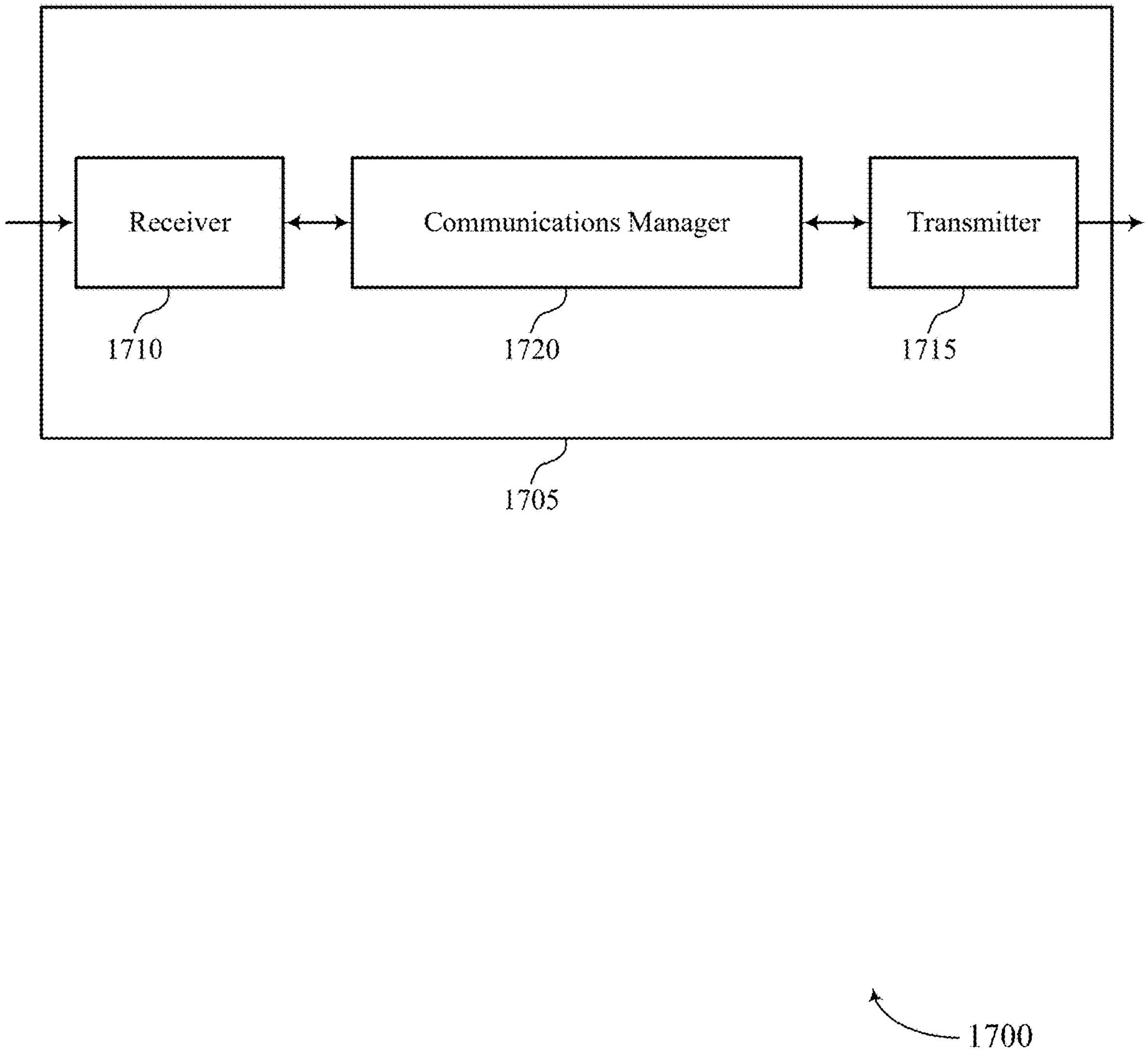
FIGS. 17 and 18 show block diagrams of devices that support mapping schemes for parity codes with shaping in accordance with one or more aspects of the present disclosure.

FIG. 17 shows a block diagram 1700 of a device 1705 that supports mapping schemes for parity codes with shaping in accordance with one or more aspects of the present disclosure. The device 1705 may be an example of aspects of a second network entity as described herein. The device 1705 may include a receiver 1710, a transmitter 1715, and a communications manager 1720. The device 1705, or one or more components of the device 1705 (e.g., the receiver 1710, the transmitter 1715, the communications manager 1720), may include at least one processor, which may be coupled with at least one memory, to, individually or collectively, support or enable the described techniques. Each of these components may be in communication with one another (e.g., via one or more buses).

The receiver 1710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1705. In some examples, the receiver 1710 may support obtaining information by receiving signals via one or more antennas. Additionally, or alternatively, the receiver 1710 may support obtaining information by receiving signals via one or more wired (e.g., electrical, fiber optic) interfaces, wireless interfaces, or any combination thereof.

The transmitter 1715 may provide a means for outputting (e.g., transmitting, providing, conveying, sending) information generated by other components of the device 1705. For example, the transmitter 1715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1715 may support outputting information by transmitting signals via one or more antennas. Additionally, or alternatively, the transmitter 1715 may support outputting information by transmitting signals via one or more wired (e.g., electrical, fiber optic) interfaces, wireless interfaces, or any combination thereof. In some examples, the transmitter 1715 and the receiver 1710 may be co-located in a transceiver, which may include or be coupled with a modem.

The communications manager 1720, the receiver 1710, the transmitter 1715, or various combinations or components thereof may be examples of means for performing various aspects of mapping schemes for parity codes with shaping as described herein. For example, the communications manager 1720, the receiver 1710, the transmitter 1715, or various combinations or components thereof may be capable of performing one or more of the functions described herein.

In some examples, the communications manager 1720, the receiver 1710, the transmitter 1715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1720, the receiver 1710, the transmitter 1715, or various combinations or components thereof may be implemented in code (e.g., as communications management software or firmware) executed by at least one processor (e.g., referred to as a processor-executable code). If implemented in code executed by at least one processor, the functions of the communications manager 1720, the receiver 1710, the transmitter 1715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1720 may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communication performed in accordance with examples as disclosed herein. For example, the communications manager 1720 is capable of, configured to, or operable to support a means for obtaining a modulation symbol that indicates non-shaped payload bits, shaped payload bits, and parity bits. The communications manager 1720 is capable of, configured to, or operable to support a means for de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The communications manager 1720 is capable of, configured to, or operable to support a means for de-mapping each respective bit of the parity bits to a respective bit index of a second subset of indices of the set of multiple indices, where the second subset of indices includes, based on the quantity information, at least one of: the first portion of one or more indices or the second portion of one or more indices. The communications manager 1720 is capable of, configured to, or operable to support a means for de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

By including or configuring the communications manager 1720 in accordance with examples as described herein, the device 1705 (e.g., at least one processor controlling or otherwise coupled with the receiver 1710, the transmitter 1715, the communications manager 1720, or a combination thereof) may support techniques for reduced processing, reduced power consumption, or more efficient utilization of communication resources.

Figure 18:
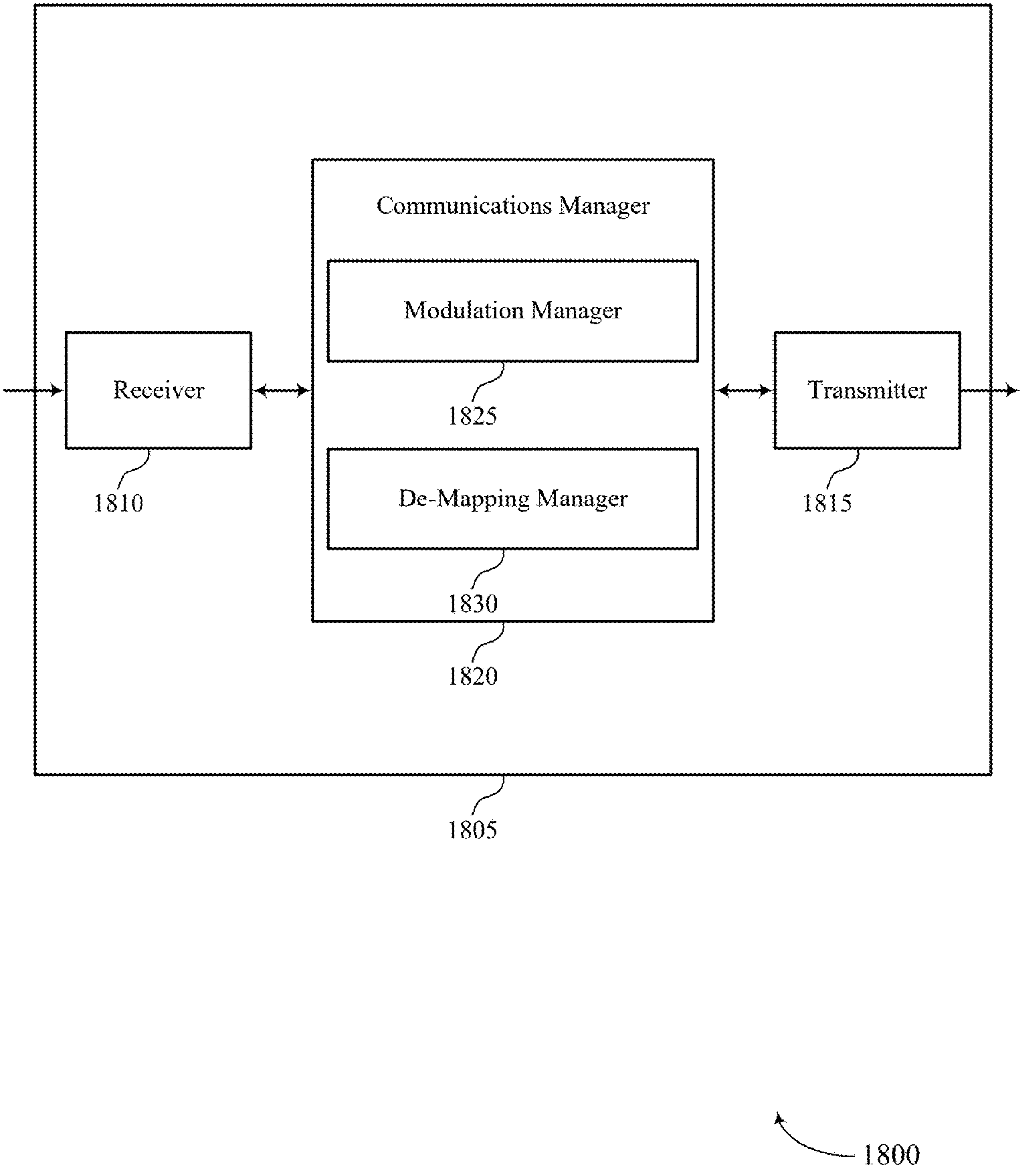

FIG. 18 shows a block diagram 1800 of a device 1805 that supports mapping schemes for parity codes with shaping in accordance with one or more aspects of the present disclosure. The device 1805 may be an example of aspects of a device 1705, a second network entity 205, a first network entity 215, a UE 115, or a network entity 105 as described herein. The device 1805 may include a receiver 1810, a transmitter 1815, and a communications manager 1820. The device 1805, or one or more components of the device 1805 (e.g., the receiver 1810, the transmitter 1815, the communications manager 1820), may include at least one processor, which may be coupled with at least one memory, to support the described techniques. Each of these components may be in communication with one another (e.g., via one or more buses).

The receiver 1810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1805. In some examples, the receiver 1810 may support obtaining information by receiving signals via one or more antennas. Additionally, or alternatively, the receiver 1810 may support obtaining information by receiving signals via one or more wired (e.g., electrical, fiber optic) interfaces, wireless interfaces, or any combination thereof.

The transmitter 1815 may provide a means for outputting (e.g., transmitting, providing, conveying, sending) information generated by other components of the device 1805. For example, the transmitter 1815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1815 may support outputting information by transmitting signals via one or more antennas. Additionally, or alternatively, the transmitter 1815 may support outputting information by transmitting signals via one or more wired (e.g., electrical, fiber optic) interfaces, wireless interfaces, or any combination thereof. In some examples, the transmitter 1815 and the receiver 1810 may be co-located in a transceiver, which may include or be coupled with a modem.

The device 1805, or various components thereof, may be an example of means for performing various aspects of mapping schemes for parity codes with shaping as described herein. For example, the communications manager 1820 may include a modulation manager 1825 a de-mapping manager 1830, or any combination thereof. The communications manager 1820 may be an example of aspects of a communications manager 1720 as described herein. In some examples, the communications manager 1820, or various components thereof, may be configured to perform various operations (e.g., receiving, obtaining, monitoring, outputting, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to obtain information, output information, or perform various other operations as described herein.

The communications manager 1820 may support wireless communication performed in accordance with examples as disclosed herein. The modulation manager 1825 is capable of, configured to, or operable to support a means for obtaining a modulation symbol that indicates non-shaped payload bits, shaped payload bits, and parity bits. The de-mapping manager 1830 is capable of, configured to, or operable to support a means for de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The de-mapping manager 1830 is capable of, configured to, or operable to support a means for de-mapping each respective bit of the parity bits to a respective bit index of a second subset of indices of the set of multiple indices, where the second subset of indices includes, based on the quantity information, at least one of: the first portion of one or more indices or the second portion of one or more indices. The de-mapping manager 1830 is capable of, configured to, or operable to support a means for de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

Figure 19:
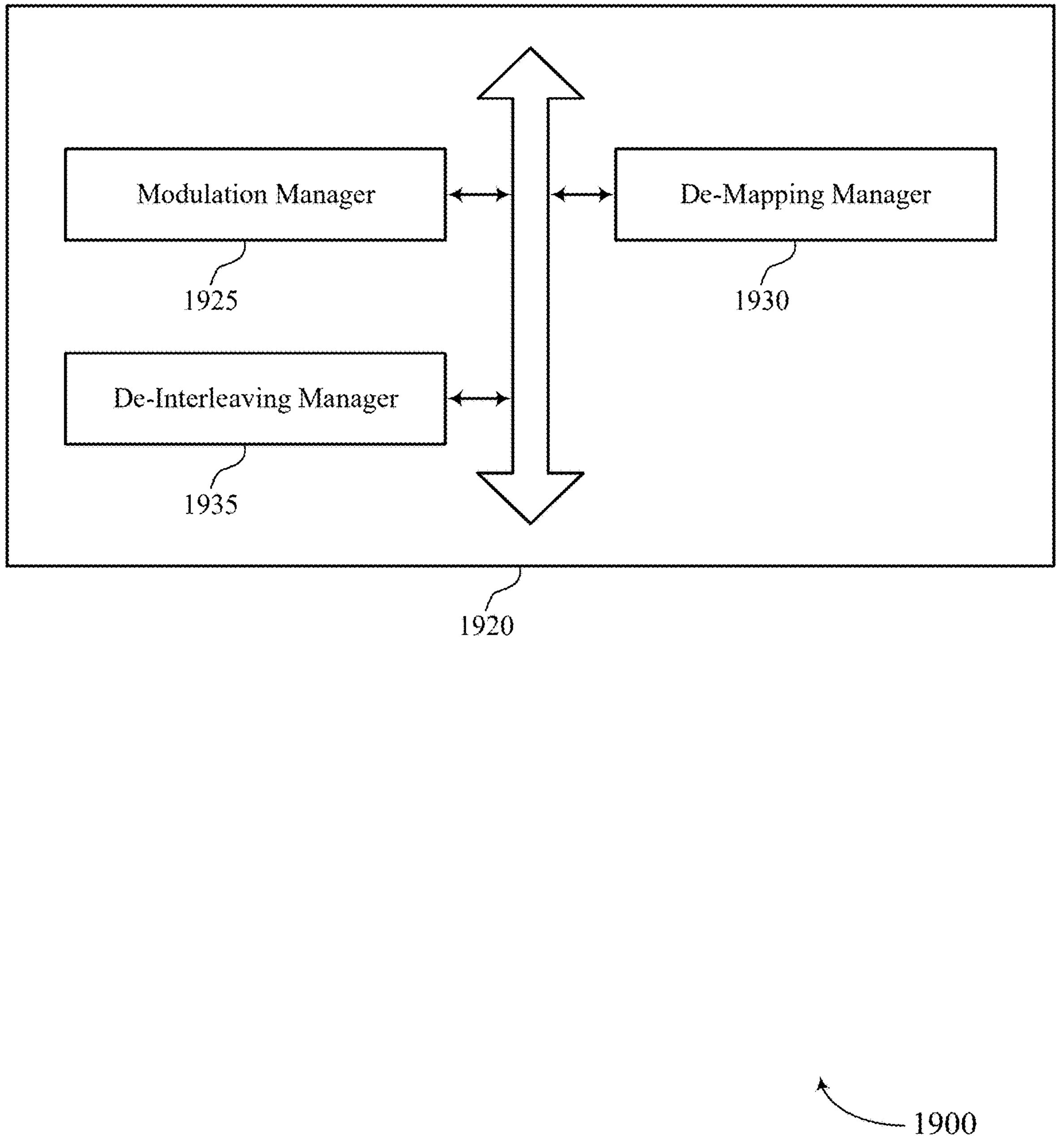
FIG. 19 shows a block diagram of a communications manager that supports mapping schemes for parity codes with shaping in accordance with one or more aspects of the present disclosure.

FIG. 19 shows a block diagram 1900 of a communications manager 1920 that supports mapping schemes for parity codes with shaping in accordance with one or more aspects of the present disclosure. The communications manager 1920 may be an example of aspects of a communications manager 1720, a communications manager 1820, or both, as described herein. The communications manager 1920, or various components thereof, may be an example of means for performing various aspects of mapping schemes for parity codes with shaping as described herein. For example, the communications manager 1920 may include a modulation manager 1925, a de-mapping manager 1930, a de-interleaving manager 1935, or any combination thereof. Each of these components, or components or subcomponents thereof (e.g., one or more processors, one or more memories), may communicate, directly or indirectly, with one another (e.g., via one or more buses).

The communications manager 1920 may support wireless communication performed in accordance with examples as disclosed herein. The modulation manager 1925 is capable of, configured to, or operable to support a means for obtaining a modulation symbol that indicates non-shaped payload bits, shaped payload bits, and parity bits. The de-mapping manager 1930 is capable of, configured to, or operable to support a means for de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. In some examples, the de-mapping manager 1930 is capable of, configured to, or operable to support a means for de-mapping each respective bit of the parity bits to a respective bit index of a second subset of indices of the set of multiple indices, where the second subset of indices includes, based on the quantity information, at least one of: the first portion of one or more indices or the second portion of one or more indices. In some examples, the de-mapping manager 1930 is capable of, configured to, or operable to support a means for de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

In some examples, the quantity information indicates the first quantity relative to the second quantity by indicating the first quantity is less than the second quantity. In some examples, the first subset of indices includes only the first portion of the one or more indices. In some examples, the second subset of indices includes the first portion of the one or more indices and the second portion of the one or more indices.

In some examples, the de-interleaving manager 1935 is capable of, configured to, or operable to support a means for de-interleaving one or more first bits of the non-shaped payload bits based on first bit location information, where the first bit location information includes at least one of: the first portion of the one or more indices of the set of multiple indices or the second portion of the one or more indices of the set of multiple indices. In some examples, the de-interleaving manager 1935 is capable of, configured to, or operable to support a means for de-interleaving one or more second bits of the parity bits based on second bit location information, where the second bit location information includes at least one of: the first portion of the one or more indices of the set of multiple indices or the second portion of the one or more indices of the set of multiple indices. In some examples, the de-interleaving manager 1935 is capable of, configured to, or operable to support a means for de-interleaving one or more third bits of the shaped payload bits based on third bit location information, where the third bit location information includes the third portion of the one or more indices of the set of multiple indices.

In some examples, the first bit location information corresponds to one or more first rows or one or more second rows of a structure of rows and columns, the second bit location information corresponds to the one or more first rows or the one or more second rows of the structure, and the third bit location information corresponds to one or more third rows of the structure. In some examples, a quantity of the rows corresponds to a modulation order and each of the columns is associated with a respective modulation symbol of a set of multiple modulation symbols.

Figure 20:
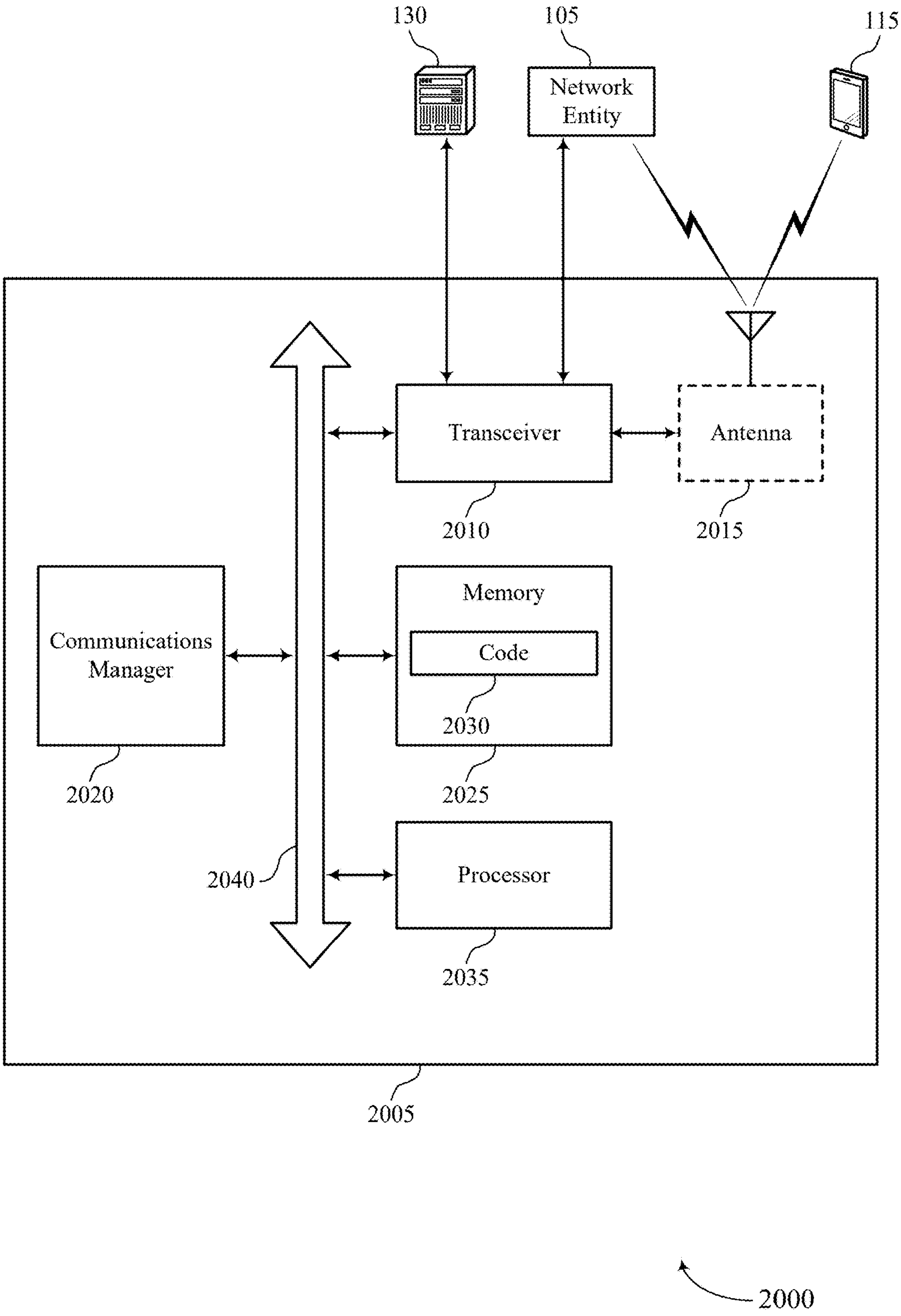
FIG. 20 shows a diagram of a system including a device that supports mapping schemes for parity codes with shaping in accordance with one or more aspects of the present disclosure.

FIG. 20 shows a diagram of a system 2000 including a device 2005 that supports mapping schemes for parity codes with shaping in accordance with one or more aspects of the present disclosure. The device 2005 may be an example of or include components of a device 1705, a device 1805, or a second network entity as described herein. The device 2005 may include components for bi-directional voice and data communications including components for transmitting and receiving communications, such as a communications manager 2020, a transceiver 2010, one or more antennas 2015, at least one memory 2025, code 2030, and at least one processor 2035. These components may be in electronic communication or otherwise coupled (e.g., operatively, communicatively, functionally, electronically, electrically) via one or more buses (e.g., a bus 2040).

The transceiver 2010 may support bi-directional communications via wired links, wireless links, or both as described herein. In some examples, the transceiver 2010 may include a wired transceiver and may communicate bi-directionally with another wired transceiver. Additionally, or alternatively, in some examples, the transceiver 2010 may include a wireless transceiver and may communicate bi-directionally with another wireless transceiver. In some examples, the device 2005 may include one or more antennas 2015, which may be capable of transmitting or receiving wireless transmissions (e.g., concurrently). The transceiver 2010 may also include a modem to modulate signals, to provide the modulated signals for transmission (e.g., by one or more antennas 2015, by a wired transmitter), to receive modulated signals (e.g., from one or more antennas 2015, from a wired receiver), and to demodulate signals. In some implementations, the transceiver 2010 may include one or more interfaces, such as one or more interfaces coupled with the one or more antennas 2015 that are configured to support various receiving or obtaining operations, or one or more interfaces coupled with the one or more antennas 2015 that are configured to support various transmitting or outputting operations, or a combination thereof. In some implementations, the transceiver 2010 may include or be configured for coupling with one or more processors or one or more memory components that are operable to perform or support operations based on received or obtained information or signals, or to generate information or other signals for transmission or other outputting, or any combination thereof. In some implementations, the transceiver 2010, or the transceiver 2010 and the one or more antennas 2015, or the transceiver 2010 and the one or more antennas 2015 and one or more processors or one or more memory components (e.g., the at least one processor 2035, the at least one memory 2025, or both), may be included in a chip or chip assembly that is installed in the device 2005. In some examples, the transceiver 2010 may be operable to support communications via one or more communications links (e.g., communication link(s) 125, backhaul communication link(s) 120, a midhaul communication link 162, a fronthaul communication link 168).

The at least one memory 2025 may include RAM, ROM, or any combination thereof. The at least one memory 2025 may store computer-readable, computer-executable, or processor-executable code, such as the code 2030. The code 2030 may include instructions that, when executed by one or more of the at least one processor 2035, cause the device 2005 to perform various functions described herein. The code 2030 may be stored in a non-transitory computer-readable medium such as system memory or another type of memory. In some cases, the code 2030 may not be directly executable by a processor of the at least one processor 2035 but may cause a computer (e.g., when compiled and executed) to perform functions described herein. In some cases, the at least one memory 2025 may include, among other things, a BIOS which may control basic hardware or software operation such as the interaction with peripheral components or devices. In some examples, the at least one processor 2035 may include multiple processors and the at least one memory 2025 may include multiple memories. One or more of the multiple processors may be coupled with one or more of the multiple memories which may, individually or collectively, be configured to perform various functions herein (for example, as part of a processing system).

The at least one processor 2035 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 2035 may be configured to operate a memory array using a memory controller. In some other cases, a memory controller may be integrated into one or more of the at least one processor 2035. The at least one processor 2035 may be configured to execute computer-readable instructions stored in a memory (e.g., one or more of the at least one memory 2025) to cause the device 2005 to perform various functions (e.g., functions or tasks supporting mapping schemes for parity codes with shaping). For example, the device 2005 or a component of the device 2005 may include at least one processor 2035 and at least one memory 2025 coupled with one or more of the at least one processor 2035, the at least one processor 2035 and the at least one memory 2025 configured to perform various functions described herein. The at least one processor 2035 may be an example of a cloud-computing platform (e.g., one or more physical nodes and supporting software such as operating systems, virtual machines, or container instances) that may host the functions (e.g., by executing code 2030) to perform the functions of the device 2005. The at least one processor 2035 may be any one or more suitable processors capable of executing scripts or instructions of one or more software programs stored in the device 2005 (such as within one or more of the at least one memory 2025).

In some examples, the at least one processor 2035 may include multiple processors and the at least one memory 2025 may include multiple memories. One or more of the multiple processors may be coupled with one or more of the multiple memories, which may, individually or collectively, be configured to perform various functions herein. In some examples, the at least one processor 2035 may be a component of a processing system, which may refer to a system (such as a series) of machines, circuitry (including, for example, one or both of processor circuitry (which may include the at least one processor 2035) and memory circuitry (which may include the at least one memory 2025)), or components, that receives or obtains inputs and processes the inputs to produce, generate, or obtain a set of outputs. The processing system may be configured to perform one or more of the functions described herein. For example, the at least one processor 2035 or a processing system including the at least one processor 2035 may be configured to, configurable to, or operable to cause the device 2005 to perform one or more of the functions described herein. Further, as described herein, being "configured to," being "configurable to," and being "operable to" may be used interchangeably and may be associated with a capability, when executing code stored in the at least one memory 2025 or otherwise, to perform one or more of the functions described herein.

In some examples, a bus 2040 may support communications of (e.g., within) a protocol layer of a protocol stack. In some examples, a bus 2040 may support communications associated with a logical channel of a protocol stack (e.g., between protocol layers of a protocol stack), which may include communications performed within a component of the device 2005, or between different components of the device 2005 that may be co-located or located in different locations (e.g., where the device 2005 may refer to a system in which one or more of the communications manager 2020, the transceiver 2010, the at least one memory 2025, the code 2030, and the at least one processor 2035 may be located in one of the different components or divided between different components).

In some examples, the communications manager 2020 may manage aspects of communications with a core network 130 (e.g., via one or more wired or wireless backhaul links). For example, the communications manager 2020 may manage the transfer of data communications for client devices, such as one or more UEs 115. In some examples, the communications manager 2020 may manage communications with one or more other network entities 105, and may include a controller or scheduler for controlling communications with UEs 115 (e.g., in cooperation with the one or more other network devices). In some examples, the communications manager 2020 may support an X2 interface within an LTE/LTE-A wireless communications network technology to provide communication between network entities 105.

The communications manager 2020 may support wireless communication performed in accordance with examples as disclosed herein. For example, the communications manager 2020 is capable of, configured to, or operable to support a means for obtaining a modulation symbol that indicates non-shaped payload bits, shaped payload bits, and parity bits. The communications manager 2020 is capable of, configured to, or operable to support a means for de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The communications manager 2020 is capable of, configured to, or operable to support a means for de-mapping each respective bit of the parity bits to a respective bit index of a second subset of indices of the set of multiple indices, where the second subset of indices includes, based on the quantity information, at least one of: the first portion of one or more indices or the second portion of one or more indices. The communications manager 2020 is capable of, configured to, or operable to support a means for de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol.

By including or configuring the communications manager 2020 in accordance with examples as described herein, the device 2005 may support techniques for improved communication reliability, reduced latency, reduced power consumption, more efficient utilization of communication resources, improved coordination between devices, longer battery life, or improved utilization of processing capability.

In some examples, the communications manager 2020 may be configured to perform various operations (e.g., receiving, obtaining, monitoring, outputting, transmitting) using or otherwise in cooperation with the transceiver 2010, the one or more antennas 2015 (e.g., where applicable), or any combination thereof. Although the communications manager 2020 is illustrated as a separate component, in some examples, one or more functions described with reference to the communications manager 2020 may be supported by or performed by the transceiver 2010, one or more of the at least one processor 2035, one or more of the at least one memory 2025, the code 2030, or any combination thereof (for example, by a processing system including at least a portion of the at least one processor 2035, the at least one memory 2025, the code 2030, or any combination thereof). For example, the code 2030 may include instructions executable by one or more of the at least one processor 2035 to cause the device 2005 to perform various aspects of mapping schemes for parity codes with shaping as described herein, or the at least one processor 2035 and the at least one memory 2025 may be otherwise configured to, individually or collectively, perform or support such operations.

FIG. 21 shows a flowchart illustrating a method 2100 that supports mapping schemes for parity codes with shaping in accordance with one or more aspects of the present disclosure. The operations of the method 2100 may be implemented by a first network entity or its components as described herein. For example, the operations of the method 2100 may be performed by a first network entity as described with reference to FIGS. 1 through 16. In some examples, a first network entity may execute a set of instructions to control the functional elements of the first network entity to perform the described functions. Additionally, or alternatively, the first network entity may perform aspects of the described functions using special-purpose hardware.

At 2105, the method may include generating payload bits and parity bits, where the parity bits are based on the payload bits, and where the payload bits include shaped payload bits and non-shaped payload bits. The operations of 2105 may be performed in accordance with examples as disclosed herein. In some examples, aspects of the operations of 2105 may be performed by a bit generation component 1525 as described with reference to FIG. 15.

At 2110, the method may include mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The operations of 2110 may be performed in accordance with examples as disclosed herein. In some examples, aspects of the operations of 2110 may be performed by a mapping component 1530 as described with reference to FIG. 15.

At 2115, the method may include mapping each respective bit of the parity bits to a respective bit index of a second subset of indices of the set of multiple indices, where the second subset of indices includes, based on the quantity information, at least one of: the first portion of one or more indices or the second portion of one or more indices. The operations of 2115 may be performed in accordance with examples as disclosed herein. In some examples, aspects of the operations of 2115 may be performed by a mapping component 1530 as described with reference to FIG. 15.

At 2120, the method may include mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol. The operations of 2120 may be performed in accordance with examples as disclosed herein. In some examples, aspects of the operations of 2120 may be performed by a mapping component 1530 as described with reference to FIG. 15.

At 2125, the method may include outputting the modulation symbol including interleaved bits, where the interleaved bits include at least one shaped payload bit of the shaped payload bits, at least one non-shaped payload bit of the non-shaped payload bits, and at least one parity bit of the parity bits. The operations of 2125 may be performed in accordance with examples as disclosed herein. In some examples, aspects of the operations of 2125 may be performed by a modulation component 1535 as described with reference to FIG. 15.

FIG. 22 shows a flowchart illustrating a method 2200 that supports mapping schemes for parity codes with shaping in accordance with one or more aspects of the present disclosure. The operations of the method 2200 may be implemented by a first network entity or its components as described herein. For example, the operations of the method 2200 may be performed by a first network entity as described with reference to FIGS. 1 through 16. In some examples, a first network entity may execute a set of instructions to control the functional elements of the first network entity to perform the described functions. Additionally, or alternatively, the first network entity may perform aspects of the described functions using special-purpose hardware.

At 2205, the method may include generating payload bits and parity bits, where the parity bits are based on the payload bits, and where the payload bits include shaped payload bits and non-shaped payload bits. The operations of 2205 may be performed in accordance with examples as disclosed herein. In some examples, aspects of the operations of 2205 may be performed by a bit generation component 1525 as described with reference to FIG. 15.

At 2210, the method may include mapping each respective bit of the non-shaped payload bits to a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of a modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The operations of 2210 may be performed in accordance with examples as disclosed herein. In some examples, aspects of the operations of 2210 may be performed by a mapping component 1530 as described with reference to FIG. 15.

At 2215, the method may include mapping each respective bit of the parity bits to a respective bit index of a second subset of indices of the set of multiple indices, where the second subset of indices includes, based on the quantity information, at least one of: the first portion of one or more indices or the second portion of one or more indices. The operations of 2215 may be performed in accordance with examples as disclosed herein. In some examples, aspects of the operations of 2215 may be performed by a mapping component 1530 as described with reference to FIG. 15.

At 2220, the method may include mapping each respective bit of the shaped payload bits to a respective bit index of a third subset of indices of the set of multiple indices, where the third subset of indices includes a third portion of one or more indices of the set of multiple indices, where the third portion of one or more indices corresponds to shaped information of the modulation symbol. The operations of 2220 may be performed in accordance with examples as disclosed herein. In some examples, aspects of the operations of 2220 may be performed by a mapping component 1530 as described with reference to FIG. 15.

At 2225, the method may include interleaving one or more first bits of the non-shaped payload bits based on first bit location information, where the first bit location information includes at least one of: the first portion of the one or more indices of the set of multiple indices or the second portion of the one or more indices of the set of multiple indices. The operations of 2225 may be performed in accordance with examples as disclosed herein. In some examples, aspects of the operations of 2225 may be performed by an interleaving component 1540 as described with reference to FIG. 15.

At 2230, the method may include interleaving one or more second bits of the parity bits based on second bit location information, where the second bit location information includes at least one of: the first portion of the one or more indices of the set of multiple indices or the second portion of the one or more indices of the set of multiple indices. The operations of 2230 may be performed in accordance with examples as disclosed herein. In some examples, aspects of the operations of 2230 may be performed by an interleaving component 1540 as described with reference to FIG. 15.

At 2235, the method may include interleaving one or more third bits of the shaped payload bits based on third bit location information, where the third bit location information includes the third portion of the one or more indices of the set of multiple indices, and where the interleaved bits include the one or more first bits, the one or more second bits, and the one or more third bits. The operations of 2235 may be performed in accordance with examples as disclosed herein. In some examples, aspects of the operations of 2235 may be performed by an interleaving component 1540 as described with reference to FIG. 15.

At 2240, the method may include outputting the modulation symbol including interleaved bits, where the interleaved bits include at least one shaped payload bit of the shaped payload bits, at least one non-shaped payload bit of the non-shaped payload bits, and at least one parity bit of the parity bits. The operations of 2240 may be performed in accordance with examples as disclosed herein. In some examples, aspects of the operations of 2240 may be performed by a modulation component 1535 as described with reference to FIG. 15.

FIG. 23 shows a flowchart illustrating a method 2300 that supports mapping schemes for parity codes with shaping in accordance with one or more aspects of the present disclosure. The operations of the method 2300 may be implemented by a second network entity or its components as described herein. For example, the operations of the method 2300 may be performed by a second network entity as described with reference to FIGS. 1 through 12 and 17 through 20. In some examples, a second network entity may execute a set of instructions to control the functional elements of the second network entity to perform the described functions. Additionally, or alternatively, the second network entity may perform aspects of the described functions using special-purpose hardware.

At 2305, the method may include obtaining a modulation symbol that indicates non-shaped payload bits, shaped payload bits, and parity bits. The operations of 2305 may be performed in accordance with examples as disclosed herein. In some examples, aspects of the operations of 2305 may be performed by a modulation manager 1925 as described with reference to FIG. 19.

At 2310, the method may include de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The operations of 2310 may be performed in accordance with examples as disclosed herein. In some examples, aspects of the operations of 2310 may be performed by a de-mapping manager 1930 as described with reference to FIG. 19.

At 2315, the method may include de-mapping each respective bit of the parity bits to a respective bit index of a second subset of indices of the set of multiple indices, where the second subset of indices includes, based on the quantity information, at least one of: the first portion of one or more indices or the second portion of one or more indices. The operations of 2315 may be performed in accordance with examples as disclosed herein. In some examples, aspects of the operations of 2315 may be performed by a de-mapping manager 1930 as described with reference to FIG. 19.

At 2320, the method may include de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol. The operations of 2320 may be performed in accordance with examples as disclosed herein. In some examples, aspects of the operations of 2320 may be performed by a de-mapping manager 1930 as described with reference to FIG. 19.

FIG. 24 shows a flowchart illustrating a method 2400 that supports mapping schemes for parity codes with shaping in accordance with one or more aspects of the present disclosure. The operations of the method 2400 may be implemented by a second network entity or its components as described herein. For example, the operations of the method 2400 may be performed by a second network entity as described with reference to FIGS. 1 through 12 and 17 through 20. In some examples, a second network entity may execute a set of instructions to control the functional elements of the second network entity to perform the described functions. Additionally, or alternatively, the second network entity may perform aspects of the described functions using special-purpose hardware.

At 2405, the method may include obtaining a modulation symbol that indicates non-shaped payload bits, shaped payload bits, and parity bits. The operations of 2405 may be performed in accordance with examples as disclosed herein. In some examples, aspects of the operations of 2405 may be performed by a modulation manager 1925 as described with reference to FIG. 19.

At 2410, the method may include de-interleaving one or more first bits of the non-shaped payload bits based on first bit location information, where the first bit location information includes at least one of: the first portion of the one or more indices of the set of multiple indices or the second portion of the one or more indices of the set of multiple indices. The operations of 2410 may be performed in accordance with examples as disclosed herein. In some examples, aspects of the operations of 2410 may be performed by a de-interleaving manager 1935 as described with reference to FIG. 19.

At 2415, the method may include de-interleaving one or more second bits of the parity bits based on second bit location information, where the second bit location information includes at least one of: the first portion of the one or more indices of the set of multiple indices or the second portion of the one or more indices of the set of multiple indices. The operations of 2415 may be performed in accordance with examples as disclosed herein. In some examples, aspects of the operations of 2415 may be performed by a de-interleaving manager 1935 as described with reference to FIG. 19.

At 2420, the method may include de-interleaving one or more third bits of the shaped payload bits based on third bit location information, where the third bit location information includes the third portion of the one or more indices of the set of multiple indices. The operations of 2420 may be performed in accordance with examples as disclosed herein. In some examples, aspects of the operations of 2420 may be performed by a de-interleaving manager 1935 as described with reference to FIG. 19.

At 2425, the method may include de-mapping each respective bit of the non-shaped payload bits from a respective bit index of a first subset of indices of a set of multiple indices, where the first subset of indices includes, based on quantity information, at least one of: a first portion of one or more indices of the set of multiple indices or a second portion of one or more indices of the set of multiple indices, where the first portion of one or more indices corresponds to sign information of the modulation symbol, where the second portion of one or more indices of the set of multiple indices corresponds to non-shaped information of the modulation symbol, and where the quantity information indicates a first quantity of the non-shaped payload bits relative to a second quantity of bits for the first portion of one or more indices. The operations of 2425 may be performed in accordance with examples as disclosed herein. In some examples, aspects of the operations of 2425 may be performed by a de-mapping manager 1930 as described with reference to FIG. 19.

At 2430, the method may include de-mapping each respective bit of the parity bits to a respective bit index of a second subset of indices of the set of multiple indices, where the second subset of indices includes, based on the quantity information, at least one of: the first portion of one or more indices or the second portion of one or more indices. The operations of 2430 may be performed in accordance with examples as disclosed herein. In some examples, aspects of the operations of 2430 may be performed by a de-mapping manager 1930 as described with reference to FIG. 19.

At 2435, the method may include de-mapping each respective bit of the shaped payload bits from a respective bit index of a third subset of indices of the set of multiple indices, where the third subset of indices includes a third portion of one or more indices of the set of multiple indices, where the third portion of one or more indices corresponds to shaped information of the modulation symbol. The operations of 2435 may be performed in accordance with examples as disclosed herein. In some examples, aspects of the operations of 2435 may be performed by a de-mapping manager 1930 as described with reference to FIG. 19.

The following provides an overview of aspects of the present disclosure:

Aspect 1: A method of wireless communication performed by a first network entity, comprising: generating payload bits and parity bits, wherein the parity bits are based on the payload bits, and wherein the payload bits comprise shaped payload bits and non-shaped payload bits; mapping each respective bit of the non-shaped payload bits to a respective bit index of a first subset of indices of a plurality of indices, wherein the first subset of indices includes, based on quantity information, at least one of: a first portion of one or more indices of the plurality of indices or a second portion of one or more indices of the plurality of indices, wherein the first portion of one or more indices corresponds to sign information of a modulation symbol, wherein the second portion of one or more indices of the plurality of indices corresponds to non-shaped information of the modulation symbol, and wherein the quantity information indicates a first quantity of the non-shaped payload bits relative to a second quantity of bits for the first portion of one or more indices; mapping each respective bit of the parity bits to a respective bit index of a second subset of indices of the plurality of indices, wherein the second subset of indices includes, based on the quantity information, at least one of: the first portion of one or more indices or the second portion of one or more indices; mapping each respective bit of the shaped payload bits to a respective bit index of a third subset of indices of the plurality of indices, wherein the third subset of indices includes a third portion of one or more indices of the plurality of indices, wherein the third portion of one or more indices corresponds to shaped information of the modulation symbol; and outputting the modulation symbol including interleaved bits, wherein the interleaved bits include at least one shaped payload bit of the shaped payload bits, at least one non-shaped payload bit of the non-shaped payload bits, and at least one parity bit of the parity bits.

Aspect 2: The method of aspect 1, wherein the quantity information indicates the first quantity relative to the second quantity by indicating the first quantity is less than the second quantity, and wherein the first subset of indices includes only the first portion of the one or more indices, and wherein the second subset of indices includes the first portion of the one or more indices and the second portion of the one or more indices.

Aspect 3: The method of aspect 1, wherein the quantity information indicates the first quantity relative to the second quantity by indicating the first quantity is equal to the second quantity, and wherein the first subset of indices includes only the first portion of one or more indices, and wherein the second subset of indices includes only the second portion of one or more indices.

Aspect 4: The method of aspect 1, wherein the quantity information indicates the first quantity relative to the second quantity by indicating the first quantity is greater than the second quantity, and wherein the first subset of indices includes the first portion of one or more indices and the second portion of one or more indices, and wherein the second subset of indices includes only the second portion of one or more indices.

Aspect 5: The method of any of aspects 1 through 4, wherein a processing system is configured to determine the quantity information.

Aspect 6: The method of aspect 5, wherein determining the quantity information comprises comparing the first quantity and the second quantity.

Aspect 7: The method of any of aspects 1 through 6, wherein mapping each respective bit of the non-shaped payload bits, mapping each respective bit of the parity bits, or mapping each respective bit of the shaped payload bits comprises: puncturing one or more bits of the non-shaped payload bits; concatenating the shaped payload bits to the non-shaped payload bits; concatenating the parity bits to the shaped payload bits; and inserting one or more bits of the parity bits to one or more respective indices between the non-shaped payload bits and the shaped payload bits.

Aspect 8: The method of any of aspects 1 through 7, wherein one or more first bits of the parity bits mapped to the first portion of one or more indices are associated with a higher degree in a parity encoding scheme than one or more second bits of the parity bits mapped to the second portion of one or more indices.

Aspect 9: The method of any of aspects 1 through 7, wherein mapping each respective bit of the parity bits comprises: rotating one or more first bits of the parity bits from the second portion of one or more indices to the first portion of one or more indices.

Aspect 10: The method of aspect 9, wherein one or more first bits of the parity bits mapped to the first portion of one or more indices are associated with a lower degree in a parity encoding scheme than one or more second bits of the parity bits mapped to the second portion of one or more indices.

Aspect 11: The method of any of aspects 1 through 10, further comprising: interleaving one or more first bits of the non-shaped payload bits based on first bit location information, wherein the first bit location information includes at least one of: the first portion of the one or more indices of the plurality of indices or the second portion of the one or more indices of the plurality of indices; interleaving one or more second bits of the parity bits based on second bit location information, wherein the second bit location information includes at least one of: the first portion of the one or more indices of the plurality of indices or the second portion of the one or more indices of the plurality of indices; and interleaving one or more third bits of the shaped payload bits based on third bit location information, wherein the third bit location information includes the third portion of the one or more indices of the plurality of indices, and wherein the interleaved bits include the one or more first bits, the one or more second bits, and the one or more third bits.

Aspect 12: The method of aspect 11, wherein the first bit location information corresponds to one or more first rows or one or more second rows of a structure of rows and columns, the second bit location information corresponds to the one or more first rows or the one or more second rows of the structure, and the third bit location information corresponds to one or more third rows of the structure, a quantity of the rows corresponds to a modulation order and each of the columns is associated with a respective modulation symbol of a plurality of modulation symbols.

Aspect 13: The method of any of aspects 11 through 12, further comprising: permuting the non-shaped payload bits, the shaped payload bits, and the parity bits before the one or more first bits, the one or more second bits, or the one or more third bits are interleaved.

Aspect 14: The method of aspect 13, wherein a quantity of bits allocated for the non-shaped information of the modulation symbol is based on a quantity of bits allocated for the shaped information of the modulation symbol and a bit allocated for the sign information of the modulation symbol.

Aspect 15: The method of any of aspects 1 through 6, wherein mapping each respective bit of the non-shaped payload bits, mapping each respective bit of the parity bits, or mapping each respective bit of the shaped payload bits comprises: puncturing one or more bits of the shaped payload bits; concatenating the non-shaped payload bits to the shaped payload bits; concatenating the parity bits to the non-shaped payload bits; and exchanging each respective bit of the shaped payload bits with respective bits of the non-shaped payload bits to map the shaped payload bits to the third subset of indices and to map the non-shaped payload bits to the first subset of indices.

Aspect 16: A method of wireless communication performed by a second network entity, comprising: obtaining a modulation symbol that indicates non-shaped payload bits, shaped payload bits, and parity bits; de-mapping each respective bit of the non-shaped payload bits from a respective bit index of a first subset of indices of a plurality of indices, wherein the first subset of indices includes, based on quantity information, at least one of: a first portion of one or more indices of the plurality of indices or a second portion of one or more indices of the plurality of indices, wherein the first portion of one or more indices corresponds to sign information of the modulation symbol, wherein the second portion of one or more indices of the plurality of indices corresponds to non-shaped information of the modulation symbol, and wherein the quantity information indicates a first quantity of the non-shaped payload bits relative to a second quantity of bits for the first portion of one or more indices; de-mapping each respective bit of the parity bits to a respective bit index of a second subset of indices of the plurality of indices, wherein the second subset of indices includes, based on the quantity information, at least one of: the first portion of one or more indices or the second portion of one or more indices; and de-mapping each respective bit of the shaped payload bits from a respective bit index of a third subset of indices of the plurality of indices, wherein the third subset of indices includes a third portion of one or more indices of the plurality of indices, wherein the third portion of one or more indices corresponds to shaped information of the modulation symbol.

Aspect 17: The method of aspect 16, wherein the quantity information indicates the first quantity relative to the second quantity by indicating the first quantity is less than the second quantity, and wherein the first subset of indices includes only the first portion of the one or more indices, and wherein the second subset of indices includes the first portion of the one or more indices and the second portion of the one or more indices.

Aspect 18: The method of any of aspects 16 through 17, further comprising: de-interleaving one or more first bits of the non-shaped payload bits based on first bit location information, wherein the first bit location information includes at least one of: the first portion of the one or more indices of the plurality of indices or the second portion of the one or more indices of the plurality of indices; de-interleaving one or more second bits of the parity bits based on second bit location information, wherein the second bit location information includes at least one of: the first portion of the one or more indices of the plurality of indices or the second portion of the one or more indices of the plurality of indices; and de-interleaving one or more third bits of the shaped payload bits based on third bit location information, wherein the third bit location information includes the third portion of the one or more indices of the plurality of indices.

Aspect 19: The method of aspect 18, wherein the first bit location information corresponds to one or more first rows or one or more second rows of a structure of rows and columns, the second bit location information corresponds to the one or more first rows or the one or more second rows of the structure, and the third bit location information corresponds to one or more third rows of the structure, a quantity of the rows corresponds to a modulation order and each of the columns is associated with a respective modulation symbol of a plurality of modulation symbols.

Aspect 20: A first network entity for wireless communication, comprising a processing system configured to perform a method of any of aspects 1 through 15.

Aspect 21: A first network entity for wireless communication, comprising at least one means for performing a method of any of aspects 1 through 15.

Aspect 22: A non-transitory computer-readable medium having code for wireless communication stored thereon, when executed by a first network entity, causes the first network entity to perform a method of any of aspects 1 through 15.

Aspect 23: A second network entity for wireless communication, comprising a processing system configured to perform a method of any of aspects 16 through 19.

Aspect 24: A second network entity for wireless communication, comprising at least one means for performing a method of any of aspects 16 through 19.

Aspect 25: A non-transitory computer-readable medium having code for wireless communication stored thereon that, when executed by a second network entity, causes the second network entity to perform a method of any of aspects 16 through 19.

The methods described herein describe possible implementations, and the operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase “based on” shall not be construed as a reference to a closed set of information, one or more conditions, one or more factors, or the like. In other words, the phrase “based on A” (where “A” may be information, a condition, a factor, or the like) shall be construed as “based at least on A” unless specifically recited differently. Also, as used herein, the phrase “a set” shall be construed as including the possibility of a set with one member. That is, the phrase “a set” shall be construed in the same manner as “one or more” or “at least one of.”

As used herein, including in the claims, the article “a” before a noun is open-ended and understood to refer to “at least one” of those nouns or “one or more” of those nouns. Thus, the terms “a,” “at least one,” “one or more,” and “at least one of one or more” may be interchangeable. For example, if a claim recites “a component” that performs one or more functions, each of the individual functions may be performed by a single component or by any combination of multiple components. Thus, the term “a component” having characteristics or performing functions may refer to “at least one of one or more components” having a particular characteristic or performing a particular function. Subsequent reference to a component introduced with the article “a” using the terms “the” or “said” may refer to any or all of the one or more components. For example, a component introduced with the article “a” may be understood to mean “one or more components,” and referring to “the component” subsequently in the claims may be understood to be equivalent to referring to “at least one of the one or more components.” Similarly, subsequent reference to a component introduced as “one or more components” using the terms “the” or “said” may refer to any or all of the one or more components. For example, referring to “the one or more components” subsequently in the claims may be understood to be equivalent to referring to “at least one of the one or more components.”

The term “determine” or “determining” encompasses a variety of actions and, therefore, “determining” can include calculating, computing, processing, deriving, investigating, looking up (such as via looking up in a table, a database, or another data structure), ascertaining, and the like. Also, “determining” can include receiving (e.g., receiving information), accessing (e.g., accessing data stored in memory), and the like. Also, “determining” can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the drawings, describes example configurations and does not represent all the examples that may be implemented or that are within the scope of the claims. The term “aspect” or “example” used herein means “serving as an aspect, example, instance, or illustration” and not “preferred” or “advantageous over other aspects.” The detailed description includes specific details for the purpose of providing an understanding of the described techniques. These techniques, however, may be practiced without these specific details. In some figures, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity for wireless communication, comprising:

a processing system configured to:

generate payload bits and parity bits, wherein the parity bits are based on the payload bits, and wherein the payload bits comprise shaped payload bits and non-shaped payload bits;

map each respective bit of the non-shaped payload bits to a respective bit index of a first subset of indices of a plurality of indices, wherein the first subset of indices includes, based on quantity information, at least one of: a first portion of one or more indices of the plurality of indices or a second portion of one or more indices of the plurality of indices, wherein the first portion of one or more indices corresponds to sign information of a modulation symbol, wherein the second portion of one or more indices of the plurality of indices corresponds to non-shaped information of the modulation symbol, and wherein the quantity information indicates a first quantity of the non-shaped payload bits relative to a second quantity of bits for the first portion of one or more indices;

map each respective bit of the parity bits to a respective bit index of a second subset of indices of the plurality of indices, wherein the second subset of indices includes, based on the quantity information, at least one of: the first portion of one or more indices or the second portion of one or more indices;

map each respective bit of the shaped payload bits to a respective bit index of a third subset of indices of the plurality of indices, wherein the third subset of indices includes a third portion of one or more indices of the plurality of indices, wherein the third portion of one or more indices corresponds to shaped information of the modulation symbol; and output the modulation symbol including interleaved bits, wherein the interleaved bits include at least one shaped payload bit of the shaped payload bits, at least one non-shaped payload bit of the non-shaped payload bits, and at least one parity bit of the parity bits.

2. The first network entity of claim 1, wherein the quantity information indicates the first quantity relative to the second quantity by indicating the first quantity is less than the second quantity, and wherein the first subset of indices includes only the first portion of the one or more indices, and wherein the second subset of indices includes the first portion of the one or more indices and the second portion of the one or more indices.

3. The first network entity of claim 1, wherein the quantity information indicates the first quantity relative to the second quantity by indicating the first quantity is equal to the second quantity, and wherein the first subset of indices includes only the first portion of one or more indices, and wherein the second subset of indices includes only the second portion of one or more indices.

4. The first network entity of claim 1, wherein the quantity information indicates the first quantity relative to the second quantity by indicating the first quantity is greater than the second quantity, and wherein the first subset of indices includes the first portion of one or more indices and the second portion of one or more indices, and wherein the second subset of indices includes only the second portion of one or more indices.

5. The first network entity of claim 1, wherein the processing system is configured to determine the quantity information.

6. The first network entity of claim 5, wherein, to determine the quantity information, the processing system is configured to compare the first quantity and the second quantity.

7. The first network entity of claim 1, wherein, to map each respective bit of the non-shaped payload bits, to map each respective bit of the parity bits, and to map each respective bit of the shaped payload bits, the processing system is configured to:

puncture one or more bits of the non-shaped payload bits;

concatenate the shaped payload bits to the non-shaped payload bits;

concatenate the parity bits to the shaped payload bits; and insert one or more bits of the parity bits to one or more respective indices between the non-shaped payload bits and the shaped payload bits.

8. The first network entity of claim 1, wherein one or more first bits of the parity bits mapped to the first portion of one or more indices are associated with a higher degree in a parity encoding scheme than one or more second bits of the parity bits mapped to the second portion of one or more indices.

9. The first network entity of claim 1, wherein, to map each respective bit of the parity bits, the processing system is configured to:

rotate one or more first bits of the parity bits from the second portion of one or more indices to the first portion of one or more indices.

10. The first network entity of claim 9, wherein one or more first bits of the parity bits mapped to the first portion of one or more indices are associated with a lower degree in a parity encoding scheme than one or more second bits of the parity bits mapped to the second portion of one or more indices.

11. The first network entity of claim 1, wherein the processing system is further configured to:

interleave one or more first bits of the non-shaped payload bits based on first bit location information, wherein the first bit location information includes at least one of: the first portion of the one or more indices of the plurality of indices or the second portion of the one or more indices of the plurality of indices;

interleave one or more second bits of the parity bits based on second bit location information, wherein the second bit location information includes at least one of: the first portion of the one or more indices of the plurality of indices or the second portion of the one or more indices of the plurality of indices; and interleave one or more third bits of the shaped payload bits based on third bit location information, wherein the third bit location information includes the third portion of the one or more indices of the plurality of indices, and wherein the interleaved bits include the one or more first bits, the one or more second bits, and the one or more third bits.

12. The first network entity of claim 11, wherein the first bit location information corresponds to one or more first rows or one or more second rows of a structure of rows and columns, the second bit location information corresponds to the one or more first rows or the one or more second rows of the structure, and the third bit location information corresponds to one or more third rows of the structure, wherein a quantity of the rows corresponds to a modulation order and each of the columns is associated with a respective modulation symbol of a plurality of modulation symbols.

13. The first network entity of claim 11, wherein the processing system is further configured to:

permute the non-shaped payload bits, the shaped payload bits, and the parity bits before the one or more first bits, the one or more second bits, or the one or more third bits are interleaved.

14. The first network entity of claim 13, wherein a quantity of bits allocated for the non-shaped information of the modulation symbol is based on a quantity of bits allocated for the shaped information of the modulation symbol and a bit allocated for the sign information of the modulation symbol.

15. The first network entity of claim 1, wherein, to map each respective bit of the non-shaped payload bits, to map each respective bit of the parity bits, and to map each respective bit of the shaped payload bits, the processing system is configured to:

puncture one or more bits of the shaped payload bits;

concatenate the non-shaped payload bits to the shaped payload bits;

concatenate the parity bits to the non-shaped payload bits; and exchange each respective bit of the shaped payload bits with respective bits of the non-shaped payload bits to map the shaped payload bits to the third subset of indices and to map the non-shaped payload bits to the first subset of indices.

16. A second network entity for wireless communication, comprising:

a processing system configured to:

obtain a modulation symbol that indicates non-shaped payload bits, shaped payload bits, and parity bits;

de-map each respective bit of the non-shaped payload bits from a respective bit index of a first subset of indices of a plurality of indices, wherein the first subset of indices includes, based on quantity information, at least one of: a first portion of one or more indices of the plurality of indices or a second portion of one or more indices of the plurality of indices, wherein the first portion of one or more indices corresponds to sign information of the modulation symbol, wherein the second portion of one or more indices of the plurality of indices corresponds to non-shaped information of the modulation symbol, and wherein the quantity information indicates a first quantity of the non-shaped payload bits relative to a second quantity of bits for the first portion of one or more indices;

de-map each respective bit of the parity bits to a respective bit index of a second subset of indices of the plurality of indices, wherein the second subset of indices includes, based on the quantity information, at least one of: the first portion of one or more indices or the second portion of one or more indices; and de-map each respective bit of the shaped payload bits from a respective bit index of a third subset of indices of the plurality of indices, wherein the third subset of indices includes a third portion of one or more indices of the plurality of indices, wherein the third portion of one or more indices corresponds to shaped information of the modulation symbol.

17. The second network entity of claim 16, wherein the quantity information indicates the first quantity relative to the second quantity by indicating the first quantity is less than the second quantity, and wherein the first subset of indices includes only the first portion of the one or more indices, and wherein the second subset of indices includes the first portion of the one or more indices and the second portion of the one or more indices.

18. The second network entity of claim 16, wherein the processing system is further configured to:

de-interleave one or more first bits of the non-shaped payload bits based on first bit location information, wherein the first bit location information includes at least one of: the first portion of the one or more indices of the plurality of indices or the second portion of the one or more indices of the plurality of indices;

de-interleave one or more second bits of the parity bits based on second bit location information, wherein the second bit location information includes at least one of: the first portion of the one or more indices of the plurality of indices or the second portion of the one or more indices of the plurality of indices; and de-interleave one or more third bits of the shaped payload bits based on third bit location information, wherein the third bit location information includes the third portion of the one or more indices of the plurality of indices.

19. The second network entity of claim 18, wherein the first bit location information corresponds to one or more first rows or one or more second rows of a structure of rows and columns, the second bit location information corresponds to the one or more first rows or the one or more second rows of the structure, and the third bit location information corresponds to one or more third rows of the structure, wherein a quantity of the rows corresponds to a modulation order and each of the columns is associated with a respective modulation symbol of a plurality of modulation symbols.

20. A method of wireless communication performed by a first network entity, comprising:

generating payload bits and parity bits, wherein the parity bits are based on the payload bits, and wherein the payload bits comprise shaped payload bits and non-shaped payload bits;

mapping each respective bit of the non-shaped payload bits to a respective bit index of a first subset of indices of a plurality of indices, wherein the first subset of indices includes, based on quantity information, at least one of: a first portion of one or more indices of the plurality of indices or a second portion of one or more indices of the plurality of indices, wherein the first portion of one or more indices corresponds to sign information of a modulation symbol, wherein the second portion of one or more indices of the plurality of indices corresponds to non-shaped information of the modulation symbol, and wherein the quantity information indicates a first quantity of the non-shaped payload bits relative to a second quantity of bits for the first portion of one or more indices;

mapping each respective bit of the parity bits to a respective bit index of a second subset of indices of the plurality of indices, wherein the second subset of indices includes, based on the quantity information, at least one of: the first portion of one or more indices or the second portion of one or more indices;

mapping each respective bit of the shaped payload bits to a respective bit index of a third subset of indices of the plurality of indices, wherein the third subset of indices includes a third portion of one or more indices of the plurality of indices, wherein the third portion of one or more indices corresponds to shaped information of the modulation symbol; and outputting the modulation symbol including interleaved bits, wherein the interleaved bits include at least one shaped payload bit of the shaped payload bits, at least one non-shaped payload bit of the non-shaped payload bits, and at least one parity bit of the parity bits.

* * * * *